US008024577B2

(12) United States Patent
Ohmori et al.

(10) Patent No.: US 8,024,577 B2
(45) Date of Patent: Sep. 20, 2011

(54) PASSWORD RECOVERY SYSTEM

(75) Inventors: Motoji Ohmori, Hirakata (JP); Natsume Matsuzaki, Mino (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 1357 days.

(21) Appl. No.: 10/684,400

(22) Filed: Oct. 15, 2003

(65) Prior Publication Data

US 2004/0133812 A1 Jul. 8, 2004

(30) Foreign Application Priority Data

Oct. 16, 2002 (JP) ................................. 2002-302282

(51) Int. Cl.
*G06F 21/00* (2006.01)
*G06F 7/04* (2006.01)
*G06F 15/16* (2006.01)
*G06F 17/30* (2006.01)
*G06F 12/00* (2006.01)

(52) U.S. Cl. ............................. 713/184; 726/6; 726/18
(58) Field of Classification Search .................. 726/2, 6, 726/8, 21; 713/184
See application file for complete search history.

(56) References Cited

U.S. PATENT DOCUMENTS

| 5,842,124 A | | 11/1998 | Kenagy et al. |
| 5,982,898 A | * | 11/1999 | Hsu et al. ....................... 713/156 |
| 6,061,799 A | * | 5/2000 | Eldridge et al. ................ 726/20 |
| 6,067,625 A | | 5/2000 | Ryu |
| 6,178,511 B1 | * | 1/2001 | Cohen et al. ...................... 726/6 |
| 6,185,308 B1 | * | 2/2001 | Ando et al. ................... 380/286 |
| 6,230,002 B1 | | 5/2001 | Flodén et al. |
| 6,240,184 B1 | * | 5/2001 | Huynh et al. ................ 380/206 |
| 6,754,349 B1 | * | 6/2004 | Arthan ......................... 380/286 |
| 6,792,536 B1 | * | 9/2004 | Teppler ......................... 713/178 |

(Continued)

FOREIGN PATENT DOCUMENTS

EP      0 745 924 A2      12/1996

(Continued)

OTHER PUBLICATIONS

Chang, Chin-Chen. Hwang, Ren-Junn. Buehrer, Daniel J. "Using Smart Cards to Authenticate Passwords". Proceedings IEEE International Carnahan Conference on Security Technology. Pub. Date: Oct. 1993. Relevant pp. 154-156. Found on the World Wide Web at: http://ieeexplore.ieee.org/stamp/stamp.jsp?tp=&arnumber=386808.*

*Primary Examiner* — Nathan Flynn
*Assistant Examiner* — Jeremiah Avery
(74) *Attorney, Agent, or Firm* — Wenderoth, Lind & Ponack, L.L.P.

(57) ABSTRACT

The present invention provides a password recovery system that re-supplies a password to only the legitimate user of the password. The password recovery system includes a memory card with CPU and a mobile phone. When a password needs to be recovered, a phone call is made, to the mobile phone, from a telephone connected to a phone line whose phone number is registered in advance into the memory card with CPU. The mobile phone then obtains the telephone number of the phone line via a caller's telephone number notifying service. It is judged whether the obtained telephone number and the registered phone number are the same, and when they are the same, the password stored in the memory card with CPU will be re-supplied so that the user can recover it.

12 Claims, 32 Drawing Sheets

U.S. PATENT DOCUMENTS

| | | | |
|---|---|---|---|
| 6,820,204 B1 * | 11/2004 | Desai et al. | 726/6 |
| 6,940,980 B2 * | 9/2005 | Sandhu et al. | 380/282 |
| 6,947,571 B1 * | 9/2005 | Rhoads et al. | 382/100 |
| 6,968,050 B1 * | 11/2005 | Pershan et al. | 379/196 |
| 6,971,005 B1 * | 11/2005 | Henry et al. | 713/155 |
| 7,083,090 B2 * | 8/2006 | Zuili | 235/383 |
| 7,111,321 B1 * | 9/2006 | Watts et al. | 726/2 |
| 7,292,680 B1 * | 11/2007 | Simpson | 379/88.18 |
| 7,434,251 B2 * | 10/2008 | Ooi et al. | 726/9 |
| 7,469,341 B2 * | 12/2008 | Edgett et al. | 713/176 |
| 2002/0034305 A1 * | 3/2002 | Noyama et al. | 380/282 |
| 2005/0251440 A1 * | 11/2005 | Bednarek | 705/10 |
| 2005/0286695 A1 * | 12/2005 | Pershan et al. | 379/196 |

FOREIGN PATENT DOCUMENTS

| | | |
|---|---|---|
| JP | 10-187903 | 7/1998 |
| JP | 10-271209 | 10/1998 |
| JP | 2000-151798 | 5/2000 |
| JP | 2002-152368 | 5/2002 |

* cited by examiner

300 SERVICE PASSWORD REGISTRATION TABLE

| NAMES OF SERVICES | SERVICE PASSWORDS |
|---|---|
| SERVICE A | ENCRYPTED PASSWORD A |
| SERVICE B | ENCRYPTED PASSWORD B |
| ⋮ | ⋮ |

FIG.21

700 RECOVERY MANAGEMENT INFORMATION TABLE

| GUARANTOR NAMES | PUBLIC KEY CERTIFICATES |
|---|---|
| GUARANTOR NAME A | PUBLIC KEY CERTIFICATE A |
| GUARANTOR NAME B | PUBLIC KEY CERTIFICATE B |
| ⋮ | ⋮ |

PASSWORD RECOVERY SYSTEM

This application is based on an application No. 2002-302282 filed in Japan, the content of which is hereby incorporated by reference.

BACKGROUND OF THE INVENTION

1. Field of the Invention

The present invention relates to a technique to have a password recovered when it has been forgotten.

2. Description of the Related Art

In recent years, users have been able to receive various kinds of services since network services have come into wide use. Most of those services request that each user input a password. In those services, passwords are used in order to identify if a person trying to receive a particular service is the user himself/herself or not, but users sometimes forget their passwords. In a mail system provided by an administrator on the Internet, when a user has forgotten the password, the user transmits data, besides the password, with which the user can be identified, and when the administrator has authenticated that it is the user himself/herself according to the data, the administrator allows the password to be recovered and presents the password to the user or prompts the user to change the password to a new one.

In addition to the method mentioned above, the Japanese Unexamined Patent Application Publication No. 10-187903 discloses an IC memory card and a system in which an IC memory card is used so that a user is allowed to easily cancel his/her password when it has been forgotten, and even after it is cancelled, the setting and validity of the password will not be lost. In this system, when a password has been forgotten and the user performs predetermined key operations, a canceling data character string will be displayed based on some information at the time of setting the password e.g. the date, the serial number of the system, the serial number of the IC memory card and/or the remaining memory size. Based on the displayed canceling data character string, a canceling key character string will be generated. When the canceling key character string is supplied to the IC memory card, it will be possible to read the data recorded on the IC memory card.

Both of these techniques of the prior art mentioned here have security problems, however, in that a third party who does not know the user's password may be able to obtain the means for recovering the password such as the information to identify the user or the information on key operations, and to recover the password so as to "spoof" as the user or obtain/tamper the data owned by the user using the recovered password.

REFERENCE 1

Japanese Unexamined Patent Application Publication No. 10-187903

SUMMARY OF THE INVENTION

An object of the present invention is to provide a password recovery system, a communication terminal device, a password recording medium, a password recovery method, a password recovery program, and a recording medium that allow only the legitimate user of the password to recover the password.

In order to achieve the object, the present invention provides a password recovery system that re-supplies a password to a user who has forgotten the password and includes a communication terminal device and a portable password recording medium having the password recorded thereon and being mounted on the communication terminal device, wherein (i) the communication terminal device comprises: a receiving unit operable to receive a first telephone number of a caller via a caller's telephone number notifying service; and an outputting unit operable to output the received first telephone number to the password recording medium, and (ii) the password recording medium comprises: a telephone number storing unit that stores therein a second telephone number to be used as a criterion in judgment of whether it is acceptable to re-supply the password; a password storing unit that stores the password therein; a reception unit operable to receive the outputted first telephone number; and a reading unit operable to judge whether the received first telephone number is the same as the second telephone number, and read the password from the password storing unit when the judgment is in the affirmative.

With this arrangement, the password recovery system receives the first telephone number via a caller's telephone number notifying service and reads the password when the received first telephone number is the same as the second telephone number; therefore, it is possible to have the password recovered only for the legitimate user of the password. The reason for this is that normally only limited members are able to use the first telephone number, and it is difficult for a third party to use the first telephone number for recovering the password. Further, there is no possibility that someone who is able to use the first telephone number would notify the first telephone number to a third party other than the user via a caller's telephone number notifying service.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 21 shows the data structure of the recovery management information table 700 which is stored in the password recovery management storing unit 501;

DESCRIPTION OF THE PREFERRED EMBODIMENTS

The following describes in detail embodiments of the present invention with reference to the drawings.

1. First Embodiment

The following explains the password recovery system 1 as the first embodiment of the present invention.

Figure 1:
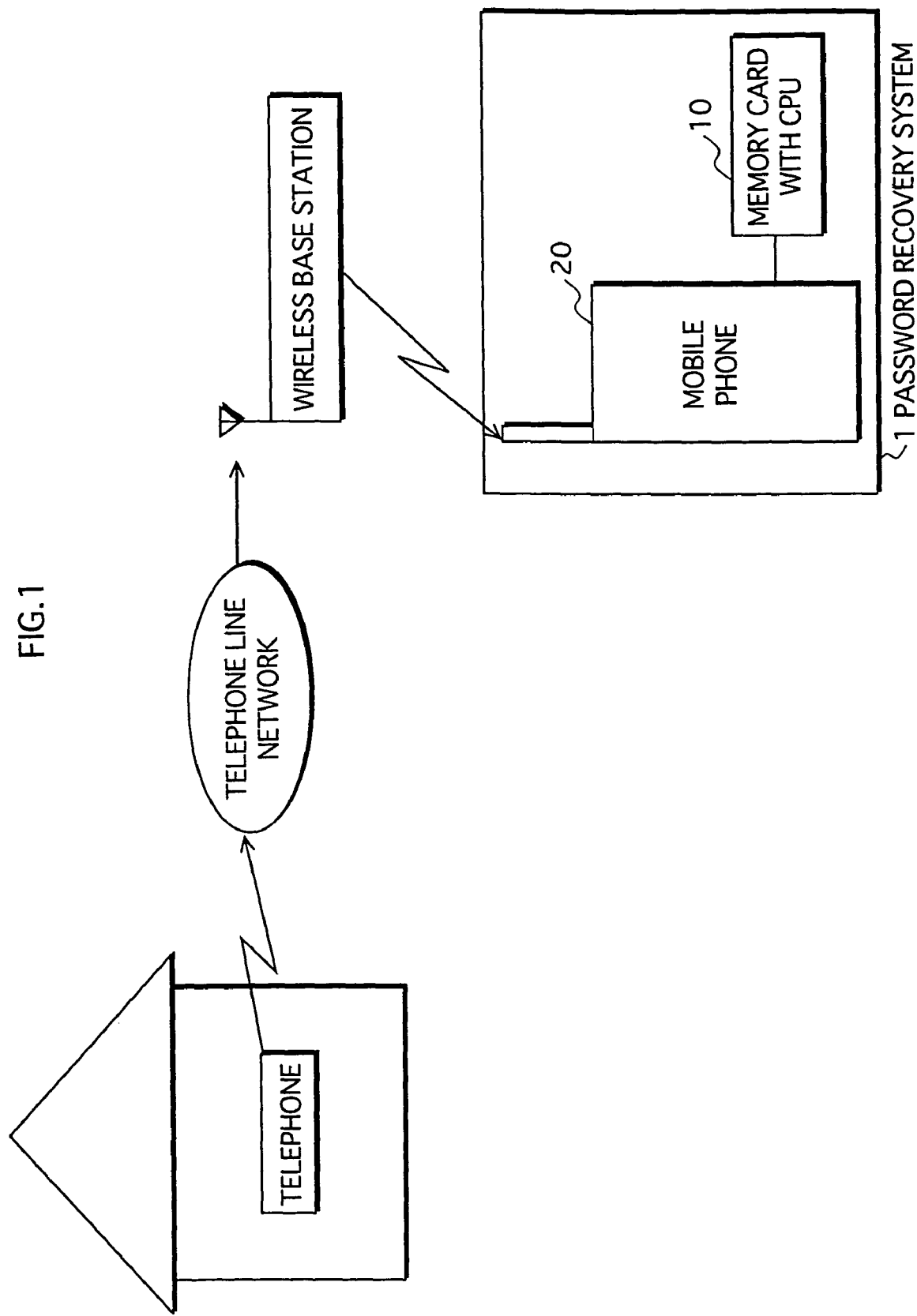
FIG. 1 shows a general outline of a case where a password is recovered in the password recovery system 1.

As shown in FIG. 1, in the password system 1, in order to have the password recovered, a telephone number of a phone line connected to a fixed telephone installed at a user's home gets received by a mobile phone through a caller's telephone number notifying service.

1.1 Structure of the Password Recovery System 1

Figure 2:
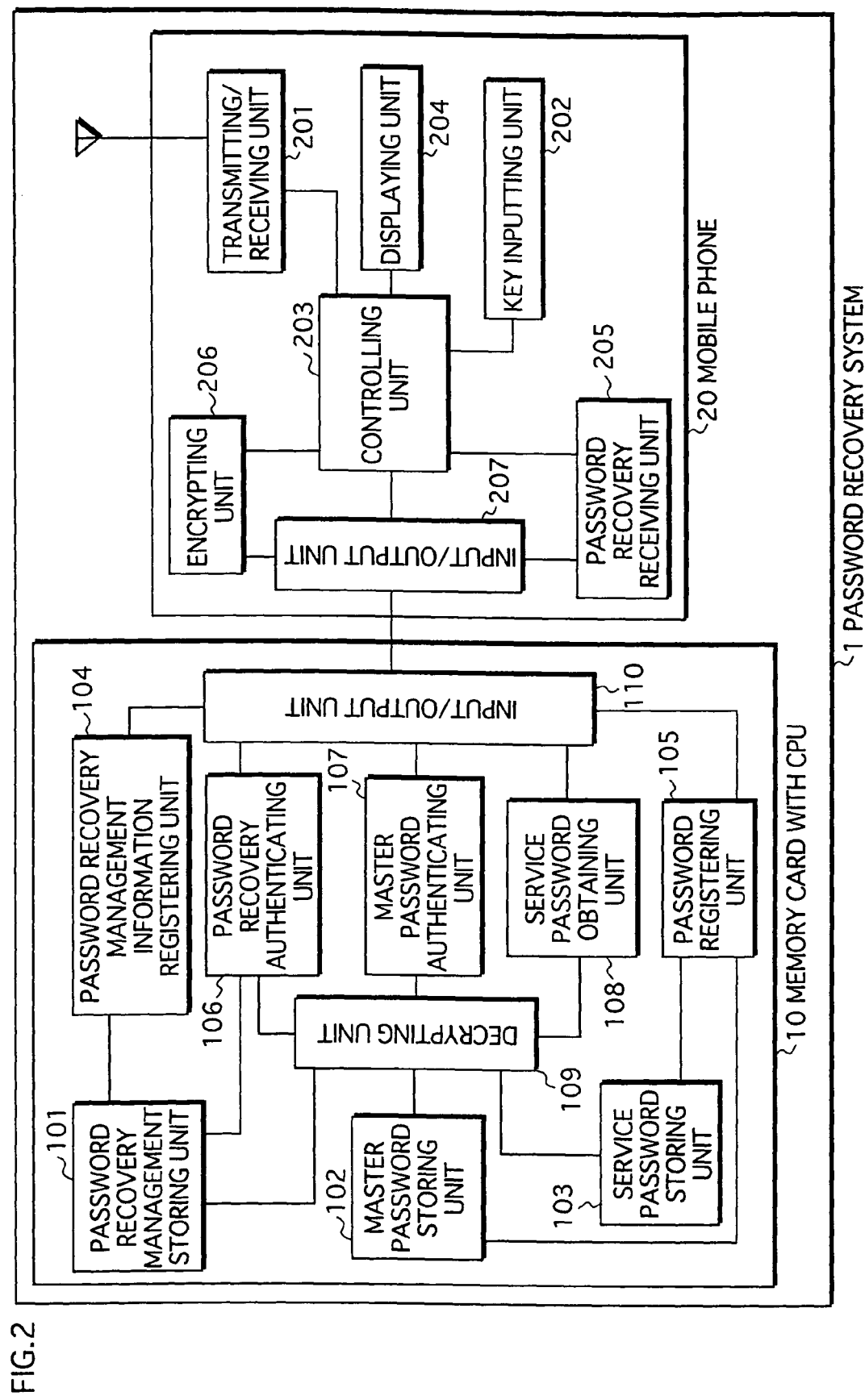
FIG. 2 is a block diagram that shows the structure of the password recovery system 1.

The password recovery system 1 comprises a memory card with CPU 10 and a mobile phone 20 shown in FIG. 2. In this system, a caller's telephone number notifying service is used to have the password recovered.

The user registers in advance, on the memory card with CPU 10, the telephone number of the phone line connected to the fixed telephone installed at his/her home. Here, it is assumed that the caller's telephone number notifying service is capable of providing the telephone number.

When the password needs to be recovered, the user inserts the memory card with CPU 10 into the mobile phone 20, and has a phone call made from the fixed telephone to the mobile phone 20.

The mobile phone 20 notifies the memory card with CPU 10 of the telephone number obtained through the caller's telephone number notifying service.

The memory card with CPU 10 judges whether or not the received telephone number and the telephone number stored in advance are the same, and when they are the same, the memory card with CPU 10 reads the password that is stored therein in advance and notifies the read password to the mobile phone 20.

Further, the password recovery system 1 normally receives a password, and when the received password is a legitimate one, permits an access to an area that corresponds to the password. In the present embodiment, this password will be referred to as a master password.

1.2 Structure of the Memory Card with CPU 10

The following explains the structure of the memory card with CPU 10.

As shown in FIG. 2, the memory card with CPU 10 comprises a password recovery management storing unit 101, a master password storing unit 102, a service password storing unit 103, a password recovery management information registering unit 104, a password registering unit 105, a password recovery authenticating unit 106, a master password authenticating unit 107, a service password obtaining unit 108, a decrypting unit 109, and an input/output unit 110.

More specifically, the memory card with CPU 10 is a computer system comprising a microprocessor, a ROM, a RAM, and the like. The ROM stores therein one or more computer programs. The functions of the memory card with CPU 10 are realized when the microprocessor operates according to the computer programs.

(1) The Password Recovery Management Storing Unit 101

The password recovery management storing unit 101 stores therein a telephone number of a phone line specified in advance by the user (hereafter, referred to as a registration number) in order to judge whether it is acceptable to have the master password recovered when the master password recovery is needed.

When the registration number has been changed, the password recovery management storing unit 101 stores therein the post-change registration number again.

(2) The Master Password Storing Unit 102

The master password storing unit 102 stores therein a master password that is encrypted with the registration number being an encryption key, the registration number having been stored in the password recovery management storing unit 101. Here, a master password denotes a password that manages the under-mentioned service passwords altogether.

When the master password is inputted, the service password storing unit 103 becomes accessible.

When the registration number has been changed, the master password gets encrypted again with the post-change registration number being an encryption key, and the master password storing unit 102 stores therein the re-encrypted master password.

(3) The Service Password Storing Unit 103

Figure 3:
FIG. 3 shows the data structure of the service password registration table 300 which is stored in the service password storing unit 103 of the password recovery system 1 and in the service password storing unit 504 of the password recovery system 2.

As shown in FIG. 3 as an example, the service password storing unit 103 stores therein a service password registration table 300.

The service password registration table 300 includes one or more sets of a name of a service and a service password.

"Names of Services" denote the names of the services with which the user is registered to receive services from.

"Service Passwords" are passwords used to log in services. Here, service passwords are encrypted with the master password being an encryption key.

(4) The Password Recovery Management Information Registering Unit 104

The password recovery management information registering unit 104 receives, from the mobile phone 20 via the input/output unit 110, registration information that includes (i) what process should be performed, which is either a new registration or a change and (ii) the registration number. When the process to be performed indicated in the received registration information is a new registration, the password recovery management information registering unit 104 newly registers a registration number into the password recovery management storing unit 101. When the process to be performed is a change, the password recovery management information registering unit 104 updates the registration number stored in the password recovery management storing unit 101, and outputs, to the mobile phone 20 via the input/output unit 110, master input instruction information indicating an instruction to input the master password and the registration number.

(5) The Password Registering Unit 105

The password registering unit 105 registers and updates the master password or the service passwords.

(a) To Register the Master Password

The password registering unit 105 receives, from the mobile phone 20 via the input/output unit 110, master encryption information that includes (i) what process should be performed, which is either a new registration or a change and (ii) the encrypted master password. The password registering unit 105 either newly registers the encrypted master password into the master password storing unit 102 or updates the encrypted master password stored in the master password storing unit 102, according to the process to be performed indicated in the received master encryption information.

(b) To Register a Service Password

The password registering unit 105 receives, from the mobile phone 20 via the input/output unit 110, service encryption information that includes (i) what process should be performed, which is either a new registration or a change, (ii) the encrypted service password, and (iii) the name of the network service. When the process to be performed indicated in the received service encryption information is a new registration, the password registering unit 105 makes a new registration into the service password storing unit 103. When the process to be performed is a change, the password registering unit 105 obtains the particular service password from the service password storing unit 103 and updates it.

(6) The Password Recovery Authenticating Unit 106

When the master password needs to be recovered, the password recovery authenticating unit 106 receives, from the mobile phone 20 via the input/output unit 110, the telephone number that has been received by the mobile phone 20 through the caller's telephone number notifying service (hereafter, referred to as a received number).

Next, the password recovery authenticating unit 106 reads the registration number from the password recovery management storing unit 101 and judges if the read registration number and the received number are the same or not.

When the registration number and the received number are the same, the password recovery authenticating unit 106 outputs, to the decrypting unit 109, recovery permitting information that includes information for instructing decryption of the master password.

Then, the password recovery authenticating unit 106 receives the decrypted master password from the decrypting unit 109, and outputs the received decrypted master password to the mobile phone 20 via the input/output unit 110.

When the registration number and the received number are not the same, the password recovery authenticating unit 106 outputs recovery prohibiting information that includes information for prohibiting the recovery, to the mobile phone 20 via the input/output unit 110.

(7) The Master Password Authenticating Unit 107

The master password authenticating unit 107 receives the master password from the mobile phone 20 via the input/output unit 110.

Next, the master password authenticating unit 107 outputs master decryption information that includes information for instructing decryption of the master password to the decrypting unit 109.

Then, the master password authenticating unit 107 receives the decrypted master password from the decrypting unit 109 and judges if the received decrypted master password and the master password received from the mobile phone 20 are the same or not.

When they are the same, the master password authenticating unit 107 outputs reception permitting information that includes information for permitting reception to the mobile phone 20 via the input/output unit 110, and makes the service password storing unit 103 accessible. When they are not the same, the master password authenticating unit 107 outputs reception prohibiting information that includes information for prohibiting reception to the mobile phone 20 via the input/output unit 110.

(8) The Service Password Obtaining Unit 108

The service password obtaining unit 108 performs the following operations when the service password storing unit 103 is accessible:

The service password obtaining unit 108 receives, from the mobile phone 20 via the input/output unit 110, service identifying information that includes information for identifying a service the user wishes to use, and outputs, to the decrypting unit 109, service decryption information that includes (i) the received service identifying information and (ii) information for instructing decryption of the service password.

Next, the service password obtaining unit 108 receives the service password having been decrypted from the decrypting unit 109, and outputs it to the mobile phone 20 via the input/output unit 110.

(9) The Decrypting Unit 109

The decrypting unit 109 performs the decryption process for the encrypted master password and encrypted service passwords.

(a) To Decrypt the Master Password

The decrypting unit 109 receives either the recovery permitting information from the password recovery authenticating unit 106 or the master decryption information from the master password authenticating unit 107.

In order to decrypt the master password, the decrypting unit 109 reads the registration number from the password recovery management storing unit 101, and decrypts the master password with the read registration number being a decryption key, and outputs the decrypted master password to either the password recovery authenticating unit 106 or the master password authenticating unit 107.

Here, in the encryption and decryption processes of the master password, the registration number is used as the key. This key is called a common key, and an encryption method in which a common key is used is called the common key encryption method. An example of the common key encryption method is DES. Explanation on DES will be omitted since it is publicly known.

(b) To Decrypt a Service Password

A service password gets decrypted with the master password being a decryption key.

The decrypting unit 109 receives the service decryption information from the service password obtaining unit 108.

The decrypting unit 109 at first decrypts the master password.

Next, the decrypting unit 109 reads an encrypted service password that corresponds to the service the user wishes to use, with use of the service identifying information included in the service decryption information received from the service password obtaining unit 108. The decrypting unit 109 decrypts the read service password with the decrypted master password being a decryption key, and outputs the decrypted service password to the service password obtaining unit 108.

(10) The Input/Output Unit 110

The input/output unit 110 outputs information received from the mobile phone 20 to each of the password recovery management information registering unit 104, the password registering unit 105, the password recovery authenticating unit 106, the master password authenticating unit 107, and the service password obtaining unit 108.

The input/output unit 110 outputs, to the mobile phone 20, information received from each of the password recovery management information registering unit 104, the password recovery authenticating unit 106, the master password authenticating unit 107, and the service password obtaining unit 108.

1.3 Structure of the Mobile Phone 20

The following explains the structure of the mobile phone 20.

As shown in FIG. 2, the mobile phone 20 comprises a transmitting/receiving unit 201, a key inputting unit 202, a controlling unit 203, a displaying unit 204, a password recovery receiving unit 205, an encrypting unit 206, and an input/output unit 207.

More specifically, the mobile phone 20 is a computer system comprising a microprocessor, a ROM, a RAM, a display unit, and the like. The ROM stores therein one or more computer programs. The functions of the mobile phone 20 are realized when the microprocessor operates according to the computer programs.

Like a conventional mobile phone, the mobile phone 20 includes a speaker unit, a microphone unit, a calling unit, a memory unit, and the like so as to perform operations as a normal mobile phone.

(1) The Transmitting/Receiving Unit 201

The transmitting/receiving unit 201 receives the received number and information from the network services, and outputs them to the controlling unit 203.

The transmitting/receiving unit 201 also transmits a call to an external telephone and information to the network services, according to an instruction from the controlling unit 203.

(2) The Key Inputting Unit 202

The key inputting unit 202 includes dial keys, function keys, and control keys. When the registration number needs to be registered or changed, the key inputting unit 202 receives the input of the registration number, and outputs the received registration number to the controlling unit 203. When the registration number needs to be changed, in order to encrypt the master password again after the registration number has been changed, the key inputting unit 202 receives master plaintext information that includes (i) what process should be performed, which is a change, (ii) the master password, and (iii) the registration number, and outputs the received master plaintext information to the controlling unit 203.

When the master password needs to be used, the key inputting unit 202 receives the input of the master password, and outputs the received master password to the controlling unit 203.

When the master password needs to be recovered, the key inputting unit 202 receives the instruction to have the master password recovered from the user, and outputs the received master password recovery instruction to the controlling unit 203.

When the master password needs to be registered or changed, the key inputting unit 202 receives the master plaintext information that includes (i) what process should be performed, which is either a new registration or a change, (ii) the master password, and (iii) the registration number, and outputs the received master plaintext information to the controlling unit 203. When the service password needs to be registered or changed, the key inputting unit 202 receives the service plaintext information that includes (i) what process should be performed, which is either a new registration or a change, (ii) a service password, (iii) the master password, and (iv) the name of a network service, and outputs the received service plaintext information to the controlling unit 203.

When the network services need to be used, the key inputting unit 202 receives the service identifying information and outputs the received service identifying information to the controlling unit 203.

The key inputting unit 202 also performs key operations that are the same as those of a conventional mobile phone.

(3) The Controlling Unit 203

The controlling unit 203 performs the overall operational control of the mobile phone 20.

(a) To Register or Change the Registration Number

When the registration number needs to be registered or changed, the controlling unit 203 receives the registration number from the key inputting unit 202, and outputs the received registration number to the memory card with CPU 10 via the input/output unit 207.

When the registration number needs to be changed, the controlling unit 203 receives, after the registration number has been updated, the master input instruction information from the memory card with CPU 10, and outputs the received master input instruction information to the displaying unit 204.

(b) To have the Master Password Recovered

When the master password needs to be recovered, the controlling unit 203 causes activation of the password recovery receiving process performed by the password recovery receiving unit 205, according to the master password recovery instruction received from the key inputting unit 202. Then, the controlling unit 203 outputs the received number, which has been received from the transmitting/receiving unit 201, to the password recovery receiving unit 205.

Next, when it is acceptable to have the master password recovered, the controlling unit 203 receives the master password from the memory card with CPU 10 via the input/output unit 207, and outputs the received master password to the displaying unit 204, so as to complete the password recovery receiving process. When it is not acceptable to have the master password recovered, the controlling unit 203 receives the recovery prohibiting information, and outputs the received recovery prohibiting information to the displaying unit 204 so as to complete the password recovery receiving process.

(c) To Use the Master Password

When the master password needs to be used, the controlling unit 203 receives the master password from the key inputting unit 202, and outputs the received master password to the memory card with CPU 10 via the input/output unit 207.

When it is acceptable to receive the master password, the controlling unit 203 receives reception permitting information from the memory card with CPU 10 via the input/output unit 207, and outputs the received reception permitting information to the displaying unit 204. When it is not acceptable to receive the master password, the controlling unit 203 receives reception prohibiting information, and outputs the received reception prohibiting information to the displaying unit 204.

(d) To Use the Network Services

When the network services need to be used, the controlling unit 203 outputs, to the memory card with CPU 10 via the input/output unit 207, the service identifying information received from the key inputting unit 202.

The controlling unit 203 receives the service password from the memory card with CPU 10, and transmits the received service password to the service the user wishes to use via the transmitting/receiving unit 201 so that an automatic log in can be performed.

(e) To Register or Change the Master Password

When the master password needs to be registered or changed, the controlling unit 203 outputs the master plaintext information received from the key inputting unit 202 to the encrypting unit 206.

(f) To Register or Change a Service Password

When the service password needs to be registered or changed, the controlling unit 203 outputs the service plaintext information received from the key inputting unit 202 to the encrypting unit 206.

(4) The Displaying Unit 204

When the registration number needs to be changed, the displaying unit 204 receives the master input instruction information from the controlling unit 203 and, using the received master input instruction information, displays a screen in which the master password and the registration number are to be inputted, and prompts the user to input them.

When the master password needs to be recovered, the displaying unit 204 receives, from the controlling unit 203, and displays the master password or the recovery prohibiting information.

When the master password needs to be used, the displaying unit 204 receives, from the controlling unit 203, and displays the reception permitting information or the reception prohibiting information.

The displaying unit 204 also displays other screens that are the same as those of a conventional mobile phone.

(5) The Password Recovery Receiving Unit 205

The password recovery receiving unit 205 gets activated by the controlling unit 203 when a password needs to be recovered, and receives the received number from the controlling unit 203, and outputs the received number that has been received to the memory card with CPU 10 via the input/output unit 207.

(6) The Encrypting Unit 206

When the master password needs to be registered or changed, the encrypting unit 206 receives the master plaintext information from the controlling unit 203, and encrypts the master password with the registration number being an encryption key, so as to generate master encryption information. When the service password needs to be registered or changed, the encrypting unit 206 receives service plaintext information from the controlling unit 203, and encrypts the service password with the master password being an encryption key, so as to generate service encryption information.

Then, the encrypting unit 206 outputs the master encryption information or the service encryption information to the memory card with CPU 10 via the input/output unit 207.

(7) The Input/Output Unit 207

The input/output unit 207 outputs information received from the memory card with CPU 10 to the controlling unit 203.

The input/output unit 207 also outputs, to the memory card with CPU 10, information received from the controlling unit 203, the password recovery receiving unit 205, or the encrypting unit 206.

1.4 General Outline of Operations of the Password Recovery System 1

The following explains the general outline of the operations of the password recovery system 1.

(1) General Outline of Operations at Times of Registering a Registration Number

The following explains the general outline of the operations for registering a registration number.

(a) To Newly Register a Registration Number

Figure 4:
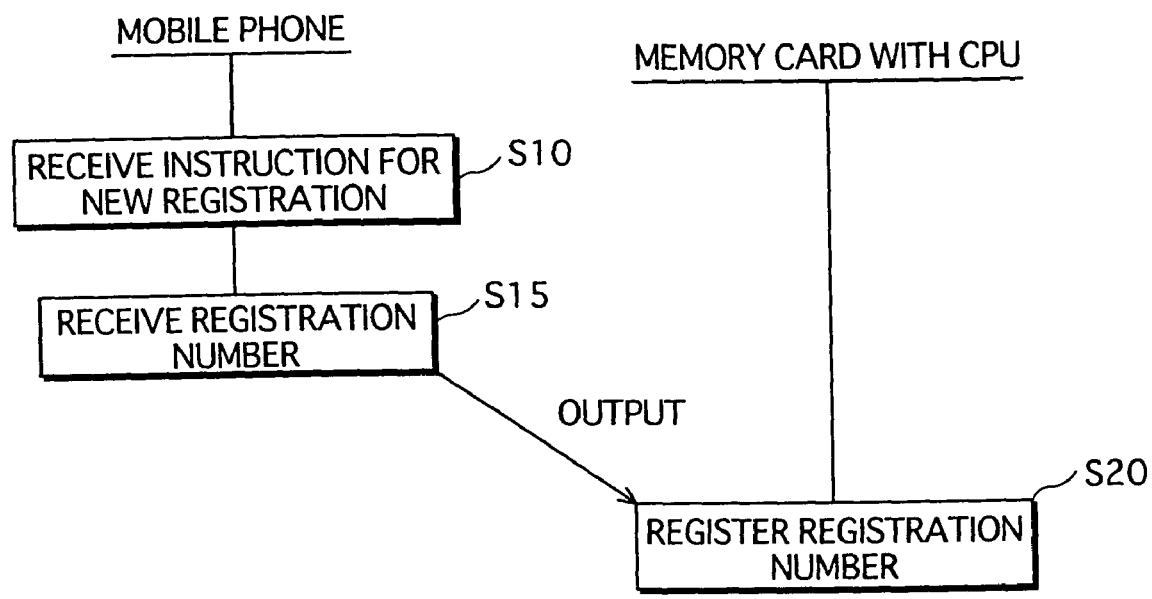
FIG. 4 is a flow chart showing the operations for a new registration of a registration number in the password recovery system 1.

The following explains the general outline of the operations for newly registering a registration number, with reference to the flow chart in FIG. 4.

The mobile phone 20 receives an instruction to newly register a registration number from the user (Step S10). Then, the mobile phone 20 receives the registration number and outputs, to the memory card with CPU 10, registration information that includes (i) the received instruction to make the new registration and (ii) the registration number (Step S15).

The memory card with CPU 10 newly registers the registration number with use of the received registration information (Step S20).

(b) To Change the Registration Number

Figure 5:
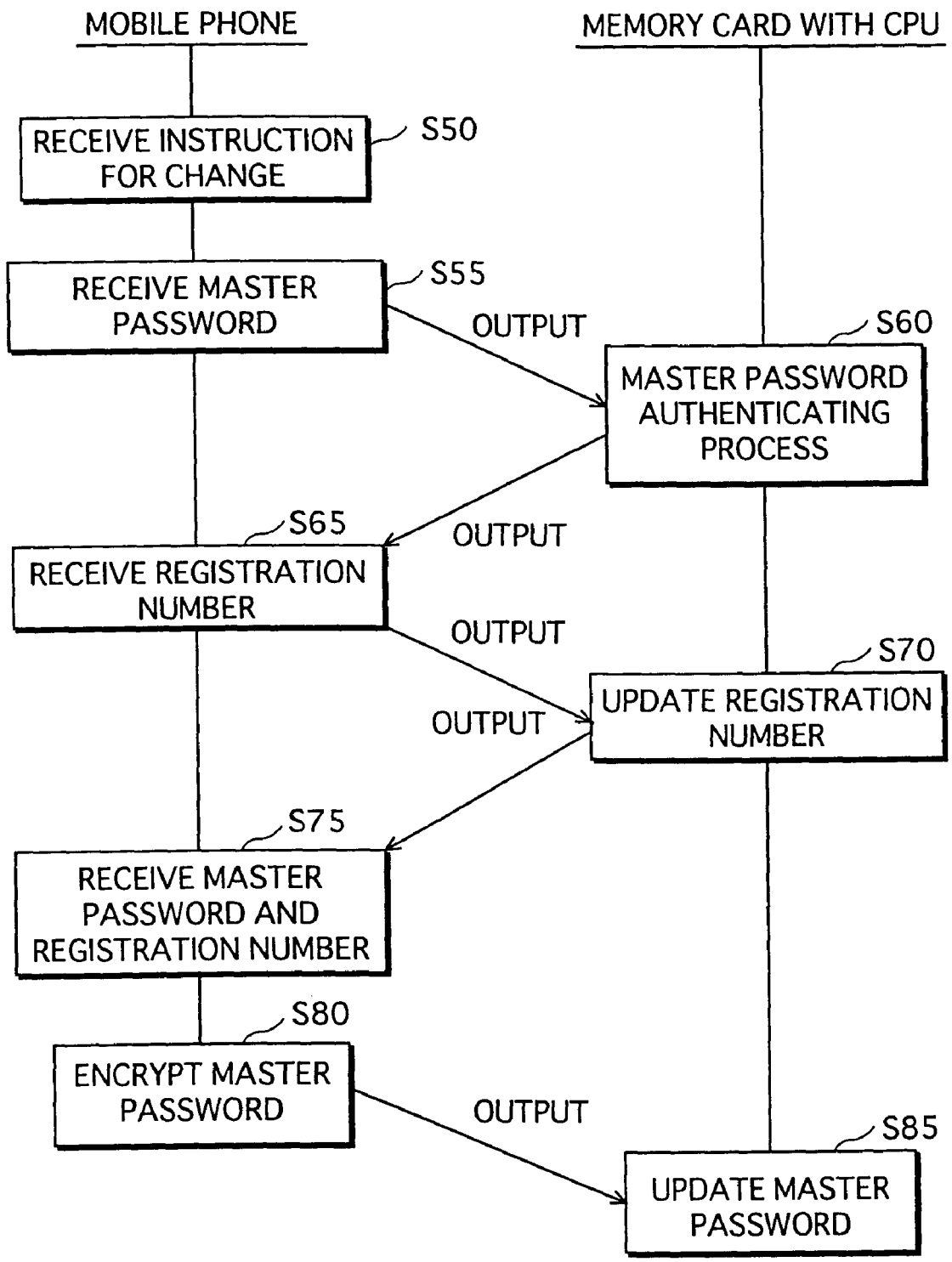
FIG. 5 is a flowchart that shows the operations for changing a registration number in the password recovery system 1.

The following explains the general outline of the operations for changing the registration number, with reference to the flow chart in FIG. 5.

The mobile phone 20 receives an instruction to change the registration number from the user (Step S50). Then the mobile phone 20 receives the master password, and outputs the received master password to the memory card with CPU 10 (Step S55).

The memory card with CPU 10 performs the master password authenticating process with use of the received master password, and outputs the reception permitting information to the mobile phone 20 (Step S60).

Next, the mobile phone 20 receives the registration number and outputs, to the memory card with CPU 10, registration information that includes (i) the received instruction to make the change and (ii) the registration number (Step S65).

The memory card with CPU 10 updates the registration number with use of the received registration information, and outputs the master input instruction information to the mobile phone 20 via the input/output unit 110 (Step S70).

The mobile phone 20 receives the master input instruction information from the memory card with CPU 10, and instructs the user to input the master password and the registration number, so that they can be received from the user (Step S75).

Next, the mobile phone 20 encrypts the received master password with the received registration number being an encryption key, and outputs, to the memory card with CPU 10, master encryption information that includes (i) what process should be performed, which is a change of the master password and (ii) the encrypted master password (Step S80).

The memory card with CPU 10 updates the master password with use of the master encryption information (Step S85).

(2) General Outline of Operations at Times of Registering the Master Password

Figure 6:
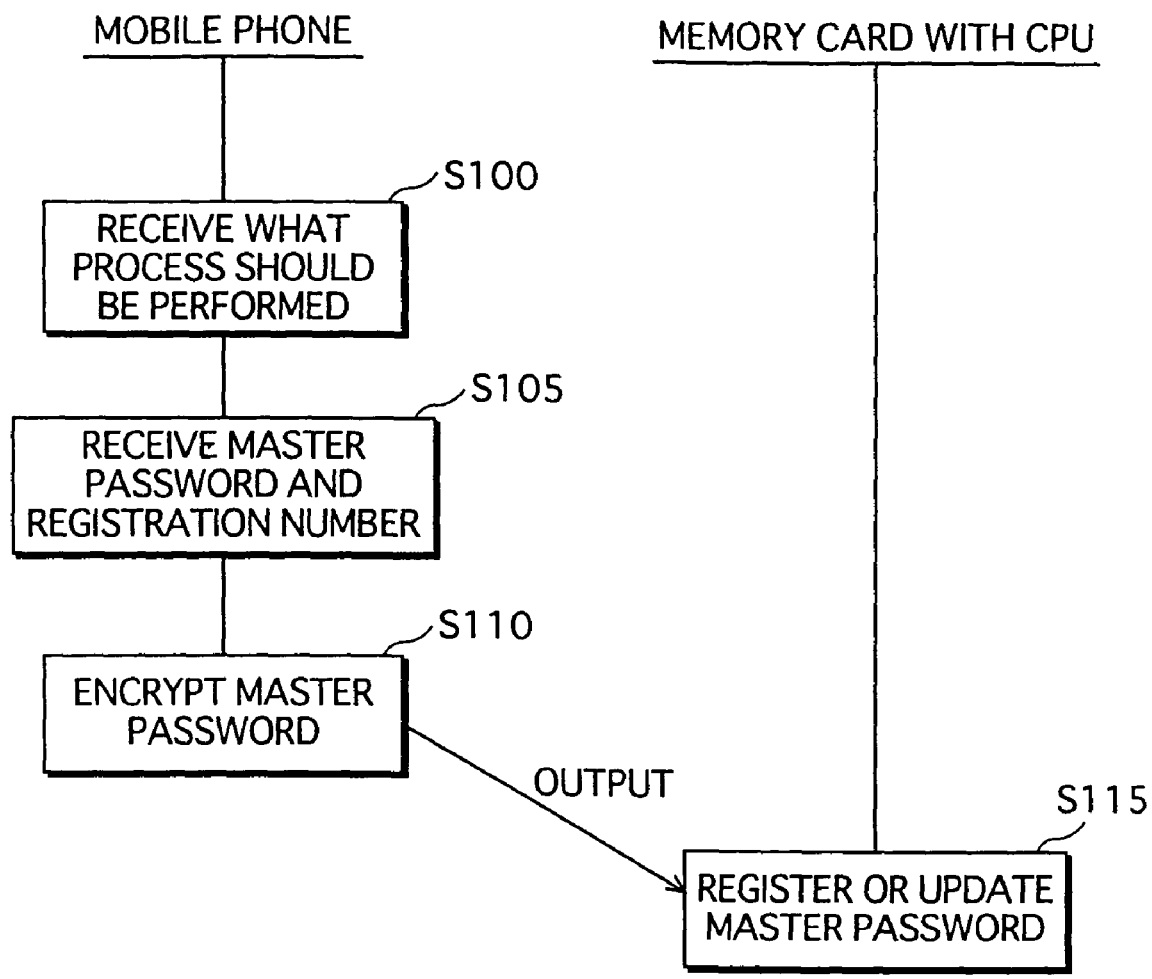
FIG. 6 is a flow chart that shows the operations for registering and changing a master password in the password recovery system 1.

The following explains the general outline of the operations for registering the master password, with reference to the flow chart in FIG. 6.

The mobile phone 20 receives information on what process should be performed, which is either a new registration or a change (Step S100). Then, the mobile phone 20 receives the master password and the registration number from the user (Step S105), encrypts the received master password with the received registration number being an encryption key, and outputs, to the memory card with CPU 10, the master encryption information that includes (i) what process should be performed and (ii) the encrypted master password (Step S110).

With use of the received master encryption information, the memory card with CPU 10 newly registers the master password in the case of a new registration, and updates the master password in the case of a change (Step S115).

(3) General Outline of Operations at Times of Registering a Service Password

Figure 7:
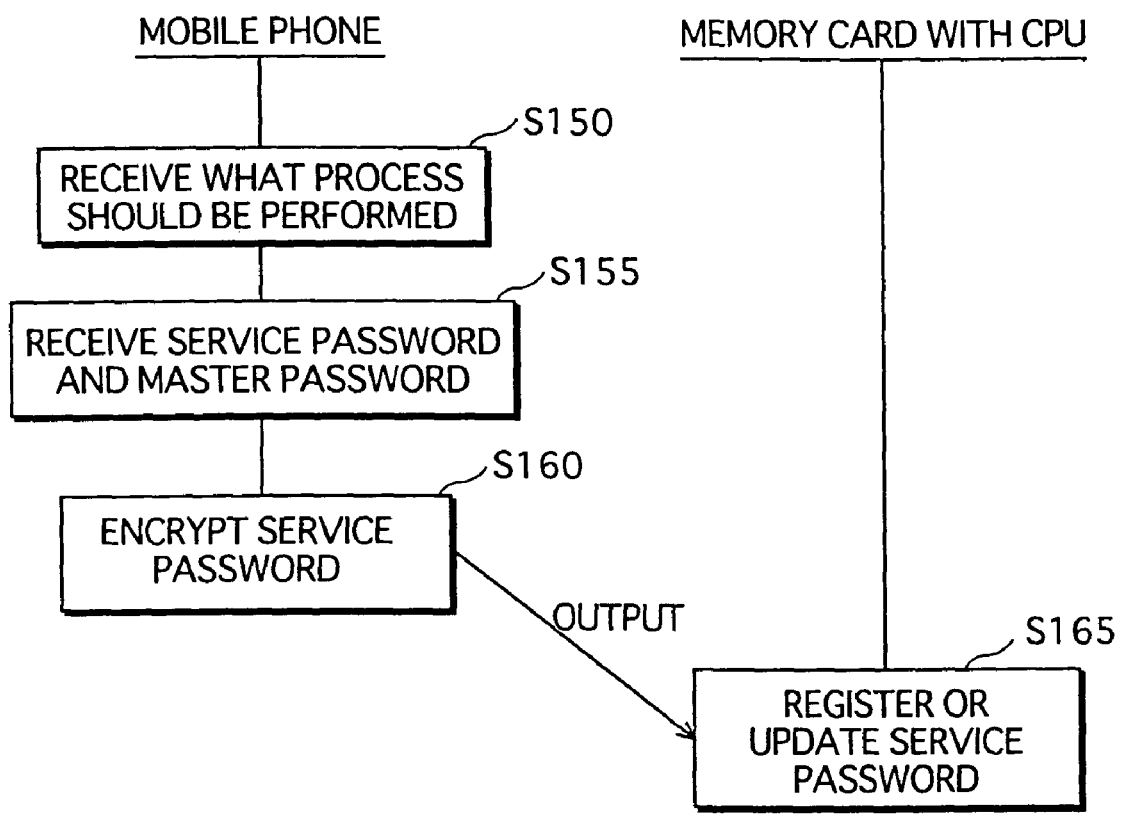
FIG. 7 is a flow chart that shows the operations for registering and changing a service password in the password recovery system 1.

The following explains the general outline of the operations for registering the service password, with reference to the flow chart in FIG. 7.

The mobile phone 20 receives an instruction indicating what process should be performed, which is either a new registration or a change (Step S150). Next, the mobile phone 20 receives the service password, the name of the network service, and the master password from the user (Step S155), encrypts the received service password with the received master password being an encryption key, and outputs, to the memory card with CPU 10, service encryption information that includes (i) what process should be performed (ii) the name of the network service, and (iii) the encrypted service password (Step S160).

With use of the received service encryption information, the memory card with CPU 10 makes an addition to the service password registration table 300 in the case of a new registration, and updates a corresponding record in the case of a change (Step S165).

(4) General Outline of Operations at Times of Password Recovery

Figure 8:
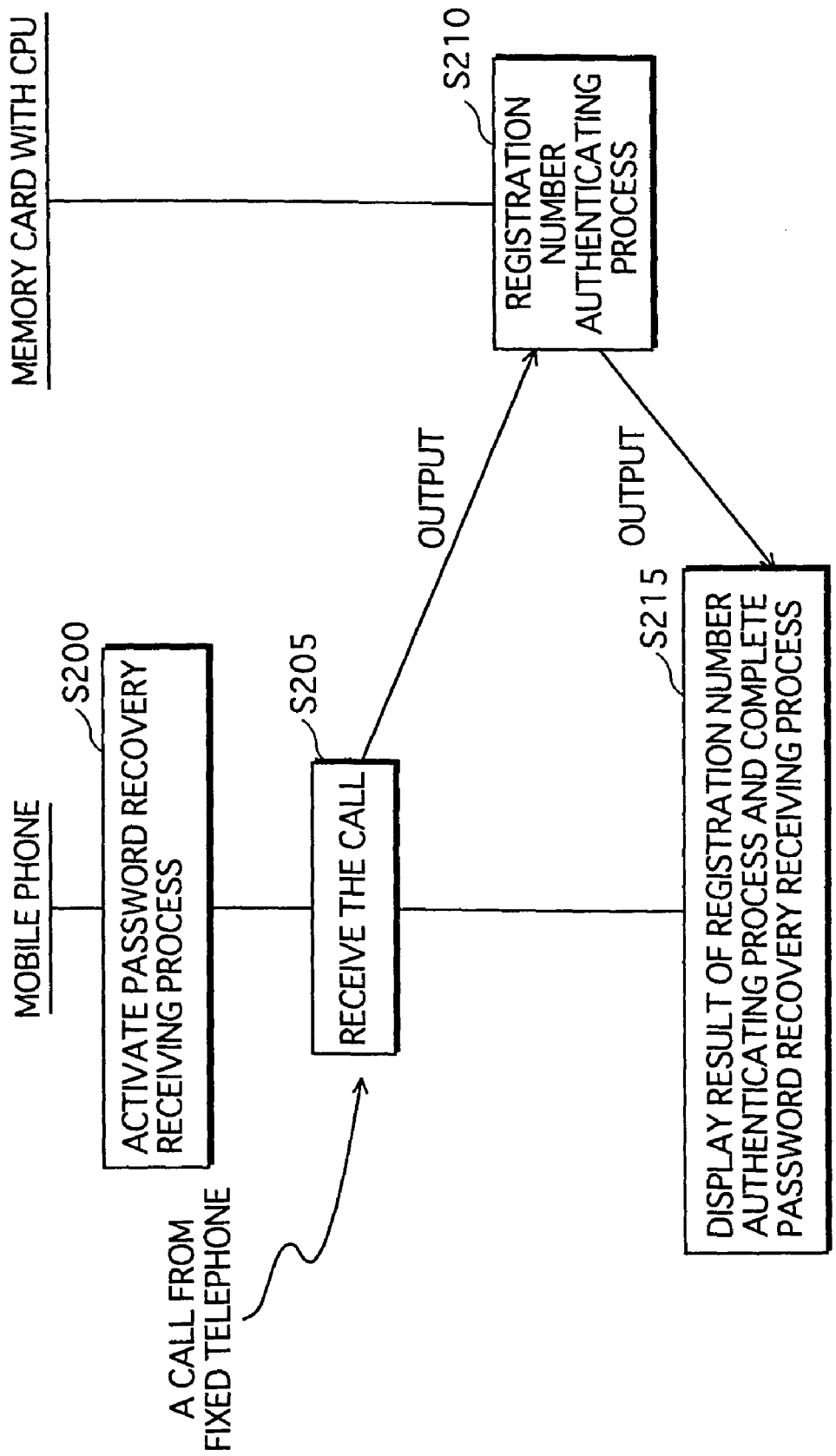
FIG. 8 is a flow chart that shows the operations for having the master password recovered in the password recovery system 1.

The following explains the general outline of the operations for having the password recovered, with reference to the flow chart in FIG. 8.

The mobile phone 20 receives an instruction to have a password recovered from the user, and causes activation of the password recovery receiving process performed by the password recovery receiving unit 205 (Step S200).

Next, the mobile phone 20 receives a call from the phone line whose telephone number is registered as the registration number, and obtains the received number from the received call, and outputs the obtained received number to the memory card with CPU 10 (Step S205).

The memory card with CPU 10 performs the authenticating process to judge if it is acceptable to have the password recovered, with use of the received number that has been received and the registration number that is stored in the password recovery management storing unit 101. After the authenticating process is performed, when it is acceptable to have the password recovered, the memory card with CPU 10 outputs the decrypted master password to the mobile phone 20 via the input/output unit 110. When it is not acceptable to have the password recovered, the memory card with CPU 10 outputs recovery prohibiting information to the mobile phone 20 via the input/output unit 110 (Step S210).

The mobile phone 20 displays, on the displaying unit 204, the master password or the recovery prohibiting information, which has been received from the memory card with CPU 10, so as to complete the password recovery receiving process (Step S215).

Figure 9:
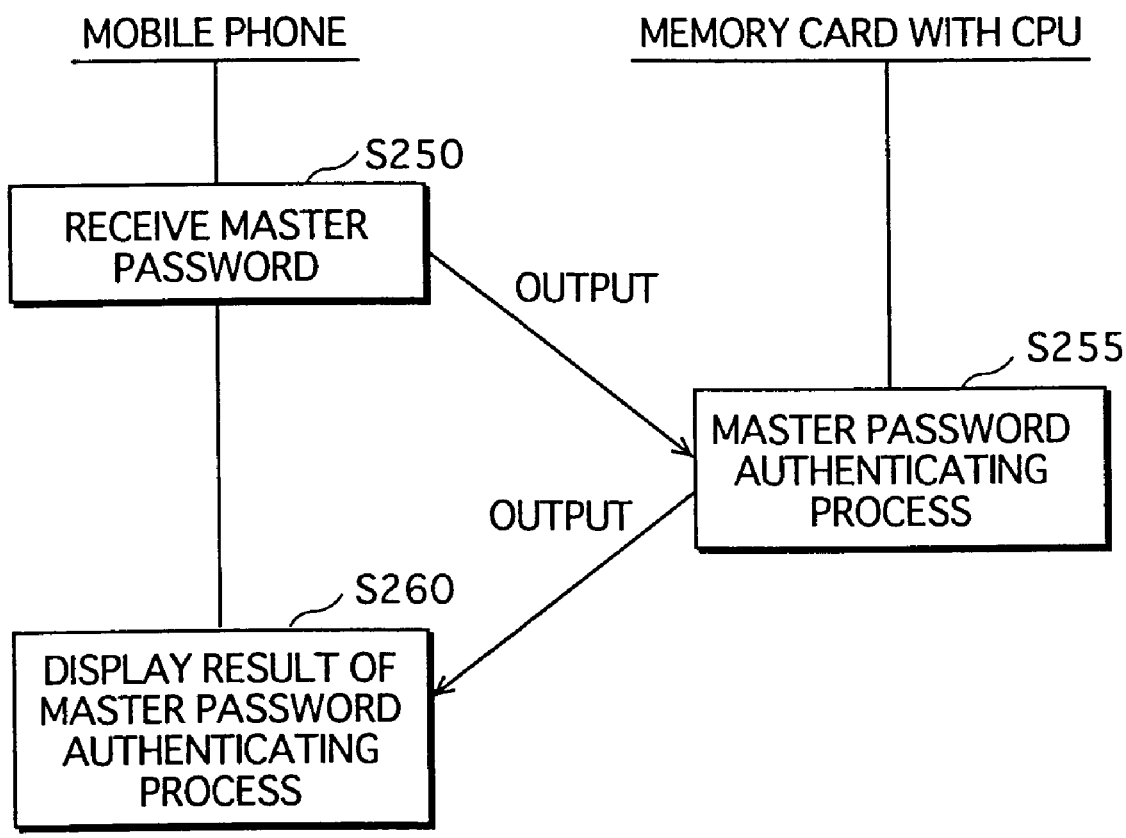
FIG. 9 is a flow chart that shows the operations for using a master password in the password recovery system 1.

(5) General Outline of Operations at Times of Authenticating the Master Password The following explains the general outline of the operations for authenticating the master password, with reference to the flow chart in FIG. 9.

The mobile phone 20 receives the input of the master password from the user through the key inputting unit 202, and outputs the received master password to the memory card with CPU 10 (Step S250).

Next, the memory card with CPU 10 decrypts the encrypted master password stored in the master password storing unit 102 with the registration number being a decryption key, and performs the master password authenticating process to judge if it is acceptable to receive the master password, with use of the decrypted master password and the master password received from the mobile phone 20. After the authenticating process is performed, when it is acceptable to receive the master password, the memory card with CPU 10 outputs the reception permitting information to the mobile phone 20 via the input/output unit 110. When it is not acceptable to receive the master password, the memory card with CPU 10 outputs reception prohibiting information to the mobile phone 20 via the input/output unit 110 (Step S255).

The mobile phone 20 displays, on the displaying unit 204, the reception permitting information or the reception prohibiting information which has been received form the memory card with CPU 10 (Step S260).

(6) General Outline of Operations at Times of Obtaining a Service Password

Figure 10:
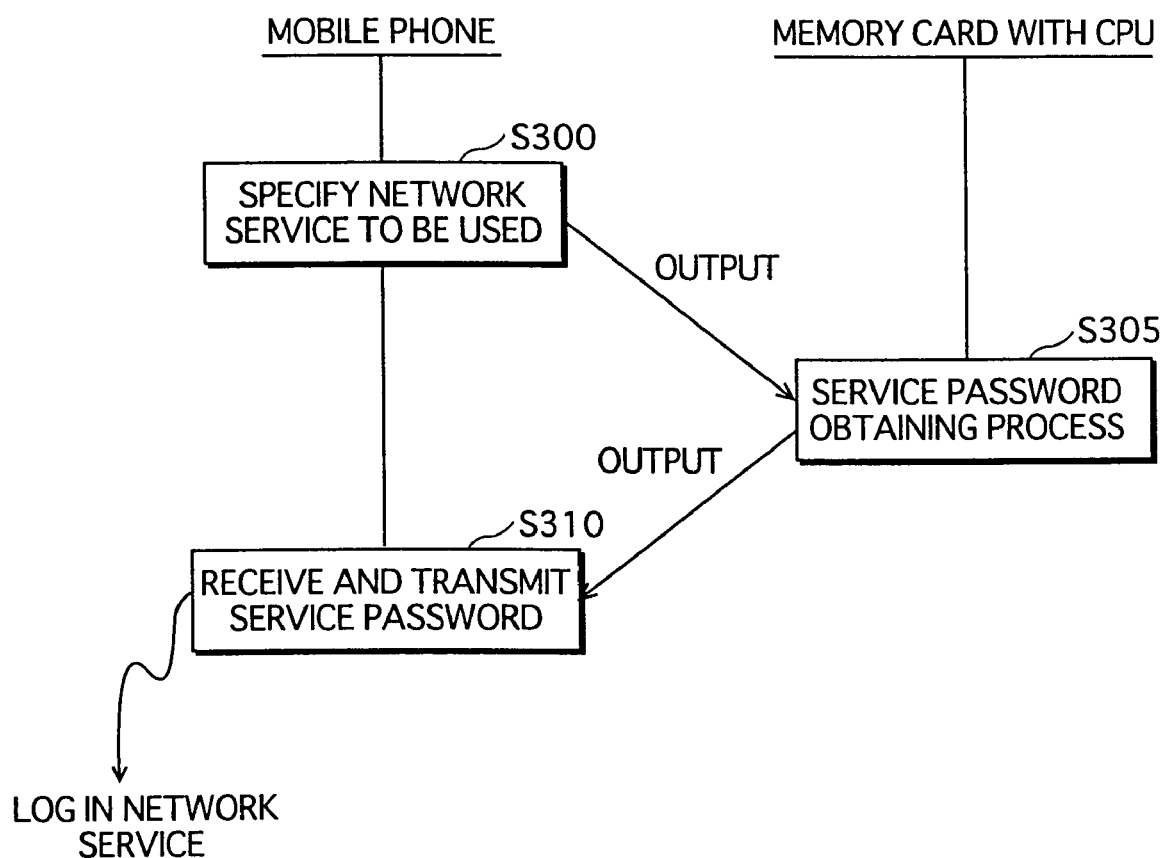
FIG. 10 is a flow chart that shows the operations for using network services in the password recovery system 1.

The following explains the general outline of the operations for obtaining a service password, with reference to FIG. 10.

The mobile phone 20 receives the service identifying information from the user through the key inputting unit 202, and outputs the received service identifying information to the memory card with CPU 10 via the input/output unit 207 (Step S300).

The memory card with CPU 10 performs the service password obtaining process with use of the received service identifying information, and outputs, to the mobile phone 20 via the input/output unit 110, the decrypted service password which is required when the user tries to log in the network service (Step S305).

The mobile phone 20 transmits the decrypted service password that has been received from the memory card with CPU 10 to the network service via the transmitting/receiving unit 201 so that a log in can be performed (Step S310).

Thereafter, the user will be able to receive the services from the network service.

1.5 Operations During the Registration Number Authenticating Process

Figure 11:
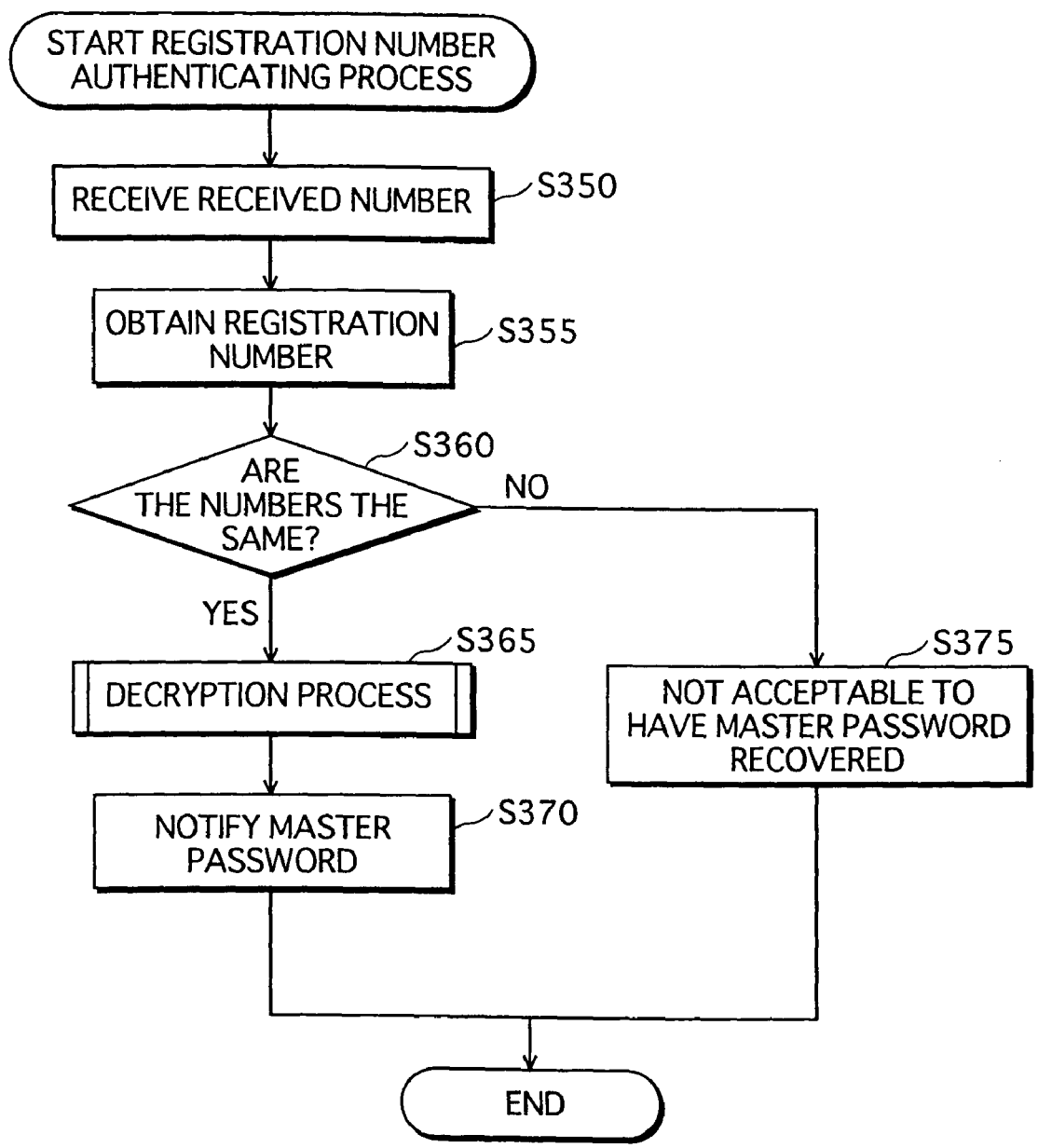
FIG. 11 is a flow chart that shows the operations during the registration number authenticating process in the password recovery system 1.

The following explains the operations during the registration number authenticating process which is performed by the memory card with CPU 10 when the master password needs to be recovered, with reference to the flow chart in FIG. 11.

The password recovery authenticating unit 106 receives the received number from the mobile phone 20 (Step S350). Next, the password recovery authenticating unit 106 reads the registration number from the password recovery management storing unit 101 (Step S355), so as to judge whether the read registration number and the received number are the same or not (Step S360).

When they are the same, the password recovery authenticating unit 106 outputs the recovery permitting information to the decrypting unit 109 so that the decrypting unit 109 performs the decryption process (Step S365). The password recovery authenticating unit 106 receives the master password that has been decrypted by the decrypting unit 109, and outputs the decrypted master password to the mobile phone 20 (Step S370).

When they are not the same, the password recovery authenticating unit 106 outputs the recovery prohibiting information to the mobile phone 20 (Step S375).

1.6 Operations During the Master Password Authenticating Process

Figure 12:
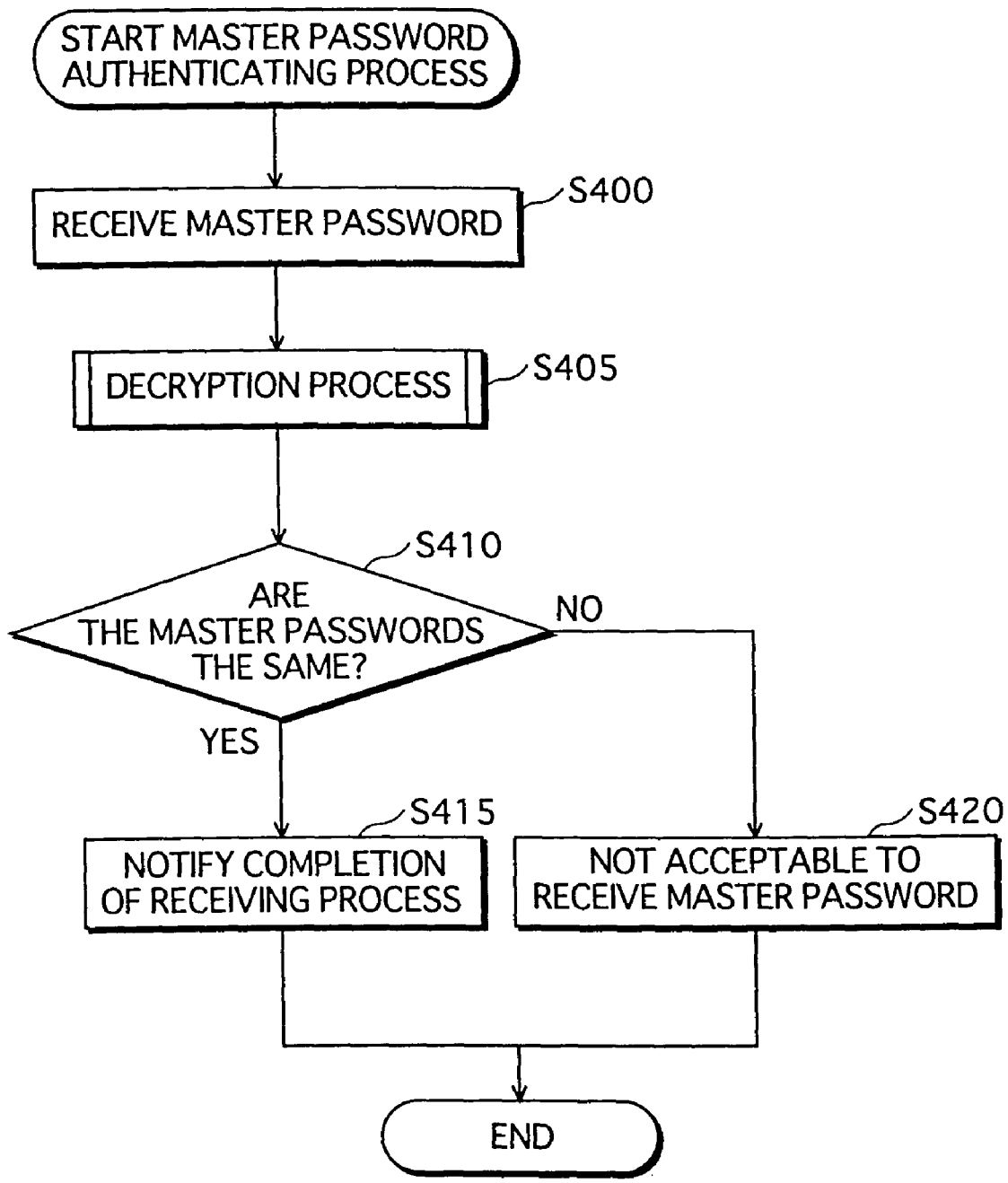
FIG. 12 is a flow chart that shows the operations during the master password authenticating process in the password recovery system 1.

The following explains the operations during the master password authenticating process which is performed by the memory card with CPU 10 when the master password needs to be used, with reference to the flow chart in FIG. 12.

The master password authenticating unit 107 receives the master password from the mobile phone 20 (Step S400).

Next, the master password authenticating unit 107 outputs the master decryption information to the decrypting unit 109 so that the decrypting unit 109 performs the decryption process (Step S405).

Then, the master password authenticating unit 107 receives the decrypted master password from the decrypting unit 109, and judges whether the received master password and the master password that has been received from the mobile phone 20 are the same or not (Step S410).

When they are the same, the master password authenticating unit 107 outputs the reception permitting information for the master password to the mobile phone 20 (Step S415). When they are not the same, the master password authenticating unit 107 outputs the reception prohibiting information for the master password to the mobile phone 20 (Step S420).

1.7 Operations During the Service Password Obtaining Process

Figure 13:
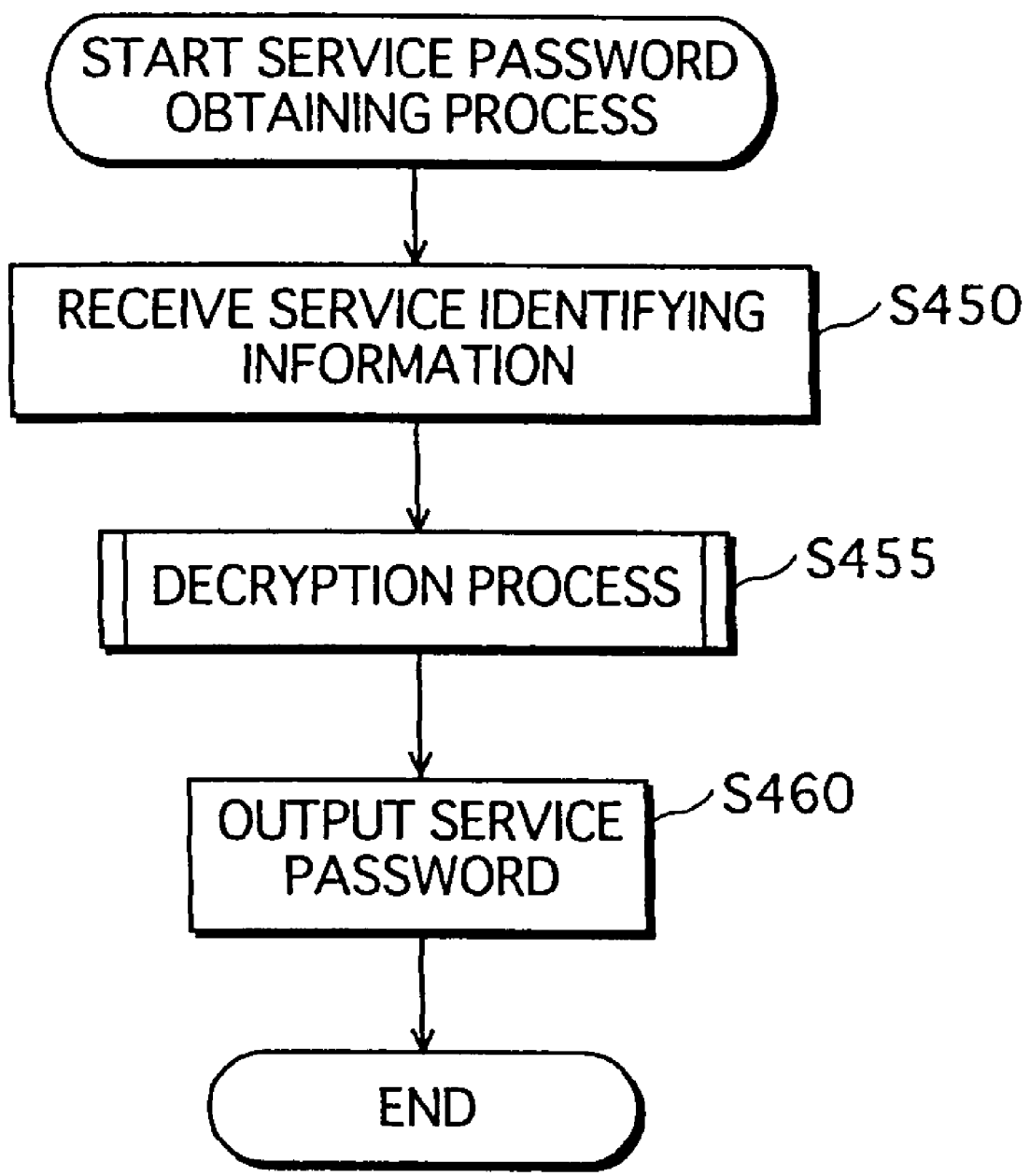
FIG. 13 is a flow chart that shows the operations during the service password obtaining process in the password recovery system 1.

The following explains the operations during the service password obtaining process which is performed by the memory card with CPU 10 when the network service needs to be used, with reference to the flow chart in FIG. 13.

The service password obtaining unit 108 receives the service identifying information from the mobile phone 20 (Step S450).

The service password obtaining unit 108 generates service decryption information with use of the received service identifying information, and outputs the generated service decryption information to the decrypting unit 109 so that the decrypting unit 109 performs the decryption process (Step S455).

Next, the service password obtaining unit 108 receives the decrypted service password from the decrypting unit 109, and outputs the received service password to the mobile phone 20 (Step S460).

1.8 Operations During the Decryption Process

Figure 14:
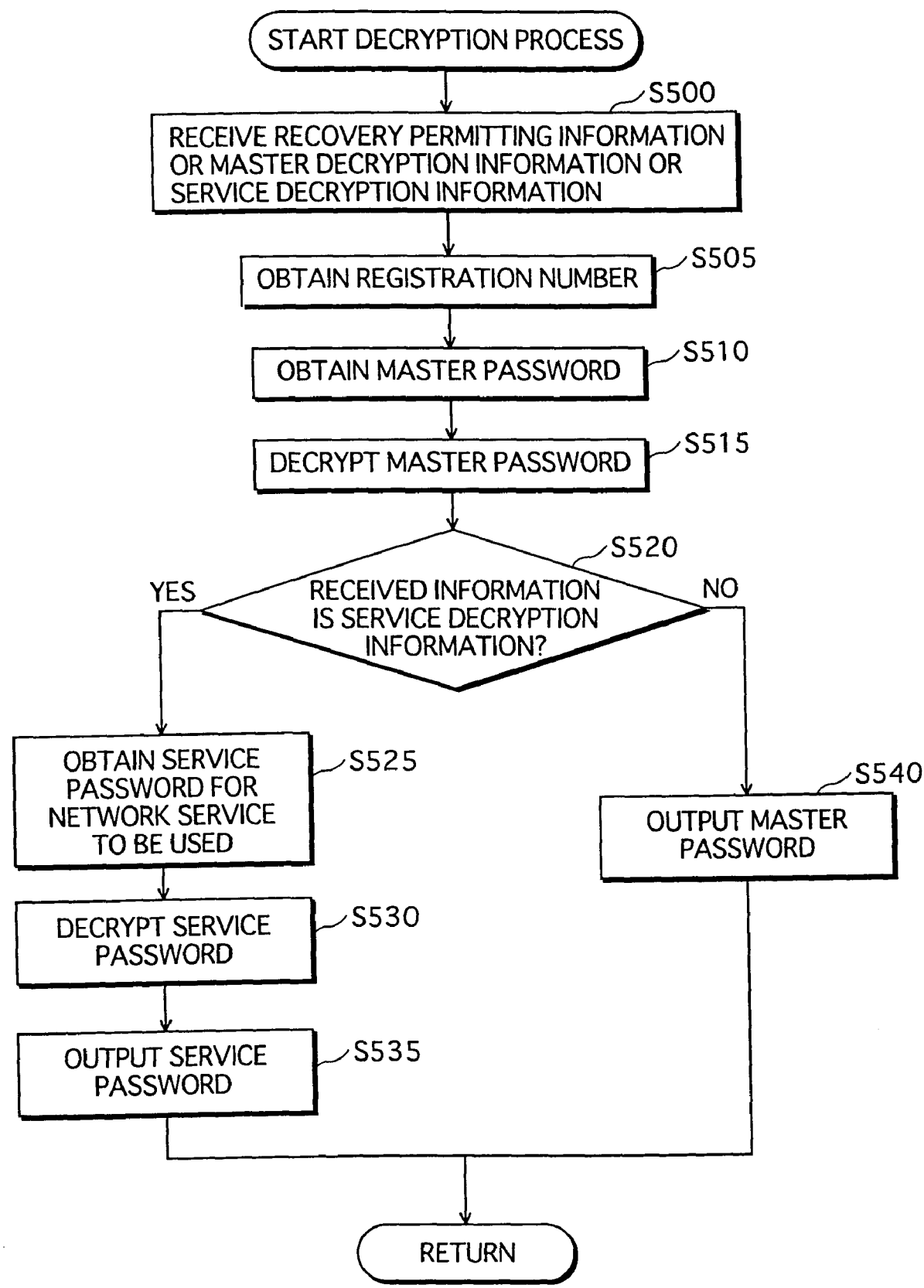
FIG. 14 is a flow chart that shows the operations during the decryption process in the password recovery system 1.

The following explains the operations during the decryption process, with reference to the flow chart in FIG. 14.

The decrypting unit 109 receives one of recovery permitting information, master decryption information and service decryption information from one of the password recovery authenticating unit 106, the master password authenticating unit 107, and the service password obtaining unit 108 (Step S500).

The decrypting unit 109 reads the registration number from the password recovery management storing unit 101 (Step S505), and then reads the encrypted master password from the master password storing unit 102 (Step S510).

The decrypting unit 109 decrypts the encrypted master password with the read registration number being a decryption key (Step S515).

Then, the decrypting unit 109 judges if the received information is service decryption information or not (Step S520).

When it is service decryption information, the decrypting unit 109 obtains the corresponding record from the service password registration table 300 in the service password storing unit 103 (Step S525). The decrypting unit 109 decrypts the encrypted service password stored in the obtained record, with the decrypted master password being a decryption key (Step S530), and outputs the decrypted service password to the service password obtaining unit 108 (Step S535).

When the information is not service decryption information, the decrypting unit 109 outputs the decrypted master password to either the password recovery authenticating unit 106 or the master password authenticating unit 107 (Step S540).

1.9 Modification of First Embodiment

The following explains the password recovery system 1A which is a modification example of the first embodiment.

Structure of the Password Recovery System 1A

Figure 15:
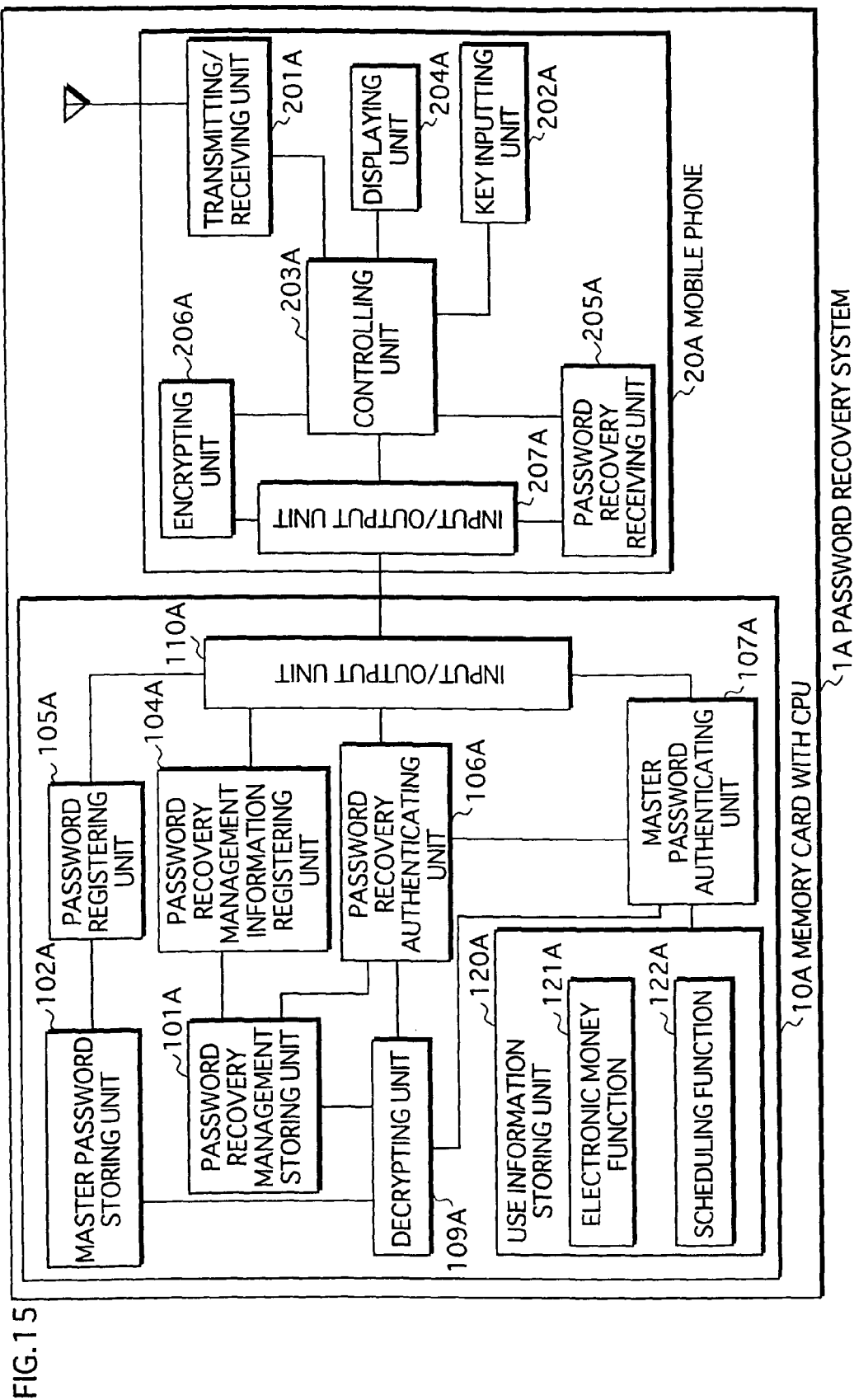
FIG. 15 is a block diagram that shows the structure of the password recovery system 1A.

The password recovery system 1A comprises the memory card with CPU 10A and the mobile phone 20A as shown in FIG. 15, and uses the caller's telephone number notifying service in order to have a password recovered, like the password recovery system 1.

When a user has forgotten a password and needs to use a function managed with the password, the user inserts the memory card with CPU 10A into the mobile phone 20A, and has a phone call made from a fixed telephone to the mobile phone 20A.

The mobile phone 20A notifies the memory card with CPU 10A with (i) the telephone number obtained via the caller's telephone number notifying service and (ii) information that identifies the function that the user wishes to use.

The memory card with CPU 10A judges whether or not the received telephone number and the telephone number stored in advance are the same, and when they are the same, the memory card with CPU 10A reads the password that is stored therein in advance and causes activation of the function the user wishes to use, using the read password.

Normally, having received the information that identifies the function to be used and the password, the password recovery system 1A causes activation of the function to be used by the user, if the received password is a legitimate one. Here, this password will be referred to as a master password.

Structure of the Memory Card with CPU 10A

The following explains the structure of the memory card with CPU 10A.

As shown in FIG. 15, the memory card with CPU 10A comprises a password recovery management storing unit 101A, a master password storing unit 102A, a password recovery management information registering unit 104A, a password registering unit 105A, a password recovery authenticating unit 106A, a master password authenticating unit 107A, a decrypting unit 109A, an input/output unit 110A, and a use information storing unit 120A.

More specifically, the memory card with CPU 10A is a computer system comprising a microprocessor, a ROM, a RAM, and the like. The ROM stores therein one or more computer programs. The functions of the memory card with CPU 10A are realized when the microprocessor operates according to the computer programs.

(1) The Use Information Storing Unit 120A

The use information storing unit 120A has an electronic money function 121A and a scheduling function 122A.

The electronic money function 121A is a function that provides digital data with monetary value and allows the user to purchase goods on the Internet. The scheduling function 122A is a function that records and manages the user's schedule.

(2) The Password Recovery Management Storing Unit 101A

Explanation will be omitted since the password recovery management storing unit 101A is the same as the password recovery management storing unit 101.

(3) The Master Password Storing Unit 102A

The master password storing unit 102A stores therein a master password that is encrypted with the registration number being an encryption key, the registration number having been stored in the password recovery management storing unit 101A. The master password manages the electronic money function 121A and the scheduling function 122A that are stored in the use information storing unit 120A. When a user wishes to use one of the functions stored in the use information storing unit 120A, the user inputs information that identifies the function to be used and the master password.

When the registration number has been changed, the master password gets encrypted again with the post-change registration number being an encryption key, and the master password storing unit 102A stores therein the re-encrypted master password.

(4) The Password Recovery Management Information Registering Unit 104A

Explanation will be omitted since the password recovery management information registering unit 104A is the same as the password recovery management information registering unit 104.

(5) The Password Registering Unit 105A

The password registering unit 105A registers and updates the master password.

As for the registration and the update of the master password, explanation will be omitted since they are the same as the registration and the update of the master password performed by the password registering unit 105.

(6) The Password Recovery Authenticating Unit 106A

When the master password needs to be recovered, the password recovery authenticating unit 106A receives, from the mobile phone 20A via the input/output unit 110A, the received number and function identifying information that identifies one of the functions stored in the use information storing unit 120A to be used.

Next, the password recovery authenticating unit 106A reads the registration number from the password recovery management storing unit 101A and judges if the read registration number and the received number are the same or not.

When the registration number and the received number are the same, the password recovery authenticating unit 106A outputs, to the decrypting unit 109A, recovery permitting information that includes information for instructing decryption of the master password.

Then, the password recovery authenticating unit 106A receives the decrypted master password from the decrypting unit 109A, and outputs the received decrypted master password and the function identifying information received from the mobile phone 20A to the master password authenticating unit 107A.

When the registration number and the received number are not the same, the password recovery authenticating unit 106A outputs recovery prohibiting information that includes information for prohibiting the recovery, to the mobile phone 20A via the input/output unit 11A.

(7) The Master Password Authenticating Unit 107A

The master password authenticating unit 107A receives the master password and the function identifying information from the mobile phone 20A via the password recovery authenticating unit 106A or the input/output unit 110A.

Next, the master password authenticating unit 107A outputs master decryption information that includes information for instructing decryption of the master password to the decrypting unit 109A.

Then, the master password authenticating unit 107A receives the decrypted master password from the decrypting unit 109A and judges if the received decrypted master password and the master password received from the password recovery authenticating unit 106A or the mobile phone 20A are the same or not.

When they are the same, the master password authenticating unit 107A causes activation of the function that corresponds to the received function identifying information. For example, when the function identifying information is the one that indicates the electronic money function 121A, the master password authenticating unit 107A causes activation of the electronic money function 121A. When they are not the same, the master password authenticating unit 107A outputs reception prohibiting information that includes information for prohibiting reception to the mobile phone 20A via the input/output unit 110A.

(8) The Decrypting Unit 109A

The decrypting unit 109A performs the decryption process for the encrypted master password.

Since this decryption process of the master password is the same as the decryption process of the master password performed by the decrypting unit 109, explanation will be omitted.

(9) The Input/Output Unit 110A

The input/output unit 110A outputs information received from the mobile phone 20A to each of the password recovery management information registering unit 104A, the password registering unit 105A, the password recovery authenticating unit 106A, and the master password authenticating unit 107A.

The input/output unit 110A outputs, to the mobile phone 20A, information received from each of the password recovery management information registering unit 104A, the password recovery authenticating unit 106A, and the master password authenticating unit 107A.

Structure of the Mobile Phone 20A

The following explains the structure of the mobile phone 20A.

As shown in FIG. 15, the mobile phone 20A comprises a transmitting/receiving unit 201A, a key inputting unit 202A, a controlling unit 203A, a displaying unit 204A, a password recovery receiving unit 205A, an encrypting unit 206A, and an input/output unit 207A.

More specifically, the mobile phone 20A is a computer system comprising a microprocessor, a ROM, a RAM, a display unit, and the like. The ROM stores therein one or more computer programs. The functions of the mobile phone 20A are realized when the microprocessor operates according to the computer programs.

Like a conventional mobile phone, the mobile phone 20A includes a speaker unit, a microphone unit, a calling unit, a memory unit, and the like so as to perform operations as a normal mobile phone.

(1) The Transmitting/Receiving Unit 201A

Explanation will be omitted since the transmitting/receiving unit 201A is the same as the transmitting/receiving unit 201.

(2) The Key Inputting Unit 202A

The key inputting unit 202A includes dial keys, function keys, and control keys. When the registration number needs to be registered or changed, the key inputting unit 202A receives the input of the registration number, and outputs the received registration number to the controlling unit 203A. When the registration number needs to be changed, in order to encrypt the master password again after the registration number has been changed, the key inputting unit 202A receives master plaintext information that includes (i) what process should be performed, which is a change, (ii) the master password, and (iii) the registration number, and outputs the received master plaintext information to the controlling unit 203A.

When one of the electronic money function 121A and the scheduling function 122A that are stored in the use information storing unit 120A is to be used, the key inputting unit 202A receives inputs of the master password and the function identifying information, and outputs them to the controlling unit 203A.

When the master password needs to be recovered, the key inputting unit 202A receives the instruction to have the password recovered and the function identifying information from the user, and outputs them to the controlling unit 203A.

When the master password needs to be registered or changed, the key inputting unit 202A receives the master plaintext information that includes (i) what process should be performed, which is either a new registration or a change, (ii) the master password, and (iii) the registration number, and outputs the received master plaintext information to the controlling unit 203A.

The key inputting unit 202A also performs key operations that are the same as those of a conventional mobile phone.

(3) The Controlling Unit 203A

The controlling unit 203A performs the overall operational control of the mobile phone 20A.

(a) To Register or Change the Registration Number

Explanation will be omitted since registration and change of the registration number are the same as those performed by the controlling unit 203.

(b) To have the Master Password Recovered

When the password needs to be recovered, the controlling unit 203A receives a master password recovery instruction and function identifying information from the key inputting unit 202A and causes activation of the password recovery receiving process performed by the password recovery receiving unit 205A, according to the received master password recovery instruction. Then, the controlling unit 203A outputs the received number which has been received from the transmitting/receiving unit 201A and the function identifying information which has been received from the key inputting unit 202A to the password recovery receiving unit 205A so as to complete the password recovery receiving process.

Having received recovery prohibiting information from the memory card with CPU 10A via the input/output unit 207A, the controlling unit 203A outputs the received recovery prohibiting information to the displaying unit 204A.

(c) To Use a Function in the Use Information Storing Unit 120A

When one of the electronic money function 121A and the scheduling function 122A needs to be used, the controlling unit 203A receives the master password and the function identifying information from the key inputting unit 202A, and outputs them to the memory card with CPU 10A via the input/output unit 207A.

Having received reception prohibiting information from the memory card with CPU 10A via the input/output unit 207A, the controlling unit 203A outputs the received reception prohibiting information to the displaying unit 204A.

(d) To Register or Change the Master Password

Explanation will be omitted since registration and change of the master password are the same as those performed by the controlling unit 203.

(4) The Displaying Unit 204A

When the registration number needs to be changed, the displaying unit 204A receives the master input instruction information from the controlling unit 203A and, using the received master input instruction information, displays a screen in which the master password and the registration number are to be inputted, and prompts the user to input them.

Having received recovery prohibiting information from the controlling unit 203A, the displaying unit 204A displays the received recovery prohibiting information.

Having received reception prohibiting information from the controlling unit 203A, the displaying unit 204A displays the received reception prohibiting information.

The displaying unit 204A also displays other screens that are the same as those of a conventional mobile phone.

(5) The Password Recovery Receiving Unit 205A

The password recovery receiving unit 205A gets activated by the controlling unit 203A when a password needs to be recovered, and receives the received number and the function identifying information from the controlling unit 203A, and outputs them to the memory card with CPU 10A via the input/output unit 207A.

(6) The Encrypting Unit 206A

When the master password needs to be registered or changed, the encrypting unit 206A receives the master plaintext information from the controlling unit 203A, and encrypts the master password with the registration number being an encryption key, so as to generate master encryption information. Then, the encrypting unit 206A outputs the master encryption information to the memory card with CPU 1A via the input/output unit 207A.

(7) The Input/Output Unit 207A

The input/output unit 207A outputs information received from the memory card with CPU 10A to the controlling unit 203A.

The input/output unit 207A also outputs, to the memory card with CPU 10A, information received from the controlling unit 203A, the password recovery receiving unit 205A, or the encrypting unit 206A.

General Outline of Operations of the Password Recovery System 1A

The following explains the general outline of the operations of the password recovery system 1A.

(1) General Outline of Operations at Times of Registering a Registration Number

Explanation will be omitted since the general outline of the operations for registering the registration number is the same as the one shown in the flow charts of FIGS. 4 and 5.

(2) General Outline of Operations at Times of Registering the Master Password

Explanation will be omitted since the general outline of the operations for registering the master password is the same as the one shown in the flow chart of FIG. 6.

(3) General Outline of Operations at Times of Password Recovery

Figure 16:
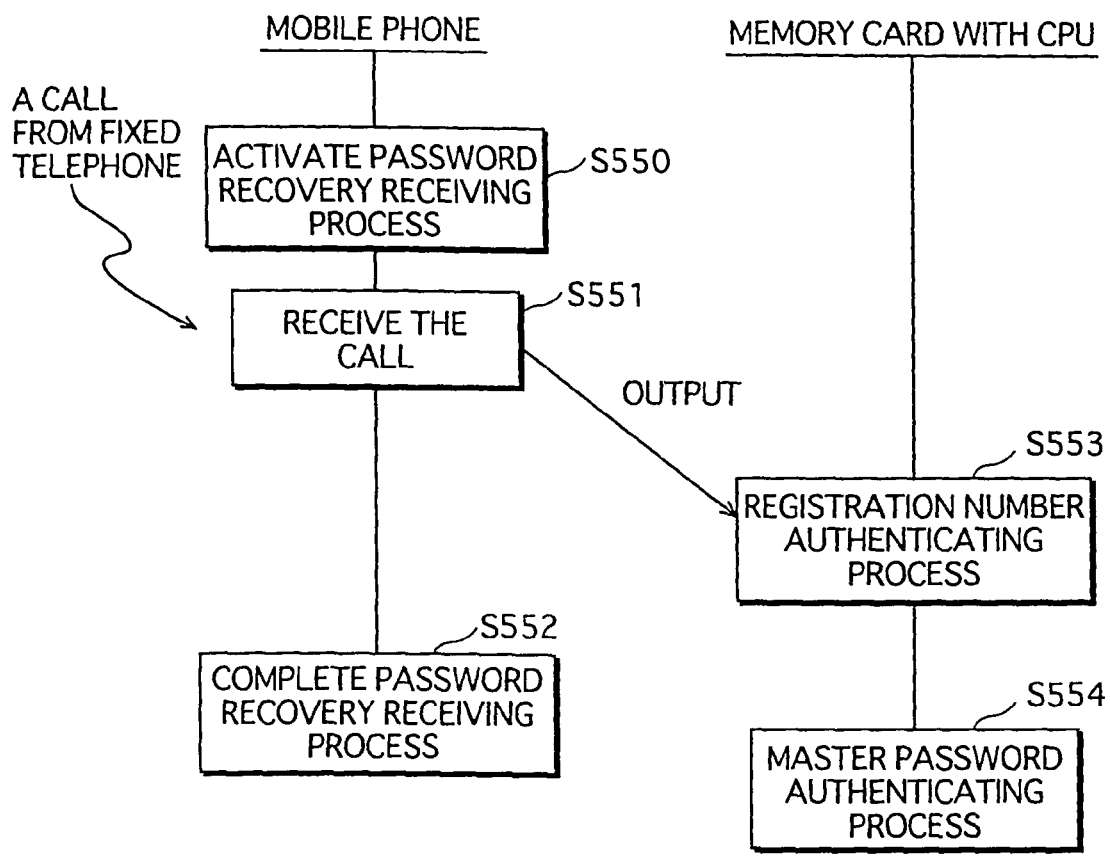
FIG. 16 is a flowchart that shows the operations for having the master password recovered in the password recovery system 1A.

The following explains the general outline of the operations for having the password recovered, with reference to the flow chart in FIG. 16.

The mobile phone 20A receives a master password recovery instruction and function identifying information from the user, and causes activation of the password recovery receiving process performed by the password recovery receiving unit 205A (Step S550).

Next, the mobile phone 20A receives a call from the phone line whose telephone number is registered as the registration number, and obtains the received number from the received call, and outputs the obtained received number and the function identifying information received in Step S550 to the memory card with CPU 10A (Step S551), so as to complete the password recovery receiving process (Step S552).

The memory card with CPU 10A performs the authenticating process to judge if it is acceptable to have the password recovered, with use of the received number that has been received and the registration number that is stored in the password recovery management storing unit 101A. After the authenticating process is performed, when it is acceptable to have the password recovered, the memory card with CPU 10A outputs the decrypted master password to the master password authenticating unit 107A (Step S553). Then, the memory card with CPU 10A has the master password authenticating unit 107A perform the master password authenticating process, and causes activation of the function that corresponds to the function identifying information (Step S554).

When it is not acceptable to have the password recovered as a result of the authenticating process in Step S553, the memory card with CPU 10A outputs recovery prohibiting information to the mobile phone 20A via the input/output unit 110A, so that the mobile phone 20A outputs the recovery prohibiting information.

(4) Operations During the Registration Number Authenticating Process

Figure 17:
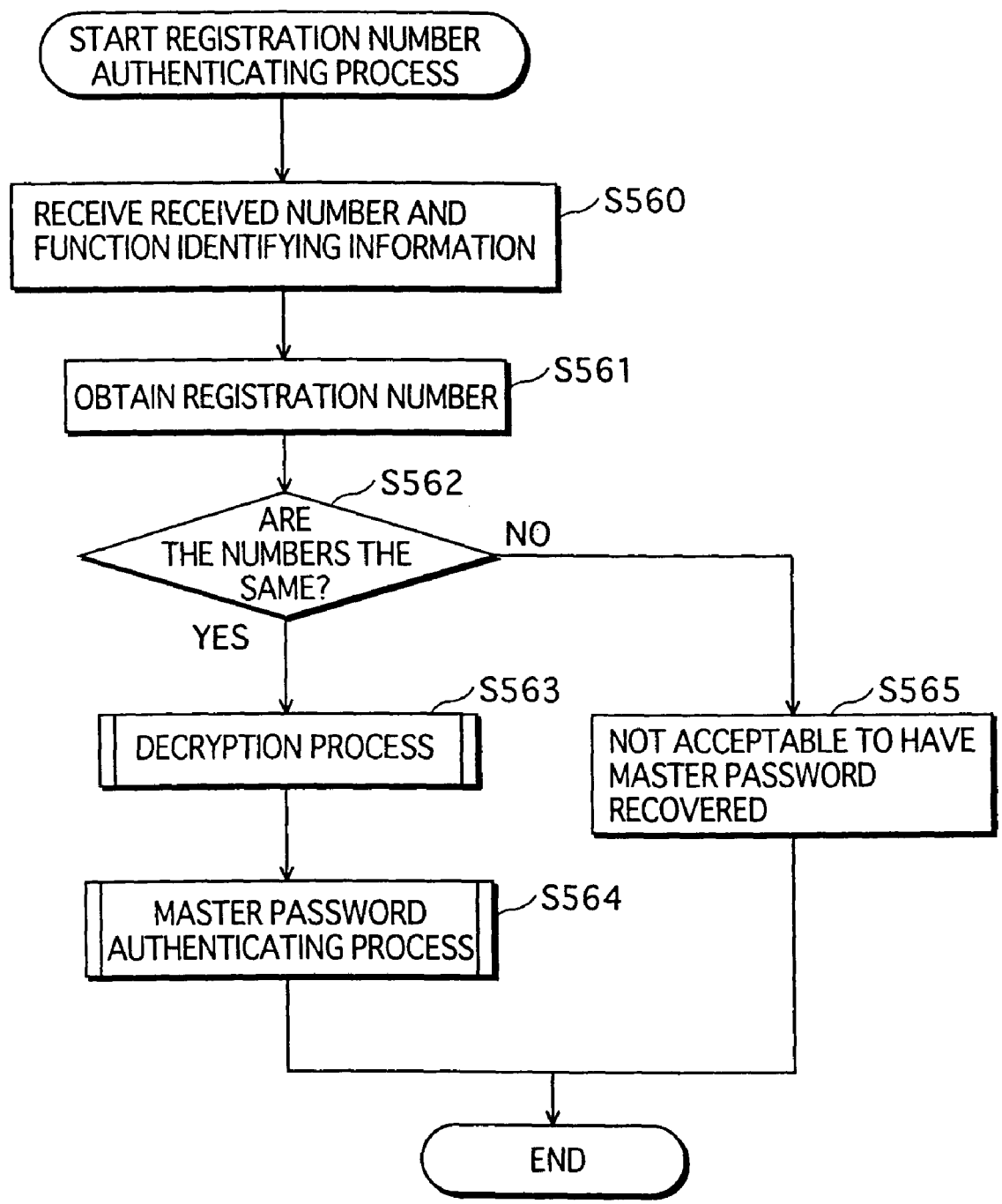
FIG. 17 is a flow chart that shows the operations during the registration number authenticating process in the password recovery system 1A.

The following explains the operations during the registration number authenticating process which is performed by the memory card with CPU 10A when the master password needs to be recovered, with reference to the flow chart in FIG. 17.

The password recovery authenticating unit 106A receives the received number and function identifying information from the mobile phone 20A (Step S560). Next, the password recovery authenticating unit 106A reads the registration number from the password recovery management storing unit 101A (Step S561), so as to judge whether the read registration number and the received number are the same or not (Step S562).

When they are the same, the password recovery authenticating unit 106A outputs the recovery permitting information to the decrypting unit 109A so that the decrypting unit 109A performs the decryption process (Step S563). The password recovery authenticating unit 106A receives the master password that has been decrypted by the decrypting unit 109A, and outputs the decrypted master password and the function identifying information to the master password authenticating unit 107A so that the master password authenticating unit 107A performs the master password authenticating process (Step S564).

When they are not the same, the password recovery authenticating unit 106A outputs the recovery prohibiting information to the mobile phone 20A (Step S565).

(5) Operations During the Master Password Authenticating Process

Figure 18:
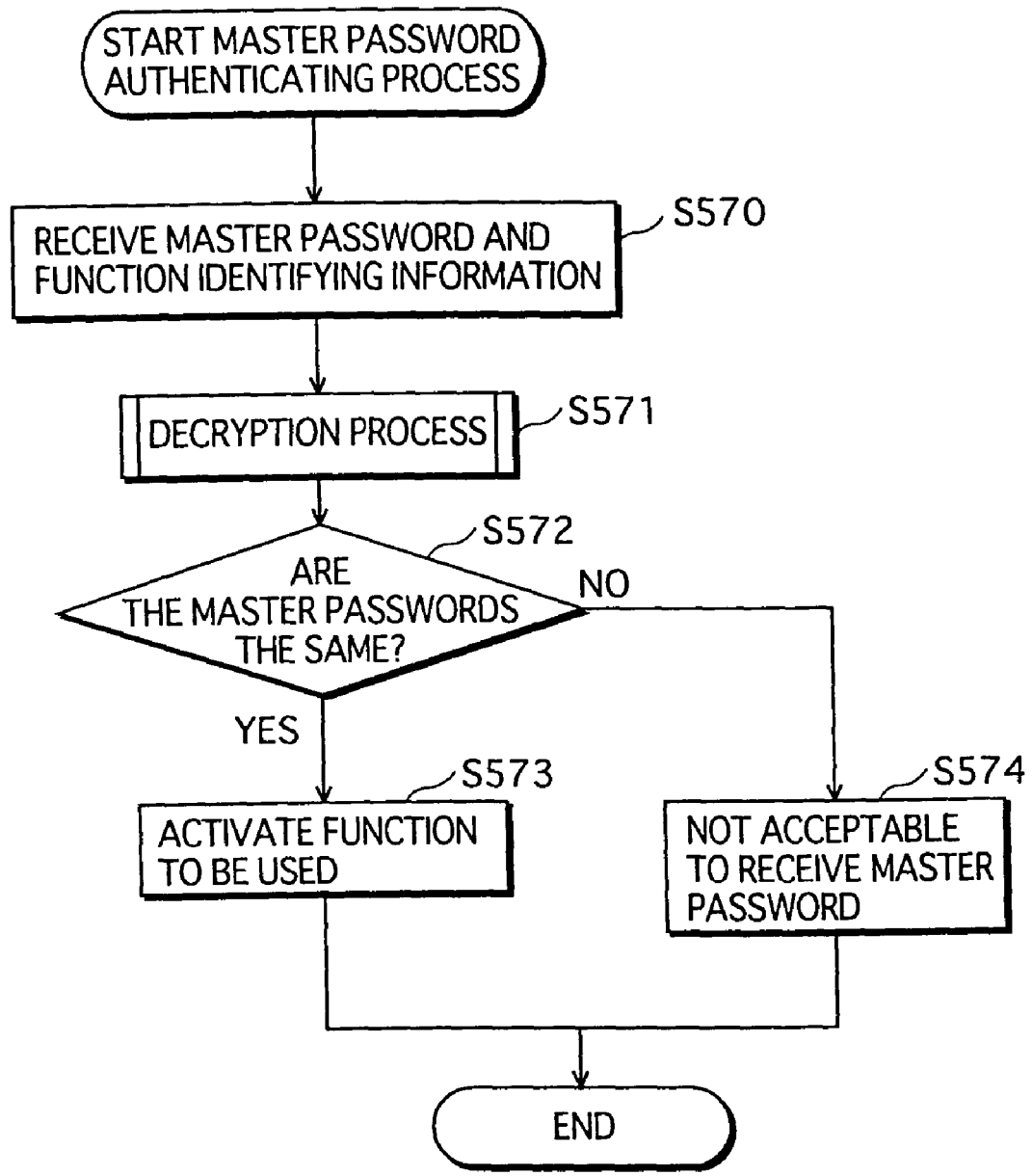
FIG. 18 is a flow chart that shows the operations during the master password authenticating process in the password recovery system 1A.

The following explains the operations during the master password authenticating process, with reference to the flowchart in FIG. 18.

The master password authenticating unit 107A receives the master password and the function identifying information from the password recovery authenticating unit 106A or the mobile phone 20A (Step S570).

Next, the master password authenticating unit 107A outputs the master decryption information to the decrypting unit 109A so that the decrypting unit 109A performs the decryption process (Step S571).

Then, the master password authenticating unit 107A receives the decrypted master password from the decrypting unit 109A, and judges whether the received master password and the master password that has been received from the password recovery authenticating unit 106A or the mobile phone 20A are the same or not (Step S572).

When they are the same, the master password authenticating unit 107A causes activation of the function that corresponds to the function identifying information that has been received from the password recovery authenticating unit 106A or the mobile phone 20A (Step S573). When they are not the same, the master password authenticating unit 107A outputs the reception prohibiting information for the master password to the mobile phone 20A (Step S574).

(6) Operations During the Decryption Process

The following explains particular differences in the operations during the decryption process, with reference to the flow chart in FIG. 14.

In Step S500, the difference is that either recovery permitting information or master decryption information is received.

Steps S520 through S535 should be deleted. In other words, the difference is that Step S540 follows Step S515.

It should be noted that in Step S540 the master password is outputted to either the password recovery authenticating unit 106A or the master password authenticating unit 107A.

Other Modification Examples

The embodiment and the modification so far explained are mere examples of the present invention. The present invention is not limited to the aforementioned embodiment and may be embodied in various modes within the scope of the gist of the invention. The following cases are also included in the present invention:

(1) In the password recovery system 1, it is also acceptable to use the registration number as the master password. In such a case, the master password will be recovered in the following manner:

At first, the memory card with CPU 10 receives the received number and judges whether the received number and the registration number are the same or not.

When they are the same, the mobile phone 20 displays the registration number. When they are not the same, the mobile phone 20 displays recovery prohibiting information.

Also, in the password recovery system 1A, it is acceptable to use the registration number as the master password, as well. In such a case, the master password will be recovered in the following manner:

At first, the memory card with CPU 10A receives the received number and function identifying information, and judges whether the received number and the registration number are the same or not.

When they are the same, the function that corresponds to the function identifying information will be activated. When they are not the same, the mobile phone 20A will display recovery prohibiting information.

(2) In the password recovery system 1, the master password is displayed after being decrypted; however, the present invention is not limited to this arrangement. It is also acceptable that the memory card with CPU 10 makes the service password storing unit 103 accessible after the master password is recovered, so that the service password becomes usable.

In the password recovery system 1A, the function that corresponds to function identifying information gets activated after the master password is recovered; however the present invention is not limited to this arrangement. It is also acceptable that the memory card with CPU 10A makes the function that corresponds to the function identifying information accessible after the master password is recovered, so that the function becomes usable.

(3) In the password recovery system 1A, it is also acceptable that the memory card with CPU 10A includes, in the use information storing unit 120A, a memory, which is an area for storing data files, and when the master password needs to be recovered, the memory card with CPU 10A receives the received number and function identifying information indicating that the memory is to be used, so that the memory unit becomes usable after the master password is recovered.

(4) In the password recovery system 1, the master password is stored after being encrypted with the registration number being an encryption key; however, the present invention is not limited to this arrangement. It is also acceptable to store the master password without encrypting it. In such a case, the master password storing unit 102 will be arranged to be a tamper-proof area. Also, it is acceptable to store service passwords without encrypting it. In such a case, the service password storing unit 103 will be arranged to be a tamper-proof area.

In the password recovery system 1A, it is acceptable to store the master password without encrypting it, as well. In such a case, the master password storing unit 102A will be arranged to be a tamper-proof area.

(5) It is also acceptable that the aforementioned embodiment and modification examples are combined.

1.10 Summary of First Embodiment

As explained so far, the password recovery system 1 has the telephone number of the phone line installed at the user's home set as the information to be required when the password needs to be recovered. Those who are able to use the fixed telephone connected to the phone line are limited to the user himself/herself and the user's family or housemates. It is normally impossible for others to use the fixed telephone, since it would require intrusion into the user's home. Thus, those who use the fixed telephone are able to identify that the password recovery is undoubtedly requested by the user, and to make a phone call to the user himself/herself; therefore, it is possible to enhance the security level when a password needs to be recovered. In this system, when a password has been forgotten and needs to be recovered, a phone call is made from the fixed telephone to the mobile phone 20. Then, the mobile phone 20 obtains the telephone number of the phone line connected to the fixed telephone, and judges if (i) the obtained telephone number and (ii) the telephone number registered in advance into the memory card with CPU 10 are the same or not, and only when they are the same, the user will be able to recover the password.

This system also allows the telephone number stored in the memory card with CPU 10 to be changed. With this arrangement, even when the telephone number of the phone line has been changed, it is possible at all times to register, as a registration number, the telephone number for which the user is currently contracted; therefore, it is possible to further enhance the security level when a password needs to be recovered.

In addition, the master password and the service passwords are encrypted and stored in the memory card with CPU 10 so as to be decrypted when necessary; therefore, the security level of the memory card with CPU 10 itself is improved.

Additionally, service passwords for using different network services are managed altogether with use of a master password, and when the master password is inputted, a corresponding service password will be automatically transmitted to the particular network service the user wishes to use in order for the user to log in the service; therefore, this system will save the user the troubles of remembering all the service passwords.

Further, when the master password needs to be recovered, function identifying information is received, and the function that corresponds to the function identifying information gets activated with use of the recovered master password. This arrangement will save the user the troubles of inputting the master password, and make the operations simpler.

2. Second Embodiment

The following explains the password recovery system 2 as the second embodiment of the present invention.

In the password recovery system 2, a guarantor system is used where some information that is necessary for the password recovery will be received from a guarantor that has been appointed in advance by the user, so that the password can be recovered.

Figure 19:
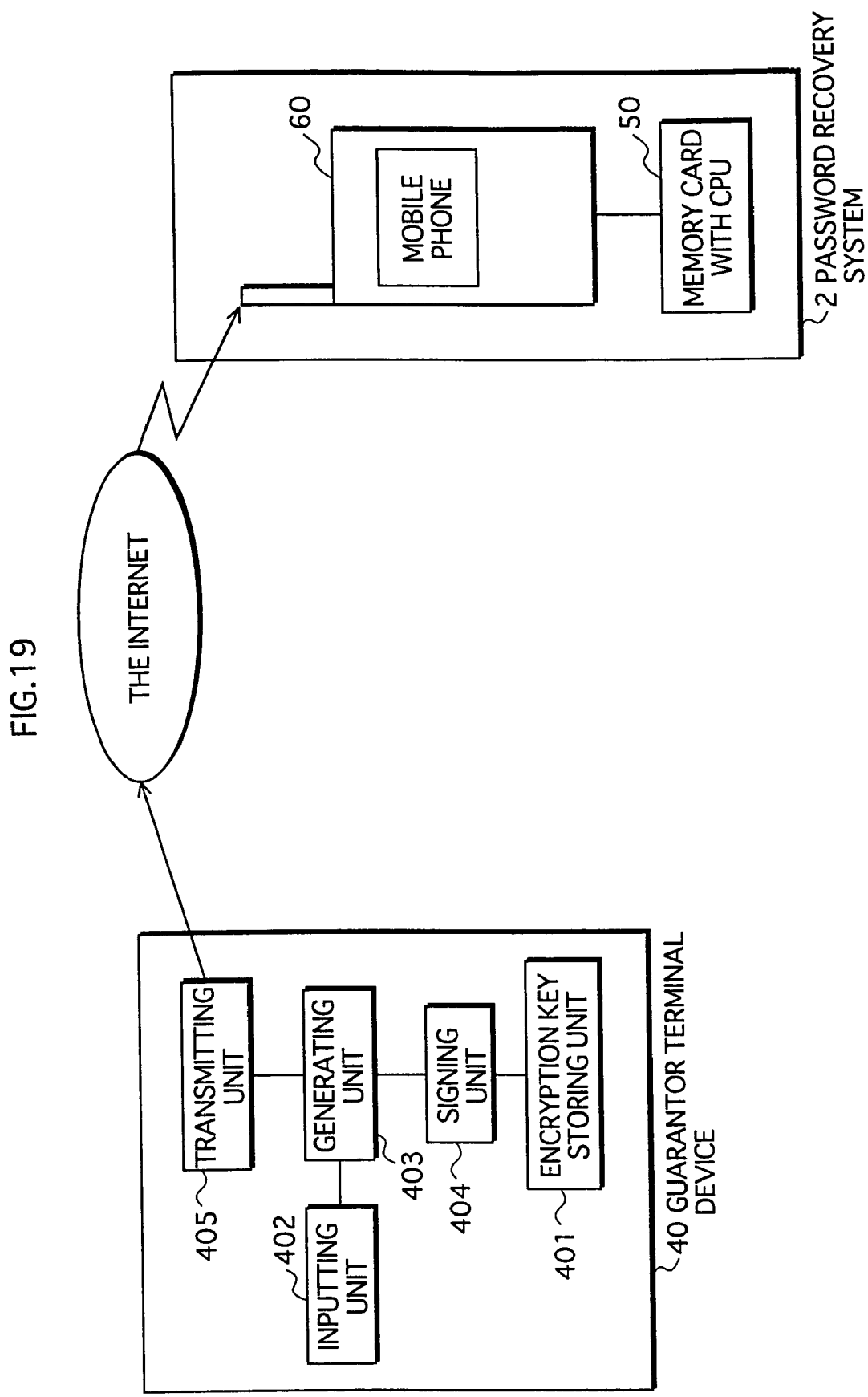
FIG. 19 shows a general outline of a case where a password is recovered in the password recovery system 2.

As shown in FIG. 19, in the password recovery system 2, using a guarantor terminal device 40, the guarantor generates a document, which is in a predetermined format, that guarantees that the password recovery is requested by the user himself/herself, and transmits a signed document that includes (i) signed data which is the generated document digitally signed with use of a secret key and (ii) the generated document to which a time stamp is attached (hereafter referred to simply as a signed document). The user receives the signed document and recovers the password with use of the received signed document. The digital signature used here is, for example, an El Gamal signature in a finite field. El Gamal signatures in a finite field are publicly known; therefore, explanation will be omitted.

2.1 Structure of the Guarantor Terminal Device 40

The following explains the structure of the guarantor terminal device 40.

As shown in FIG. 19, the guarantor terminal device 40 comprises, an encryption key storing unit 401, an inputting unit 402, a generating unit 403, a signing unit 404, and a transmitting unit 405.

More specifically, the guarantor terminal device 40 is a computer system comprising a microprocessor, a ROM, a RAM, a hard disk unit, a display unit, a key board, a mouse, a modem, and the like. One or more computer programs are stored in the ROM or the hard disk unit. The functions of the guarantor terminal device 40 are realized when the microprocessor operates according to the computer programs.

(1) The Encryption Key Storing Unit 401

Specifically, the encryption key storing unit 401 includes a hard disk unit and the like, and stores therein a secret key that is known only to the guarantor and is required when a document is signed digitally.

(2) The Inputting Unit 402

The inputting unit 402 receives texts when a signed document is to be generated, receives digital signature instruction information for digitally signing the document, and receives an instruction to transmit the signed document. The inputting unit 402 outputs the received texts, digital signature instruction, and signed document transmission instruction to the generating unit 403.

(3) The Generating Unit 403

The generating unit 403 generates a signed document. When having received the digital signature instruction information from the inputting unit 402, the generating unit 403 outputs, to the signing unit 404, the generated document that guarantees that the password recovery is requested by the user himself/herself.

When having received a signed document transmission instruction, the generating unit 403 transmits the generated signed document to the user via the transmitting unit 405.

(4) The Signing Unit 404

The signing unit 404 reads the secret key from the encryption key storing unit 401, and generates signed data by digitally signing the document received from the generating unit 403, and outputs the generated signed data to the generating unit 403.

(5) The Transmitting Unit 405

Specifically, the transmitting unit 405 includes a modem and the like, and transmits information received from the generating unit 403 to the user's mobile phone.

2.2 Structure of the Password Recovery System 2

Figure 20:
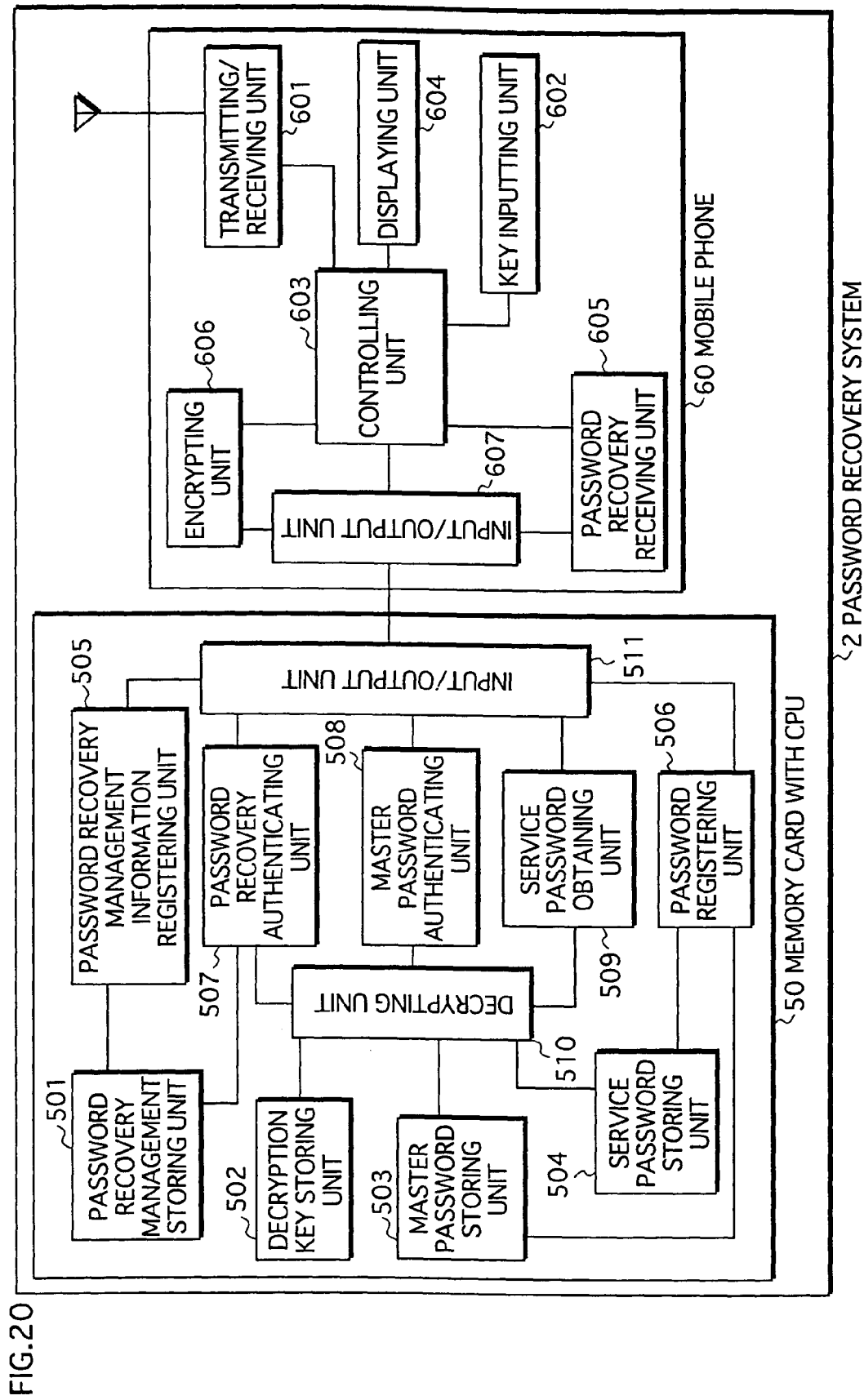
FIG. 20 is a block diagram that shows the structure of the password recovery system 2.

The password recovery system 2 comprises the memory card with CPU 50 and the mobile phone 60 shown in FIG. 20.

The user appoints at least one guarantor in advance. At this time, guarantors appointed by the user each have a public key certificate issued by an authenticating organization that issues and manages electronic identification documents. The user receives a public key certificate from each guarantor and has it stored in the memory card with CPU 50.

In the memory card with CPU 50, (i) a number of signed documents required for password recovery and (ii) an expiration period for receiving signed documents are specified.

When a password needs to be recovered, the user inserts the memory card with CPU 50 into the mobile phone 60, and contacts the guarantor in a way that it is possible to identify that the password recovery is requested by the user himself/herself. Then, the user has the guarantor generate a signed document in a predetermined format and transmit the generated signed document by e-mail. The mobile phone 60 receives the signed document, and provides the received signed document for the memory card with CPU 50.

The memory card with CPU 50 performs signature authentication for each transmitted signed document using the signed document and a public key certificate that is stored therein in advance, so as to judge if each document has actually been generated by a guarantor, and if each document is within the expiration period. When it is confirmed that the signed document has been generated by the guarantor and is within the expiration period, the memory card with CPU 50 counts this signed document as one of valid signed documents required for the password recovery. When the count has reached the number of signed documents required for the password recovery, the number being stored in advance, the memory card with CPU 50 reads the encrypted password stored therein in advance, decrypts the read password, and notifies the decrypted password to the mobile phone 60. The signature authentication here is an algorithm that authenticates the signed data generated with a digital signature.

It should be noted that each guarantor transmits a signed document only once in response to a request from the user for having the password recovered.

Further, the password recovery system 2 normally receives a password, and when the received password is a legitimate one, permits an access to an area that corresponds to the password. In the present embodiment, this password will be referred to as a master password.

2.3 Structure of the Memory Card with CPU 50

The following explains the structure of the memory card with CPU 50.

As shown in FIG. 20, the memory card with CPU 50 comprises a password recovery management storing unit 501, a decryption key storing unit 502, a master password storing unit 503, a service password storing unit 504, a password recovery management information registering unit 505, a password registering unit 506, a password recovery authenticating unit 507, a master password authenticating unit 508, a service password obtaining unit 509, a decrypting unit 510, and an input/output unit 511.

More specifically, the memory card with CPU 50 is a computer system comprising a microprocessor, a ROM, a RAM and the like. The ROM stores therein one or more computer programs. The functions of the memory card with CPU 50 are realized when the microprocessor operates according to the computer programs.

(1) The Password Recovery Management Storing Unit 501

As shown in FIG. 21 as an example, the password recovery management storing unit 501 stores therein a recovery management information table 700.

The recovery management information table 700 includes one or more sets of a name of a guarantor and a public key certificate.

"Guarantor Names" denote the names of those who transmit a signed document to the user when a password needs to be recovered.

"Public Key Certificates" denote information on public key certificates that have been issued for the guarantors by authenticating organizations in advance.

(2) The Decryption Key Storing Unit 502

The decryption key storing unit 502 stores therein a decryption key used for decrypting an encrypted master password which is stored in the master password storing unit 503.

The decryption key stored in the decryption key storing unit 502 is a decryption key that corresponds to an encryption key used for encrypting the master password.

An encryption method in which the key used for encryption is different from the key used for decryption is called the public key encryption method. The encryption key is called a public key, and the decryption key is called a secret key. An example of the public key encryption method is RSA. Explanation on RSA will be omitted since it is publicly known.

(3) The Master Password Storing Unit 503

The master password storing unit 503 stores therein the master password encrypted with an encryption key specified by the user. Here, a master password denotes a password that manages service passwords altogether. When the master password is inputted, the service password storing unit 504 becomes accessible.

When the decryption key needs to be changed, it is necessary to change the decryption key stored in the decryption key storing unit 502, and also encrypt the master password again with an encryption key that corresponds to the post-change decryption key and have the re-encrypted master password stored.

(4) The Service Password Storing Unit 504

Like the service password storing unit 103 explained as a part of the structure of the memory card with CPU 10 in the password recovery system 1, the service password storing unit 504 stores therein a service password registration table 300. Explanation on the service password registration table 300 will be omitted since it is already provided in the explanation of the service password storing unit 103.

(5) The Password Recovery Management Information Registering Unit 505

The password recovery management information registering unit 505 receives, from the mobile phone 60 via the input/output unit 511, guarantor information that includes information on (i) a name of a guarantor and (ii) a public key certificate. The password recovery management information registering unit 505 stores the received guarantor information into the recovery management table 700 in the password recovery management storing unit 501.

(6) The Password Registering Unit 506

The password registering unit 506 registers and updates the master password, the service passwords, or the decryption key used for decrypting the master password.

(a) To Register the Master Password

Explanation will be omitted since the operations are the same as those for registering the master password performed by the password registering unit 105, which is explained as a part of the structure of the memory card with CPU 10 in the password recovery system 1.

(b) To Register a Service Password

Explanation will be omitted since the operations are the same as those for registering the service password performed by the password registering unit 105, which is explained as a part of the structure of the memory card with CPU 10 in the password recovery system 1.

(c) To Register a Decryption Key

The password registering unit 506 receives, from the mobile phone 60 via the input/output unit 511, decryption key information that includes (i) what process should be performed, which is either a new registration or a change and (ii) a decryption key used for decrypting the encrypted master password. Depending on the process to be performed indicated in the decryption key information, the password registering unit 506 operates as follows: When it is a new registration, the password registering unit 506 newly registers the decryption key into the decryption key storing unit 502. When it is a change, the password registering unit 506 updates the decryption key stored in the decryption key storing unit 502, and outputs, to the mobile phone 60 via the input/output unit 511, encryption key changing instruction information that indicates an instruction to input the master password and an encryption key used for encrypting the master password.

(7) The Password Recovery Authenticating Unit 507

The password recovery authenticating unit 507 stores therein in advance password recovery specified value information that includes (i) the number of signed documents required for the password recovery (e.g. "3"), and (ii) a time limit for the password recovery (e.g. "60 minutes").

When the master password needs to be recovered, the password recovery authenticating unit 507 receives, from the mobile phone 60 via the input/output unit 511, (i) password recovery instruction information that indicates an instruction to have the password recovered and (ii) time information that indicates a time at which the password recovery receiving process is activated. Using the received time information and the time limit included in the password recovery specified value information, the password recovery authenticating unit 507 calculates an expiration period for the password recovery and stores therein the expiration period temporarily. Then, the password recovery authenticating unit 507 receives, from the mobile phone 60 via the input/output unit 511, the signed document that has been received by the mobile phone 60, and counts this signed document as a received signed document.

Next, the password recovery authenticating unit 507 reads, from the password recovery management storing unit 501, a public key certificate that corresponds to the guarantor who has sent the signed document, and performs signature authentication with use of the read public key certificate and the received signed document so as to judge if the received signed document is actually generated by the guarantor. The password recovery authenticating unit 507 also judges if the received signed document is within the expiration period with use of the time stamp attached thereto. When it is confirmed that the received signed document has actually been generated by the guarantor and is within the expiration period, this signed document is counted as one of valid signed documents required for the password recovery.

When the number of valid signed documents for the password recovery has reached the number of signed documents required for the password recovery, the password recovery authenticating unit 507 outputs, to the decrypting unit 510, recovery permitting information that includes information for instructing decryption of the master password.

Then, the password recovery authenticating unit 507 receives the decrypted master password from the decrypting unit 510, and outputs the received decrypted master password to the mobile phone 60 via the input/output unit 511.

When the number of signed documents having been received has not reached the number of guarantors stored in the password recovery management storing unit 501, and the number of valid signed documents has not reached the number of signed documents required for the password recovery, the password recovery authenticating unit 507 waits for a next signed document to be received.

When the password recovery authenticating unit 507 has received a signed document from each of all the guarantors stored in the password recovery management storing unit 501, and yet the number of valid signed documents has not reached the number of signed documents required for the password recovery, the password recovery authenticating unit 507 outputs, to the mobile phone 60 via the input/output unit 511, recovery prohibiting information that includes information indicating that the recovery is prohibited.

(8) The Master Password Authenticating Unit 508

Explanation will be omitted since the master password authenticating unit 508 is the same as the master password authenticating unit 107 explained as a part of the structure of the memory card with CPU 10 in the password recovery system 1.

(9) The Service Password Obtaining Unit 509

Explanation will be omitted since the service password obtaining unit 509 is the same as the service password obtaining unit 108 explained as a part of the structure of the memory card with CPU 10 in the password recovery system 1.

(10) The Decrypting Unit 510

The decrypting unit 510 performs the decryption process for the encrypted master password and encrypted service passwords.

(a) To Decrypt the Master Password

The decrypting unit 510 receives recovery permitting information from the password recovery authenticating unit 507 or master decryption information from the master password authenticating unit 508.

In order to decrypt the master password, the decrypting unit 510 (i) reads the decryption key stored in the decryption key storing unit 502, (ii) decrypts the master password with use of the read decryption key, and (iii) outputs the decrypted master password to either the password recovery authenticating unit 507 or the master password authenticating unit 508.

(b) To Decrypt a Service Password

Explanation will be omitted since the operations for decrypting the service password is the same as those for decrypting the service password performed by the decrypting unit 109, which is explained as a part of the structure of the memory card with CPU 10 in the password recovery system 1.

(11) The Input/Output Unit 511

The input/output unit 511 outputs information received from the mobile phone 60 to one of the password recovery management information registering unit 505, the password registering unit 506, the password recovery authenticating unit 507, the master password authenticating unit 508, and the service password obtaining unit 509.

The input/output unit 511 outputs information received from one of the password registering unit 506, the password recovery authenticating unit 507, the master password authenticating unit 508, and the service password obtaining unit 509 to the mobile phone 60.

2.4 Structure of the Mobile Phone 60

The following explains the structure of the mobile phone 60.

As shown in FIG. 20, the mobile phone 60 comprises a transmitting/receiving unit 601, a key inputting unit 602, a controlling unit 603, a displaying unit 604, a password recovery receiving unit 605, an encrypting unit 606, and an input/output unit 607.

More specifically, the mobile phone 60 is a computer system comprising a microprocessor, a ROM, a RAM, a display unit, and the like. The ROM stores therein one or more computer programs. The functions of the mobile phone 60 are realized when the microprocessor operates according to the computer programs.

Like a conventional mobile phone, the mobile phone 60 includes a speaker unit, a microphone unit, a calling unit, a memory unit, and the like so as to perform operations as a normal mobile phone.

(1) The Transmitting/Receiving Unit 601

Explanation will be omitted since the transmitting/receiving unit 601 is the same as the transmitting/receiving unit 201 explained as a part of the structure of the mobile phone 20 in the password recovery system 1.

(2) The Key Inputting Unit 602

The key inputting unit 602 includes dial keys, function keys, and control keys. When the guarantor information needs to be registered or changed, the key inputting unit 602 receives an input of guarantor information and outputs the received guarantor information to the controlling unit 603.

When the master password needs to be used, the key inputting unit 602 receives the input of the master password, and outputs the received master password to the controlling unit 603.

When the master password needs to be recovered, the key inputting unit 602 receives, from the user, password recovery instruction information and outputs it to the controlling unit 603.

When the master password needs to be registered or changed, the key inputting unit 602 receives master plaintext information that includes (i) what process should be performed, which is either a new registration or a change, (ii) the master password, and (iii) an encryption key for encrypting the master password, and outputs the received master plaintext information to the controlling unit 603. When the service password needs to be registered or changed, the key inputting unit 602 receives service plaintext information that includes (i) what process should be performed, which is either a new registration or a change, (ii) a service password, (iii) the master password, and (iv) the name of a network service, and outputs the received service plaintext information to the controlling unit 603.

When the network service needs to be used, the key inputting unit 602 receives the service identifying information and outputs the received service identifying information to the controlling unit 603.

When the decryption key for decrypting the encrypted master password needs to be registered or changed, the key inputting unit 602 receives an input of decryption key information, and outputs it to the controlling unit 603. When the decryption key needs to be changed, in order to re-encrypt the master password after the decryption key is changed, the key inputting unit 602 receives master plaintext information that includes (i) what process should be performed, which is a change, (ii) the master password, and (iii) an encryption key that is for encrypting the master password and corresponds to the decryption key, and outputs the received master plaintext information to the controlling unit 603.

Also, the key inputting unit 602 performs key operations that are the same as those of a conventional mobile phone.

(3) The Controlling Unit 603

The controlling unit 603 performs the overall operational control of the mobile phone 60. Also, the controlling unit 603 has a clock function that tells the time.

(a) To Register or Change the Guarantor

When the guarantor needs to be registered or changed, the controlling unit 603 receives the guarantor information from the key inputting unit 602 and outputs the received guarantor information to the memory card with CPU 50 via the input/output unit 607.

(b) To have the Master Password Recovered

When the master password needs to be recovered, the controlling unit 603 receives the password recovery instruction information from the key inputting unit 602, and causes activation of password recovery receiving process performed by the password recovery receiving unit 605. Also, the controlling unit 603 obtains time information using the clock function. The controlling unit 603 then outputs the received password recovery instruction information and the time information to the memory card with CPU 50 via the input/output unit 607. Next, the controlling unit 603 receives an e-mail message in which the signed document is included from the transmitting/receiving unit 601 and outputs the received e-mail message to the password recovery receiving unit 605.

Then, when it is acceptable to have the master password recovered, the controlling unit 603 receives the master password from the memory card with CPU 50 via the input/output unit 607, and outputs the received master password to the displaying unit 604, so as to complete the password recovery receiving process. When it is not acceptable to have the master password recovered, the controlling unit 603 receives the recovery prohibiting information, and outputs the received recovery prohibiting information to the displaying unit 604 so as to complete the password recovery receiving process.

(c) To Use the Master Password

Explanation will be omitted since, when the master password needs to be used, the operations are the same as those of the controlling unit 203 which has been explained as a part of the structure of the mobile phone 20 in the password recovery system 1.

(d) To Use the Network Service

Explanation will be omitted since, when the network service needs to be used, the operations are the same as those of the controlling unit 203 which is explained as a part of the mobile phone 20 in the password recovery system 1.

(e) To Register or Change the Master Password

When the master password needs to be registered or changed, the controlling unit 603 outputs the master plaintext information that has been received from the key inputting unit 602 to the encrypting unit 606.

(f) To Register or Change a Service Password

When the service password needs to be registered or changed, the controlling unit 603 outputs the service plaintext information that has been received from the key inputting unit 602 to the encrypting unit 606.

(g) To Register or Change the Decryption Key

When the decryption key needs to be registered or changed, the controlling unit 603 receives the decryption key information from the key inputting unit 602 and outputs the received decryption key information to the memory card with CPU 50 via the input/output unit 607.

When the decryption key needs to be changed, the controlling unit 603 receives the encryption key changing instruction information from the memory card with CPU 50 after the decryption key has been updated, and outputs the received encryption key changing instruction information to the displaying unit 604.

(4) The Displaying Unit 604

When the decryption key, which is stored in the decryption key storing unit 502 in the memory card with CPU 50, needs to be changed, the displaying unit 604 receives the encryption key changing instruction information from the controlling unit 603 and displays a screen in which the master password and the encryption key for encrypting the master password are to be inputted, with use of the received encryption key changing instruction information, and prompts the user to input them.

When the master password needs to be recovered, the displaying unit 604 receives, from the controlling unit 603, and displays the master password or the recovery prohibiting information.

When the master password needs to be used, the displaying unit 604 receives, from the controlling unit 603, and displays the reception permitting information or the reception prohibiting information.

The displaying unit 604 also displays other screens that are the same as those of a conventional mobile phone.

(5) The Password Recovery Receiving Unit 605

The password recovery receiving unit 605 gets activated by the controlling unit 603 when a password needs to be recovered, and receives an e-mail message from the controlling unit 603 so as to obtain the signed document included in the e-mail message, and outputs the obtained signed document to the memory card with CPU 50 via the input/output unit 607.

(6) The Encrypting Unit 606

When the master password needs to be registered or changed, the encrypting unit 606 receives the master plaintext information from the controlling unit 603, and encrypts the master password with the encryption key included in the received master plaintext information, so as to generate master encryption information. When the service password needs to be registered or changed, the encrypting unit 606 receives service plaintext information from the controlling unit 603, and encrypts the service password with the master password being an encryption key, so as to generate service encryption information.

Then, the encrypting unit 606 outputs the master encryption information or the service encryption information to the memory card with CPU 50 via the input/output unit 607.

(7) The Input/Output Unit 607

Explanation will be omitted since the input/output unit 607 is the same as the input/outputs unit 207 which is explained as a part of the structure of the mobile phone 20 in the password recovery system 1.

2.5 General Outline of Operations of the Password Recovery System 2

The following explains the outline of the operations of the password recovery system 2.

Figure 22:
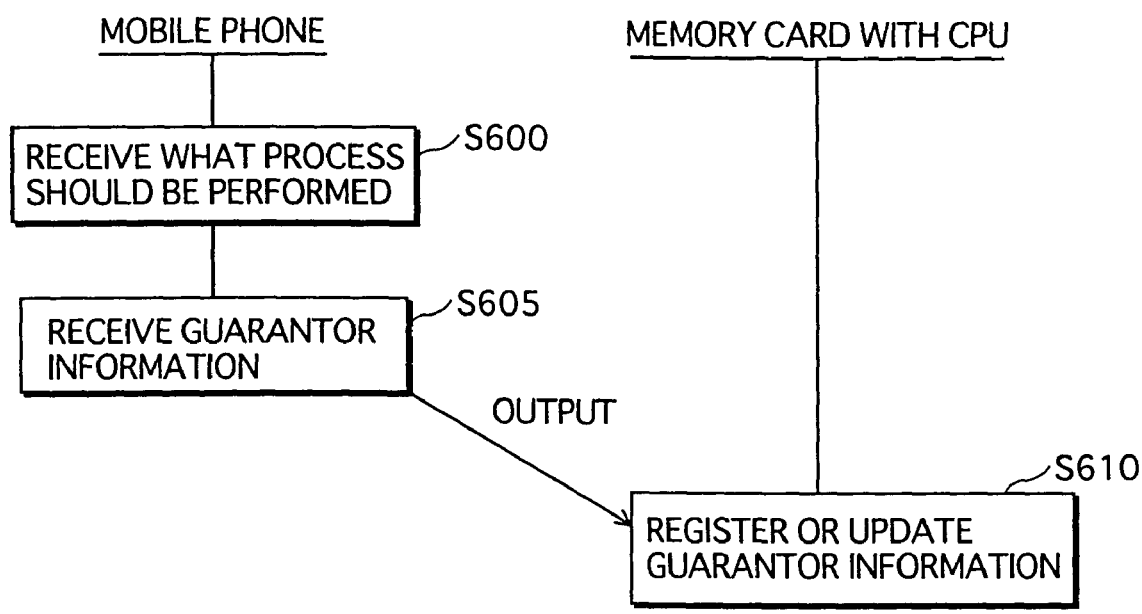
FIG. 22 is a flow chart that shows the operations for registering guarantor information in the password recovery system 2.

(1) General Outline of Operations at Times of Registering the Guarantor Information The following explains the general outline of the operations for registering guarantor information, with reference to the flow chart in FIG. 22.

The mobile phone 60 receives an instruction to newly register or change guarantor information from the user (Step S600). Then, the mobile phone 60 receives the guarantor information and outputs, to the memory card with CPU 50, registration information that includes (i) the received instruction to make the new registration or the change and (ii) the guarantor information (Step S605).

With use of the received registration information, the memory card with CPU 50 newly registers the guarantor information in a case where the process to be performed is anew registration, and updates the guarantor information, which is a target of the change, in a case where the process to be performed is a change (Step S610).

(2) General Outline of Operations at Times of Registering the Master Password

Figure 23:
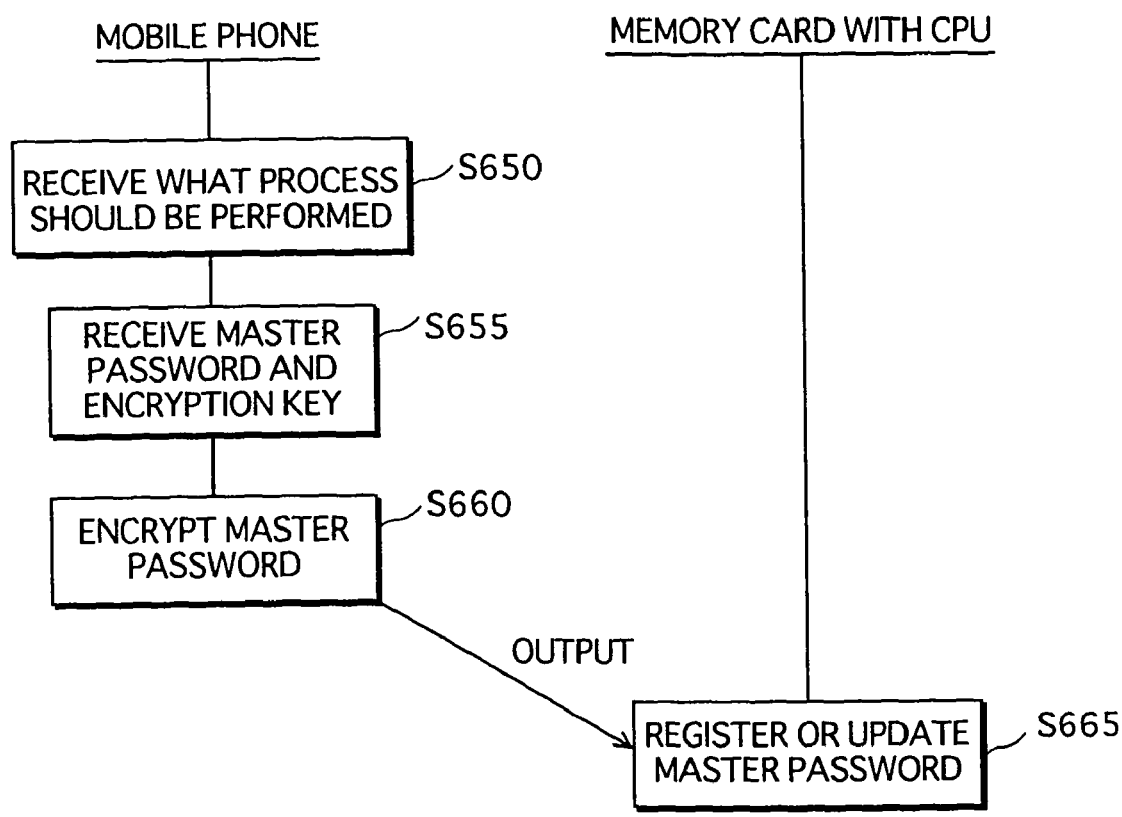
FIG. 23 is a flow chart that shows the operations for registering and changing a master password in the password recovery system 2.

The following explains the general outline of the operations for registering the master password, with reference to the flow chart in FIG. 23.

The mobile phone 60 receives an instruction indicating what process should be performed, which is either a new registration or a change (Step S650). Then, the mobile phone 60 receives the master password and the encryption key from the user (Step S655), encrypts the received master password with the received encryption key, and outputs, to the memory card with CPU 50, the master encryption information that includes (i) what process should be performed and (ii) the encrypted master password (Step S660).

With use of the received master encryption information, the memory card with CPU 50 newly registers the master password in the case of anew registration, and updates the master password in the case of a change (Step S665).

(3) General Outline of Operations at Times of Registering a Service Password

Explanation will be omitted since the general outline of the operations for registering a service password is the same as that in the password recovery system 1.

(4) General Outline of Operations at Times of Registering a Decryption Key

The following explains the general outline of the operations for registering a decryption key.

(a) To Make a New Registration

Figure 24:
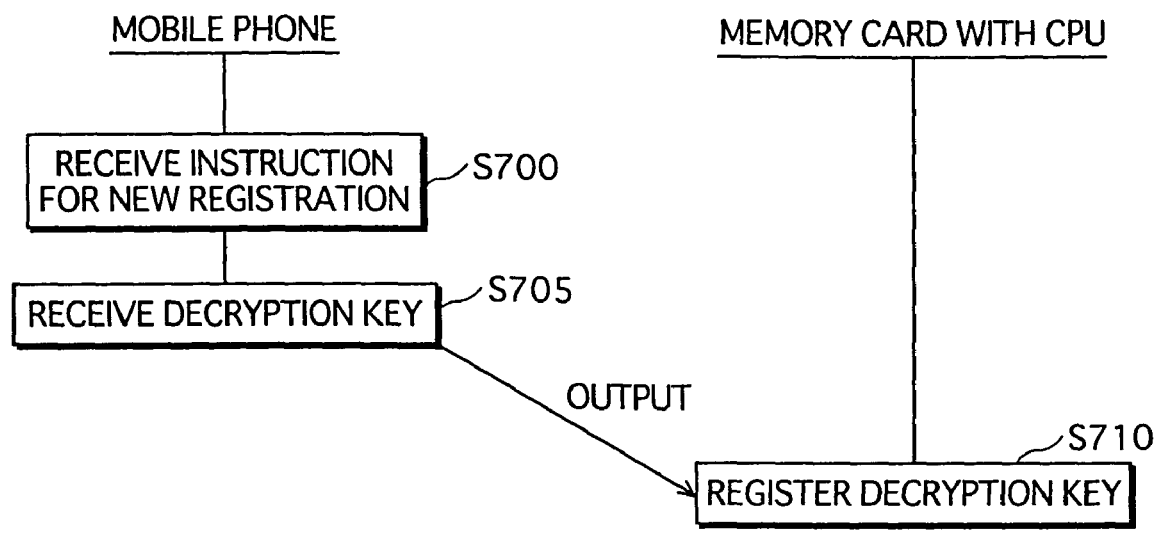
FIG. 24 is a flow chart showing the operations for a new registration of a decryption key in the password recovery system 2.

The following explains the general outline of the operations for newly registering a decryption key, with reference to the flow chart in FIG. 24.

The mobile phone 60 receives an instruction to newly register a decryption key from the user (Step S700). Next, the mobile phone 60 receives the decryption key, and outputs decryption key information that includes (i) the received instruction to make the new registration and (ii) the decryption key, to the memory card with CPU 50 (Step S705).

The memory card with CPU 50 newly registers the decryption key with use of the received decryption key information (Step S710).

(b) To Change the Decryption Key

Figure 25:
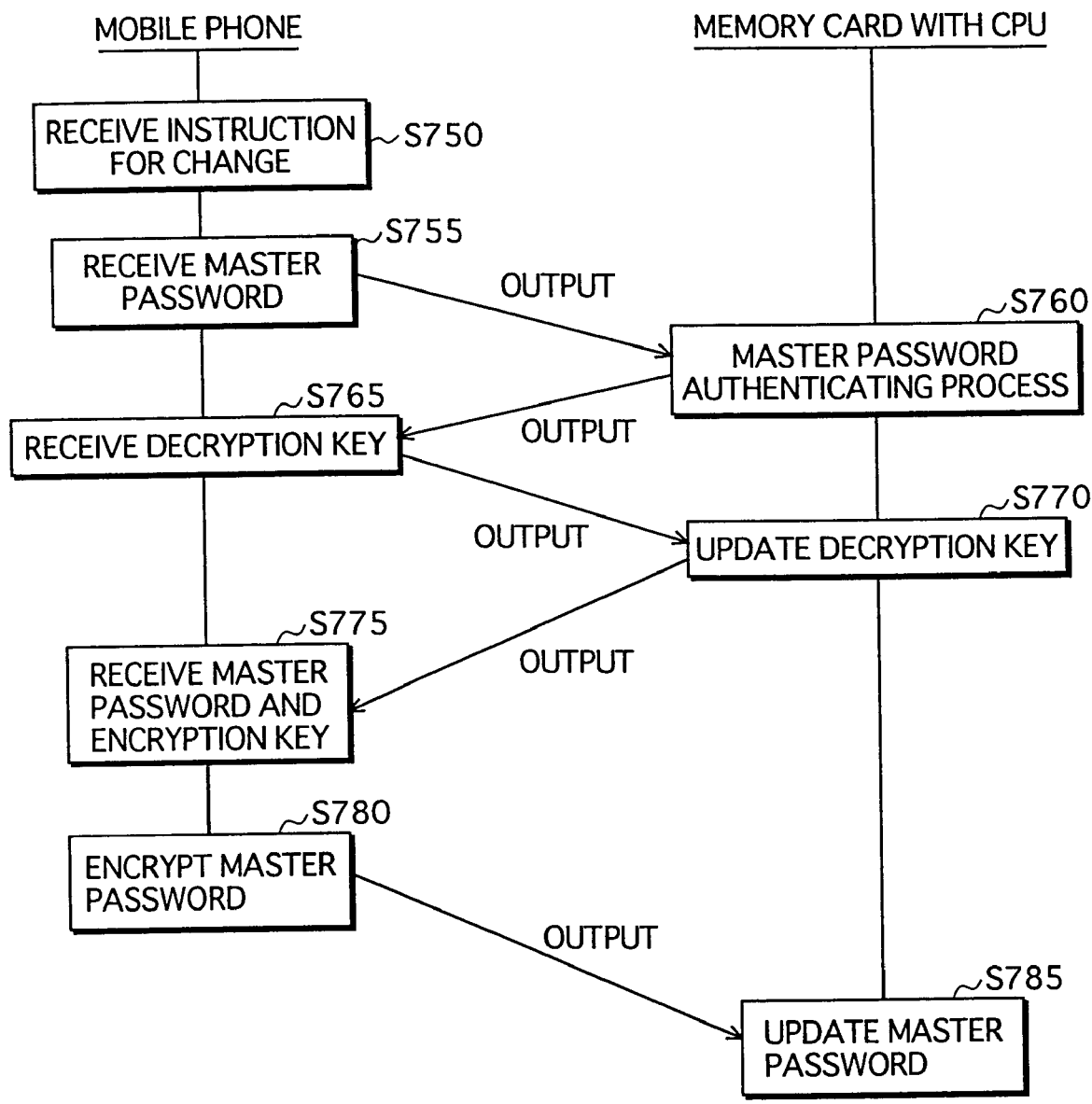
FIG. 25 is a flow chart that shows the operations for changing a decryption key in the password recovery system 2.

The following explains the general outline of the operations for changing the decryption key, with reference to the flow chart in FIG. 25.

The mobile phone 60 receives an instruction to change the decryption key from the user (Step S750). The mobile phone 60 then receives the master password and outputs the received master password to the memory card with CPU 50 (Step S755).

The memory card with CPU 60 performs the master password authenticating process with use of the received master password and outputs reception permitting information to the mobile phone 60 (Step S760).

Next, the mobile phone 60 receives the decryption key, and outputs, to the memory card with CPU 50, decryption key information that includes (i) the received instruction to make the change and (ii) the decryption key (Step S765).

The memory card with CPU 50 updates the decryption key with use of the received decryption key information, and outputs the encryption key changing instruction information to the mobile phone 60 via the input/output unit 511 (Step S770).

The mobile phone 60 receives the encryption key changing instruction information from the memory card with CPU 50 and instructs the user to input the master password and an encryption key for encrypting the master password so that they can be received from the user (Step S775).

Then, the mobile phone 60 encrypts the received master password with the received encryption key and outputs, to the memory card with CPU 50, master encryption information that includes (i) what process should be performed, which is to change the master password and (ii) the encrypted master password (Step S780).

The memory card with CPU 50 updates the master password with use of the master encryption information (Step S785).

(5) General Outline of Operations at Times of Password Recovery

Figure 26:
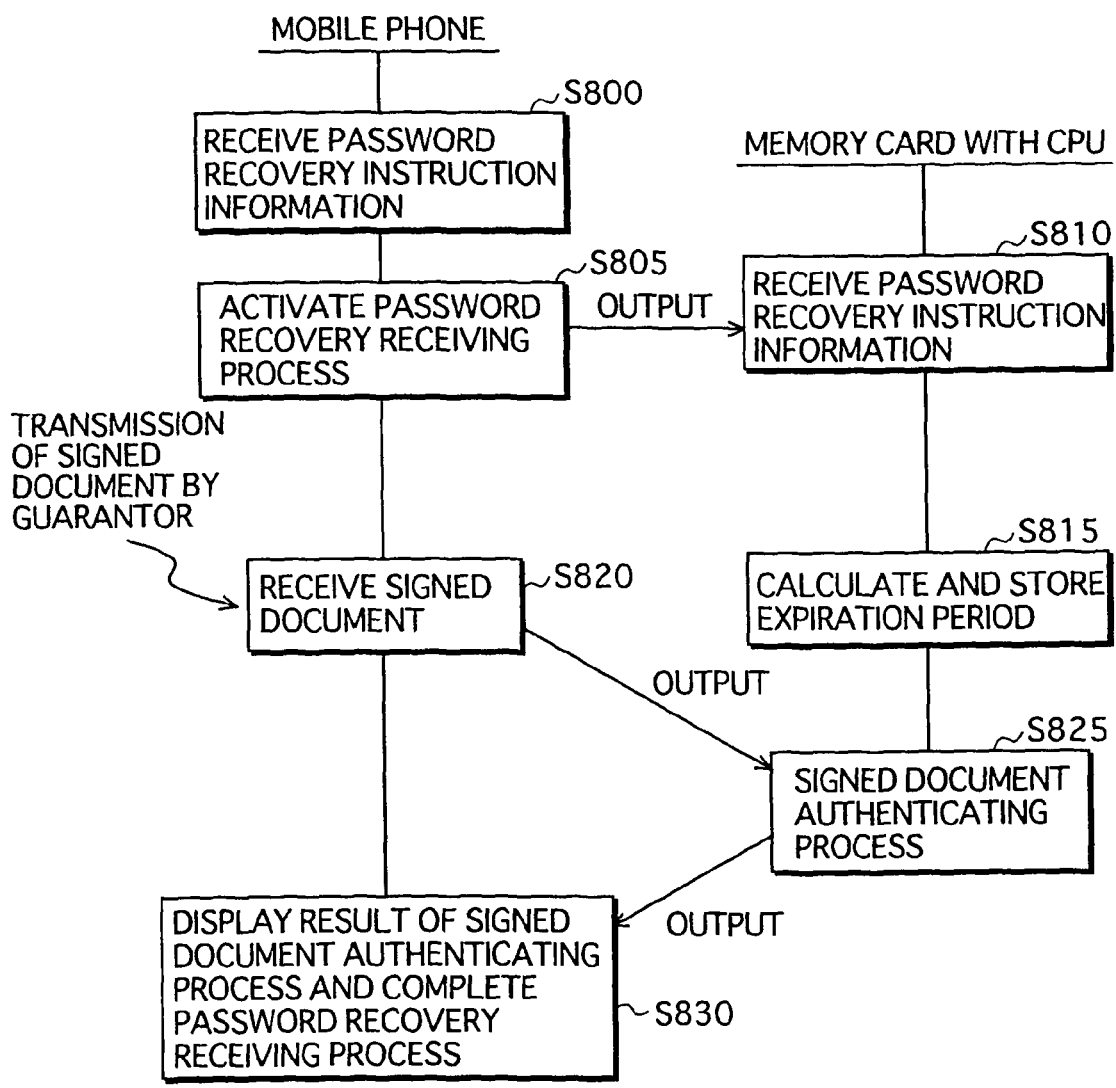
FIG. 26 is a flowchart that shows the operations for having the master password recovered in the password recovery system 2.

The following explains the general outline of operations for having the password recovered, with reference to the flow chart in FIG. 26.

The mobile phone 60 receives the password recovery instruction information from the user (Step S800). The mobile phone 60 then causes activation of the password recovery receiving process, and obtains the time information so as to output the time information and the password recovery instruction information to the memory card with CPU 50 (Step S805).

Next, the memory card with CPU 50 receives the password recovery instruction information and the time information (Step S810), and calculates an expiration period using the time information and the stored time limit so as to store therein the expiration period temporarily (Step S815).

Then, the mobile phone 60 receives the e-mail message that includes signed document from a guarantor, performs the password recovery receiving process so as to obtain the signed document included in the received e-mail message, and outputs the obtained signed document to the memory card with CPU 50 (Step S820).

The memory card with CPU 50 performs signature authentication with use of (i) the received signed document, (ii) a public key certificate that is stored in the password recovery management storing unit 501 and corresponds to the guarantor who has sent the signed document, (iii) the number of signed documents required for the password recovery, the number being included in the password recovery specified value information, and (iv) the calculated expiration period, and judges if it is acceptable to have the password recovered. When it is acceptable to have the password recovered, the memory card with CPU 50 outputs the decrypted master password to the mobile phone 60 via the input/output unit 511. When it is not acceptable to have the password recovered, the memory card with CPU 50 outputs the recovery prohibiting information to the mobile phone 60 via the input/output unit 511 (Step S825).

The mobile phone 60 displays, on the displaying unit 604, the master password or the recovery prohibiting information that has been received from the memory card with CPU 50, so as to complete the password recovery receiving process (Step S830).

(6) General Outline of Operations at Times of Authenticating the Master Password Explanation will be omitted since the general outline of the operations for authenticating the master password is the same as that in the password recovery system 1.

It should be noted that, in the master password authenticating process performed by the memory card with CPU 50, the encrypted master password gets decrypted with use of the decryption key stored in the decryption key storing unit 502.

(7) General Outline of Operations at Times of Obtaining a Service Password

Explanations will be omitted since the general outline of the operations for obtaining the service password is the same as that in the password recovery system 1.

2.6 Operations During the Signed Document Authenticating Process

Figure 27:
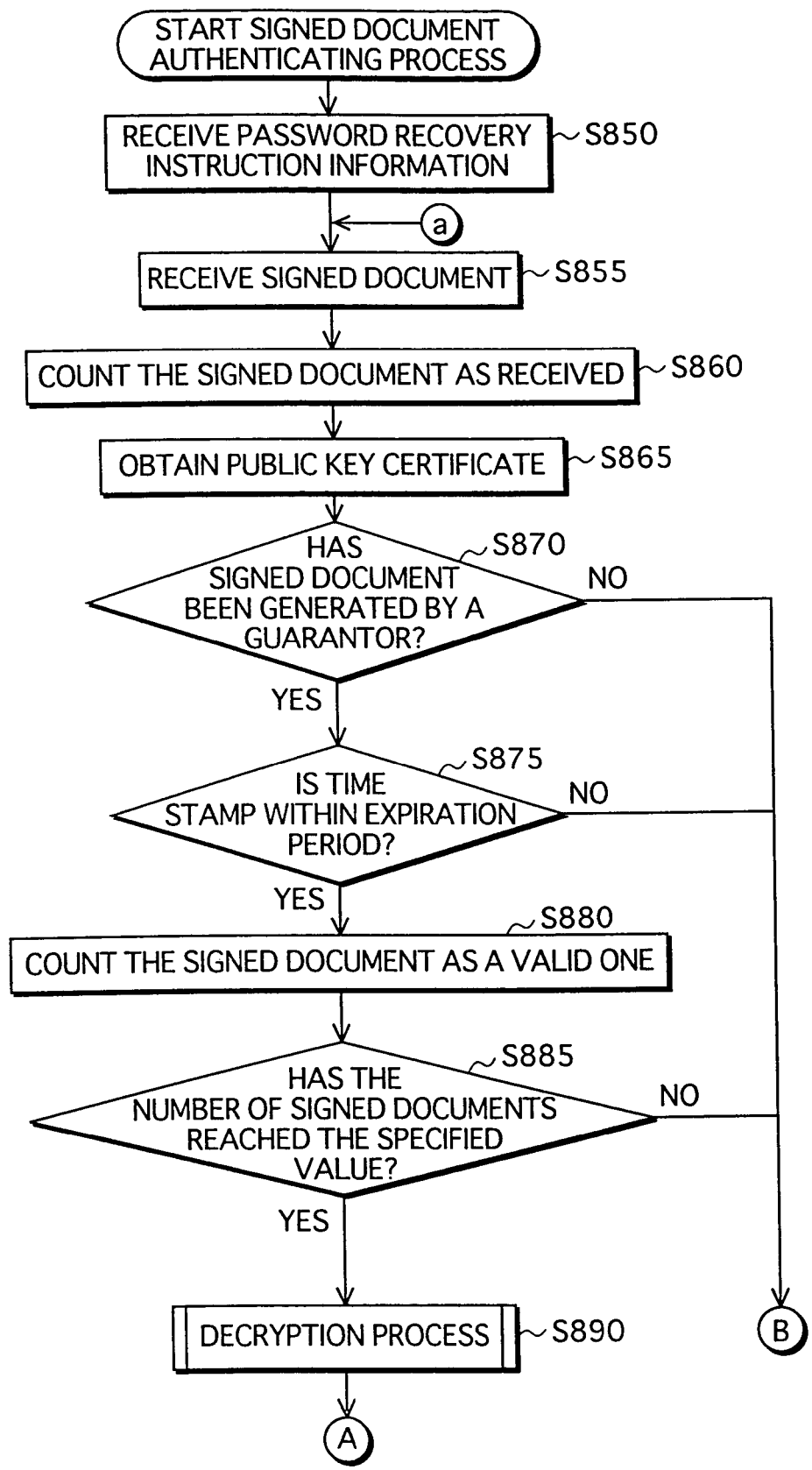
FIG. 27 is a flow chart that shows the operations during the signed document authenticating process in the password recovery system 2, and is continued in FIG. 28.
Figure 28:
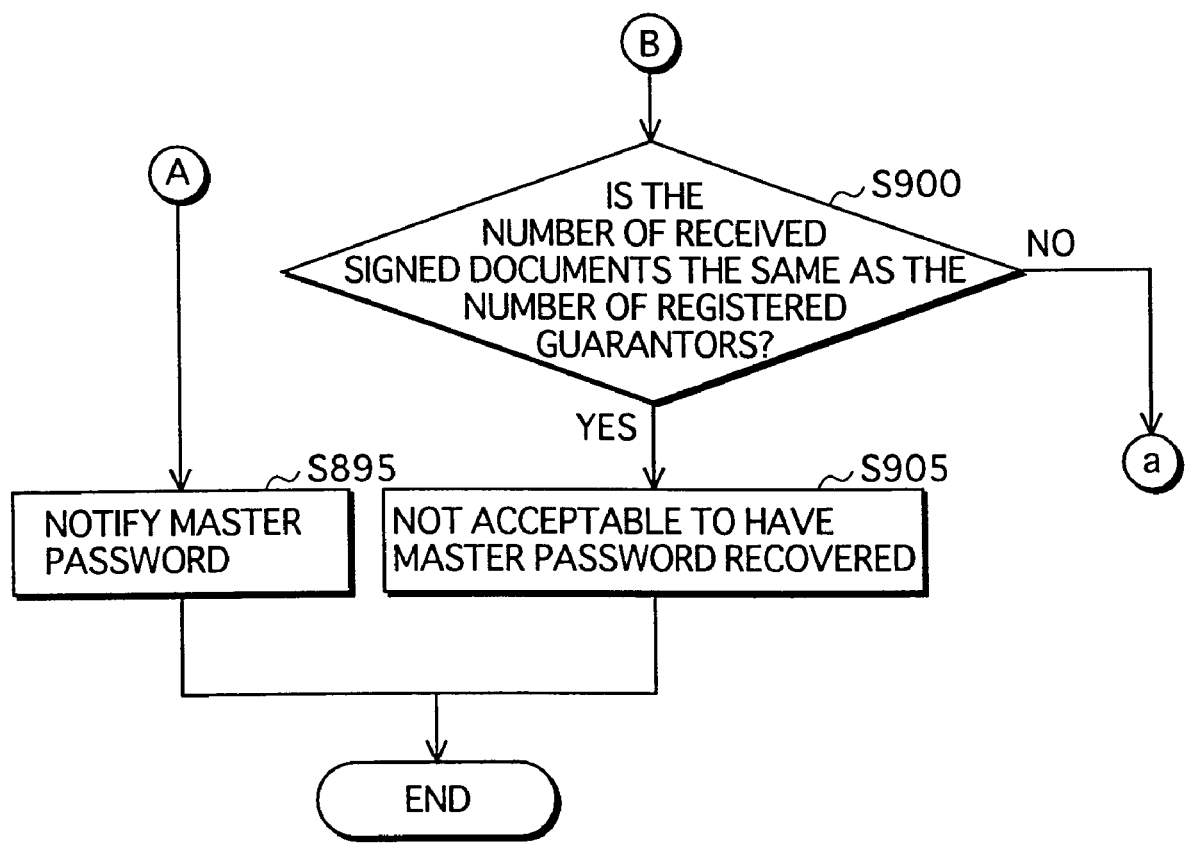
FIG. 28 is a flow chart that shows the operations during the signed document authenticating process in the password recovery system 2, and is continued from FIG. 27.

The following explains the operations during the signed document authenticating process that is performed by the memory card with CPU 50 when the master password needs to be recovered, with reference to the flow charts in FIGS. 27 and 28.

The password recovery authenticating unit 507 receives, from the mobile phone 60, the password recovery instruction information and the time information so as to calculate and store therein the expiration period (Step S850).

Next, the password recovery authenticating unit 507 receives a signed document from the mobile phone 60 (Step S855), and counts it as a received signed document (Step S860). Then, the password recovery authenticating unit 507 obtains, from the password recovery management storing unit 501, a public key certificate that corresponds to the guarantor who has sent the signed document (Step S865). The password recovery authenticating unit 507 performs signature authentication with use of the signed document and the public key certificate so as to judge if the guarantor who has signed the document is one of those who have been registered or not (Step S870).

When the guarantor who has sent the signed document is one of those who have been registered, the password recovery authenticating unit 507 checks the expiration period of the time stamp attached to the signed document (Step S875). When the time stamp is within the expiration period, the received signed document is counted as a valid signed document (Step S880). The password recovery authenticating unit 507 then judges if the number of valid signed documents has reached the number of signed documents required for the password recovery (Step S885). When the number of valid signed documents has reached the number of signed documents required for the password recovery, the password recovery authenticating unit 507 outputs decryption permitting information to the decrypting unit 510 so that the decryption unit 510 performs the decryption process (Step S890). Then, the password recovery authenticating unit 507 receives the master password decrypted by the decrypting unit 510, and outputs the decrypted master password to the mobile phone 60 (Step S895).

When (i) the received signed document has not been actually generated by one of the guarantors, or (ii) the received signed document is past the expiration period, or (iii) the number of valid signed documents has not reached the number of signed documents required for the password recovery, the password recovery authenticating unit 507 judges whether the number of signed documents that have been received and the number of guarantors stored in the password recovery management storing unit 501 are the same (Step S900). When they are the same, the password recovery authenticating unit 507 outputs the recovery prohibiting information to the mobile phone 60 (Step S905), and when they are not the same, the procedure returns to Step S855, and the password recovery authenticating unit 507 receives a next signed document.

2.7 Operations During the Master Password Authenticating Process

Explanation will be omitted since the operations during the master password authenticating process are the same as those performed by the password recovery system 1.

2.8 Operations During the Service Password Obtaining Process

Explanation will be omitted since the operations during the service password obtaining process are the same as those performed by the password recovery system 1.

2.9 Operations During the Decrypting Process

Figure 29:
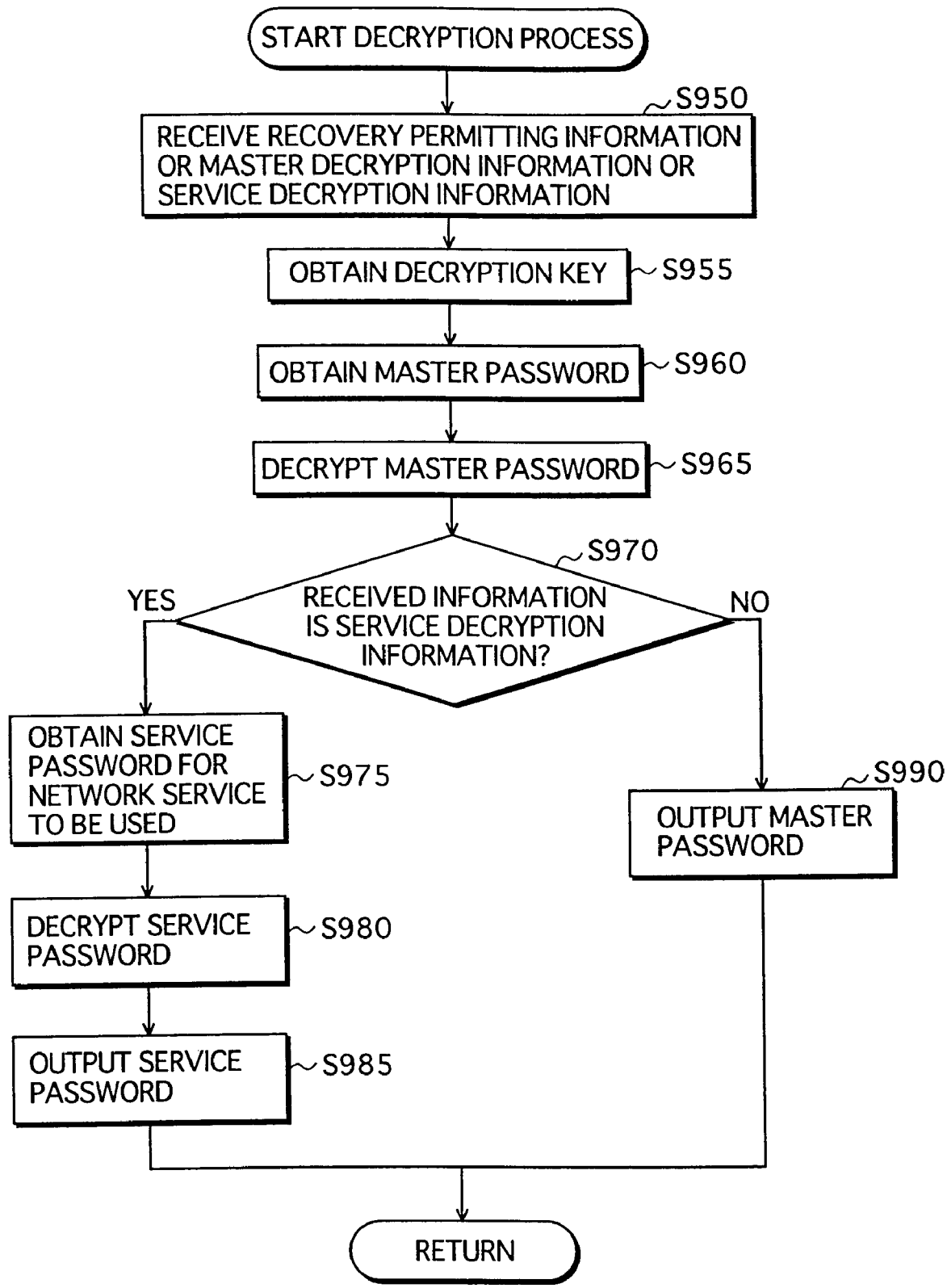
FIG. 29 is a flow chart that shows the operations during the decryption process in the password recovery system 2.

The following explains the operations during the decryption process, with reference to the flow chart in FIG. 29.

The decrypting unit 510 receives one of the recovery permitting information, the master decryption information or the service decryption information from one of the password recovery authenticating unit 507, the master password authenticating unit 508, and the service password obtaining unit 509 (Step S950).

The decrypting unit 510 obtains the decryption key from the decryption key storing unit 502 (Step S955) and obtains the encrypted master password from the master password storing unit 503 (Step S960).

The decrypting unit 510 decrypts the encrypted master password with the obtained decryption key (Step S965). Next, the decrypting unit 510 judges if the received information is service decryption information or not (Step S970).

When the received information is service decryption information, the decrypting unit 510 obtains the corresponding record from the service password registration table 300 in the service password storing unit 504 (Step S975). Next, the decrypting unit 510 decrypts the encrypted service password included in the obtained record with the decrypted master password being a decryption key (Step S980). Then, the decrypting unit 510 outputs the decrypted service password to the service password obtaining unit 509 (Step S985).

When the received information is not service decryption information, the decrypting unit 510 outputs the decrypted master password either to the password recovery authenticating unit 507 or the master password authenticating unit 508 (Step S990).

2.10 Modification Examples of Second Embodiment

The following explains the password recovery system 2A as a modification example of the second embodiment.

In the password recovery system 2A, a guarantor system is used for password recovery, like in the password recovery system 2.

The password recovery system 2A receives signed documents from the guarantor terminal device 40 shown in FIG. 19, and performs password recovery process using the received signed documents. Explanation of the guarantor terminal device 40 will be omitted since it has already been explained earlier.

Structure of the Password Recovery System 2A

Figure 30:
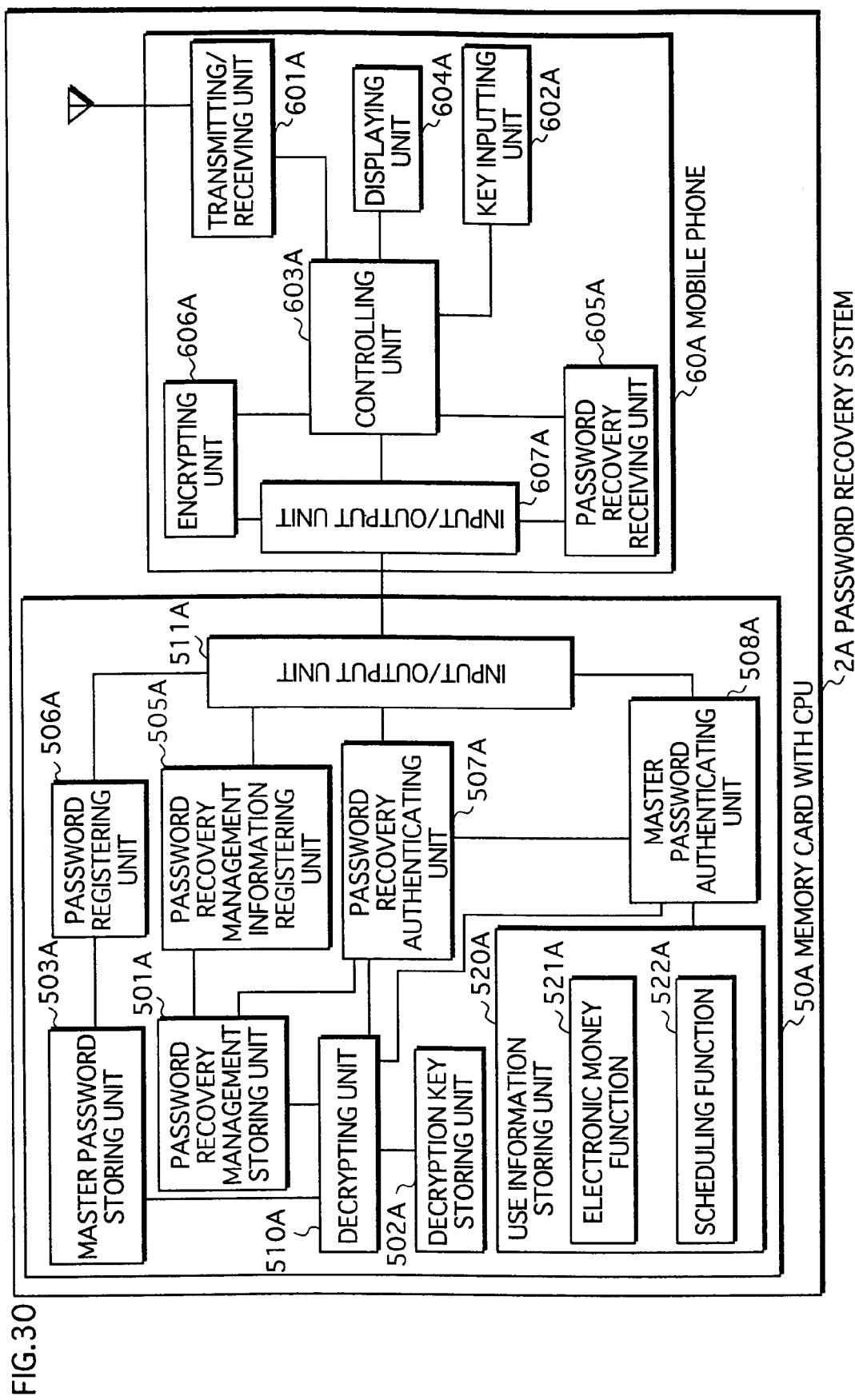
FIG. 30 is a block diagram that shows the structure of the password recovery system 2A.

The password recovery system 2A comprises a memory card with CPU 50A and a mobile phone 60A as shown in FIG. 30.

When a user needs to use one of the functions managed with a password and has forgotten the password, the user inserts the memory card with CPU 50A into the mobile phone 60A and has a guarantor send a signed document via e-mail, the guarantor having been appointed by the user. The mobile phone 60A receives the signed document and provides the received signed document for the memory card with CPU 50A.

The memory card with CPU 50A judges if the received signed document is valid for the password recovery or not. When it is judged that the signed document is valid for the password recovery, the memory card with CPU 50A counts this signed document as one of valid signed documents required for the password recovery. When the count has reached the number of signed documents required for the password recovery, the number being stored in advance, the memory card with CPU 50A reads the encrypted password stored therein in advance, decrypts the read password, and causes activation of the function the user wishes to use, using the decrypted password.

Further, the password recovery system 2A normally receives information that identifies a function to be used and the password, and when the received password is a legitimate one, causes activation of the function to be used by the user. Here, this password will be referred to as a master password.

Structure of Memory Card with CPU 50A

The following explains the structure of the memory card with CPU 50A.

As shown in FIG. 30, the memory card with CPU 50A comprises a password recovery management storing unit 501A, a decryption key storing unit 502A, a master password storing unit 503A, a password recovery management information registering unit 505A, a password registering unit 506A, a password recovery authenticating unit 507A, a master password authenticating unit 508A, a decrypting unit 510A, an input/output unit 511A, and a use information storing unit 520A.

More specifically, the memory card with CPU 50A is a computer system comprising a microprocessor, a ROM, a RAM and the like. The ROM stores therein one or more computer programs. The functions of the memory card with CPU 50A are realized when the microprocessor operates according to the computer programs.

(1) The Use Information Storing Unit 520A

The use information storing unit 520A has an electronic money function 521A and a scheduling function 522A.

The electronic money function 521A is a function that provides digital data with monetary value and allows the user to purchase goods on the Internet. The scheduling function 522A is a function that records and manages the user's schedule.

(2) The Password Recovery Management Storing Unit 501A

Explanation will be omitted since the password recovery management storing unit 501A is the same as the password recovery management storing unit 501.

(3) The Decryption Key Storing Unit 502A

Explanation will be omitted since the decryption key storing unit 502A is the same as the decryption key storing unit 502.

(4) The Master Password Storing Unit 503A

The master Password Storing Unit 503A stores therein a master password that is encrypted with an encryption key specified by the user.

The master password manages the electronic money function 521A and the scheduling function 522A that are stored in the use information storing unit 520A. When a user wishes to use one of the functions stored in the use information storing unit 520A, the user inputs information that identifies the function to be used and the master password.

When the decryption key needs to be changed, the decryption key stored in the decryption key storing unit 502A gets changed, and also the master password gets encrypted again with an encryption key that corresponds to the post-change decryption key so that the master password storing unit 503A stores therein the re-encrypted master password.

(5) The Password Recovery Management Information Registering Unit 505A

Explanation will be omitted since the password recovery management information registering unit 505A is the same as the password recovery management information registering unit 505.

(6) The Password Registering Unit 506A

The password registering unit 506A registers and updates the master password or a decryption key for decrypting the master password.

As for the registration and the update of the master password, explanation will be omitted since they are the same as the registration and the update of the master password performed by the password registering unit 506. Also, as for the registration and the update of a decryption key for decrypting the master password, explanation will be omitted since they are the same as the registration and the update performed by the password registering unit 506.

(7) The Password Recovery Authenticating Unit 507A

The password recovery authenticating unit 507A stores therein in advance password recovery specified value information that includes (i) the number of signed documents required for the password recovery and (ii) a time limit for the password recovery.

When the master password needs to be recovered, the password recovery authenticating unit 507A receives, from the mobile phone 60A via the input/output unit 511A, (i) password recovery instruction information that indicates an instruction to have the password recovered, (ii) time information that indicates a time at which the password recovery receiving process is activated, and (iii) function identifying information that identifies one of the functions stored in the use information storing unit 520A to be used. Using the received time information and the time limit included in the password recovery specified value information, the password recovery authenticating unit 507A calculates an expiration period for the password recovery and stores therein the expiration period and the received function identifying information temporarily. Then, the password recovery authenticating unit 507A receives, from the mobile phone 60A via the input/output unit 511A, the signed document that has been received by the mobile phone 60A, and counts this signed document as a received signed document.

Next, the password recovery authenticating unit 507A reads, from the password recovery management storing unit 501A, a public key certificate that corresponds to the guarantor who has sent the signed document, and performs signature authentication with use of the read public key certificate and the received signed document so as to judge if the received signed document is actually generated by the guarantor. The password recovery authenticating unit 507A also judges if the received signed document is within the expiration period with use of the time stamp attached thereto. When it is confirmed that the received signed document has actually been generated by the guarantor and is within the expiration period, the signed document is counted as one of valid signed documents required for the password recovery.

When the number of valid signed documents for the password recovery has reached the number of signed documents required for the password recovery, the password recovery authenticating unit 507A outputs, to the decrypting unit 510A, recovery permitting information that includes information for instructing decryption of the master password. Further, the password recovery authenticating unit 507A outputs master password recovery completion information indicating that the master password recovery is completed to the mobile phone 60A via the input/output unit 511A.

Then, the password recovery authenticating unit 507A receives the decrypted master password from the decrypting unit 510A, and outputs the received decrypted master password and the function identifying information to the master password authenticating unit 508A.

When the number of signed documents having been received has not reached the number of guarantors stored in the password recovery management storing unit 501A, and the number of valid signed documents has not reached the number of signed documents required for the password recovery, the password recovery authenticating unit 507A waits for a next signed document to be received.

When the password recovery authenticating unit 507A has received a signed document from each of all the guarantors stored in the password recovery management storing unit 501A, and yet the number of valid signed documents has not reached the number of signed documents required for the password recovery, the password recovery authenticating unit 507A outputs, to the mobile phone 60A via the input/output unit 511A, recovery prohibiting information that includes information indicating that the recovery is prohibited.

(8) The Master Password Authenticating Unit 508A

The master password Authenticating unit 508A receives the master password and the function identifying information from the mobile phone 60A via the password recovery authenticating unit 507A or the input/output unit 511A.

As for the method of the authenticating process of the master password, explanation will be omitted since it is the same as the one performed by the master password authenticating unit 107A which has been explained as a modification example of the first embodiment.

(9) The Decrypting Unit 510A

The decrypting unit 510A performs the decryption process for the encrypted master password.

As for the decryption of the master password, explanation will be omitted since it is the same as the decryption of the master password performed by the decrypting unit 510.

(10) The Input/Output Unit 511A

The input/output unit 511A outputs information received from the mobile phone 60A to one of the password recovery management information registering unit 505A, the password registering unit 506A, the password recovery authenticating unit 507A, and the master password authenticating unit 508A.

The input/output unit 511A also outputs information received from one of the password registering unit 506A, the password recovery authenticating unit 507A, and the master password authenticating unit 508A, to the mobile phone 60A.

Structure of the Mobile Phone 60A

The following explains the structure of the mobile phone 60A.

As shown in FIG. 30, the mobile phone 60A comprises a transmitting/receiving unit 601A, a key inputting unit 602A, a controlling unit 603A, a displaying unit 604A, a password recovery receiving unit 605A, an encrypting unit 606A, and an input/output unit 607A.

More specifically, the mobile phone 60A is a computer system comprising a microprocessor, a ROM, a RAM, a display unit, and the like. The ROM stores therein one or more computer programs. The functions of the mobile phone 60A are realized when the microprocessor operates according to the computer programs.

Like a conventional mobile phone, the mobile phone 60A includes a speaker unit, a microphone unit, a calling unit, a memory unit, and the like so as to perform operations as a normal mobile phone.

(1) The Transmitting/Receiving Unit 601A

Explanation will be omitted since the transmitting/receiving unit 601A is the same as the transmitting/receiving unit 201 explained as a part of the structure of the mobile phone 20 in the password recovery system 1.

(2) The Key Inputting Unit 602A

The key inputting unit 602A includes dial keys, function keys, and control keys. When the guarantor information needs to be registered or changed, the key inputting unit 602A receives an input of guarantor information and outputs the received guarantor information to the controlling unit 603A.

When the master password needs to be used, the key inputting unit 602A receives the input of the master password, and outputs the received master password to the controlling unit 603A.

When the master password needs to be recovered, the key inputting unit 602A receives the password recovery instruction information and the function identifying information, and outputs them to the controlling unit 603A.

When the master password needs to be registered or changed, the key inputting unit 602A receives master plaintext information that includes (i) what process should be performed, which is either a new registration or a change, (ii) the master password, and (iii) an encryption key for encrypting the master password, and outputs the received master plaintext information to the controlling unit 603A.

When the decryption key for decrypting the encrypted master password needs to be registered or changed, the key inputting unit 602A receives an input of decryption key information and outputs it to the controlling unit 603A. When the decryption key needs to be changed, in order to re-encrypt the master password after the decryption key is changed, the key inputting unit 602A receives master plaintext information that includes (i) what process should be performed, which is a change (ii) the master password, and (iii) an encryption key that corresponds to the post-change decryption key and is for encrypting the master password, and outputs the received master plaintext information to the controlling unit 603A.

When one of the electronic money function 521A and the scheduling function 522A that are stored in the use information storing unit 520A is to be used, the key inputting unit 602A receives inputs of the master password and the function identifying information, and outputs them to the controlling unit 603A.

The key inputting unit 602A also performs key operations that are the same as those of a conventional mobile phone.

(3) The Controlling Unit 603A

The controlling unit 603A performs the overall operational control of the mobile phone 60A. The controlling unit 603A has a clock function that tells the time.

(a) To Register or Change the Guarantor

When the guarantor needs to be registered or changed, the controlling unit 603A receives the guarantor information from the key inputting unit 602A and outputs the received guarantor information to the memory card with CPU 50A via the input/output unit 607A.

(b) To have the Master Password Recovered

When the master password needs to be recovered, the controlling unit 603A receives the password recovery instruction information and function identifying information from the key inputting unit 602A, and causes activation of password recovery receiving process performed by the password recovery receiving unit 605A. Also, the controlling unit 603A obtains time information using the clock function. The controlling unit 603A then outputs the received password recovery instruction information, the function identifying information, and the time information to the memory card with CPU 50A via the input/output unit 607A. Next, the controlling unit 603A receives an e-mail message in which the signed document is included from the transmitting/receiving unit 601A and outputs the received e-mail message to the password recovery receiving unit 605A.

Then, the controlling unit 603A receives master password recovery completion information from the memory card with CPU 50A via the input/output unit 607A and completes the password recovery receiving process. When it is not acceptable to have the master password recovered, the controlling unit 603A receives the recovery prohibiting information, and outputs the received recovery prohibiting information to the displaying unit 604A so as to complete the password recovery receiving process.

(c) To Use a Function in the Use Information Storing Unit 520A

When one of the electronic money function 521A and the scheduling function 522A needs to be used, the controlling unit 603A receives the master password and the function identifying information from the key inputting unit 602A and outputs them to the memory card with CPU 50A via the input/output unit 607A.

Next, the controlling unit 603A receives reception prohibiting information from the memory card with CPU 50A via the input/output unit 607A and outputs it to the displaying unit 604A.

(d) To Register or Change the Master Password

As for the registration and the change of the master password, explanation will be omitted since they are the same as those performed by the controlling unit 603.

(e) To Register or Change the Decryption Key

As for the registration and the change of the decryption key, explanation will be omitted since they are the same as those performed by the controlling unit 603.

(4) The Displaying Unit 604A

When the decryption key, which is stored in the decryption key storing unit 502A in the memory card with CPU 50A, needs to be changed, the displaying unit 604A receives encryption key changing instruction information from the controlling unit 603A and displays a screen in which the master password and the encryption key for encrypting the master password are to be inputted, with use of the received encryption key changing instruction information, and prompts the user to input them.

When the master password needs to be recovered, the displaying unit 604A receives, from the controlling unit 603A, and displays the recovery prohibiting information.

When one of the functions in the use information storing unit 520A needs to be used, the displaying unit 604A receives reception prohibiting information from the controlling unit 603A and displays it.

The displaying unit 604A also displays other screens that are the same as those of a conventional mobile phone.

(5) The Password Recovery Receiving Unit 605A

Explanation will be omitted since the password recovery receiving unit 605A is the same as the password recovery receiving unit 605.

(6) The Encrypting Unit 606A

When the master password needs to be registered or changed, the encrypting unit 606A receives the master plaintext information from the controlling unit 603A, and encrypts the master password with the encryption key included in the received master plaintext information, so as to generate master encryption information.

Then, the encrypting unit 606A outputs the master encryption information to the memory card with CPU 50A via the input/output unit 607A.

(7) The Input/Output Unit 607A

Explanation will be omitted since the input/output unit 607A is the same as the input/output unit 607.

General Outline of Operations of the Password Recovery System 2A

The following explains the outline of the operations of the password recovery system 2A.

(1) General Outline of Operations at Times of Registering the Guarantor Information Explanation will be omitted since the general outline of the operations for registering the guarantor information is the same as the one shown in the flow chart of FIG. 22.

(2) General Outline of Operations at Times of Registering the Master Password

Explanation will be omitted since the general outline of the operations for registering the master password is the same as the one shown in the flow chart of FIG. 23.

(3) General Outline of Operations at Times of Registering the Decryption Key

Explanation will be omitted since the general outline of the operations for a new registration of a decryption key is the same as the one shown in the flow chart of FIG. 24. Also, explanation will be omitted since the general outline of the operations for a change of a decryption key is the same as the one shown in the flow chart of FIG. 25.

(4) General Outline of Operations at Times of Password Recovery

Figure 31:
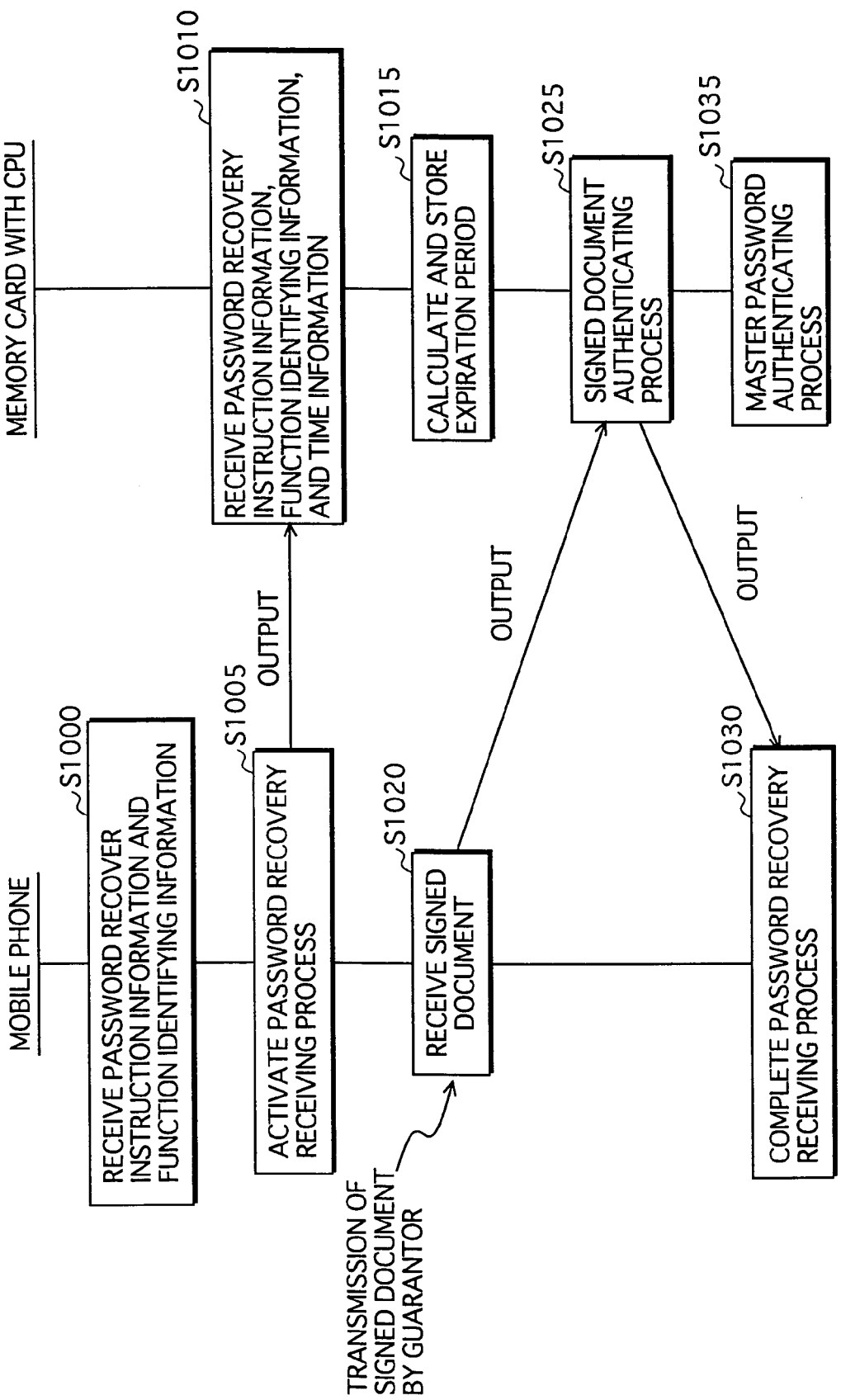
FIG. 31 is a flowchart that shows the operations for having the master password recovered in the password recovery system 2A.

The following explains the general outline of the operations for having the password recovered, with reference to the flow chart in FIG. 31.

The mobile phone 60A receives password recovery instruction information and function identifying information from the user (Step S1000). The mobile phone 60A then causes activation of the password recovery receiving process, and obtains the time information so as to output the time information, the password recovery instruction information, and the function identifying information to the memory card with CPU 50 (Step S1005).

Next, the memory card with CPU 50 receives the password recovery instruction information, the function identifying information, and the time information (Step S1010), and calculates an expiration period using the time information and the stored time limit so as to store therein the expiration period and the function identifying information temporarily (Step S1015).

Then, the mobile phone 60A receives an e-mail message that includes a signed document from a guarantor, performs the password recovery receiving process so as to obtain the signed document included in the received e-mail message, and outputs the obtained signed document to the memory card with CPU 50A (Step S1020).

The memory card with CPU 50A performs signature authentication with use of (i) the received signed document, (ii) a public key certificate that is stored in the password recovery management storing unit 501A and corresponds to the guarantor who has sent the signed document, (iii) the number of signed documents required for the password recovery, the number being included in the password recovery specified value information, and (iv) the calculated expiration period, and judges if it is acceptable to have the password recovered. When it is acceptable to have the password recovered, the memory card with CPU 50A decrypts the master password and outputs password recovery completion information to the mobile phone 60A via the input/output unit 511A (Step S1025). When it is judged that it is not acceptable to have the password recovered in Step S1020, the memory card with CPU 50A outputs recovery prohibiting information to the mobile phone 60A via the input/output unit 511A.

In addition, the memory card with CPU 50A performs master password authenticating process using the decrypted master password (Step S1035).

Having received the password recovery completion information from the memory card with CPU 50A, the mobile phone 60A completes the password recovery receiving process. Having received the recovery prohibiting information, the mobile phone 60A displays, on the displaying unit 604A, the received recovery prohibiting information so as to complete the password recovery receiving process (Step S1030).

(5) General Outline of Operations at Times of Authenticating the Master Password Explanation will be omitted since the general outline of the operations for authenticating the master password is the same as that in the password recovery system 1.

It should be noted that, in the master password authenticating process performed by the memory card with CPU 50A, the encrypted master password gets decrypted with use of the decryption key stored in the decryption key storing unit 502A.

(6) Operations During the Signed Document Authenticating Process

The following explains particular differences in the operations during the signed document authenticating process with reference to the flow charts in FIGS. 27 and 28.

During the signed document authenticating process, after the decryption process is performed in Step S890, there is a difference in the following operation performed in Step S895.

The password recovery authenticating unit 106A receives the master password decrypted by the decrypting unit 510A, and outputs the decrypted master password and function identifying information to the master password authenticating unit 508A, so that the master password authenticating unit 508A performs the master password authenticating process.

(7) Operations During the Master Password Authenticating Process

Figure 32:
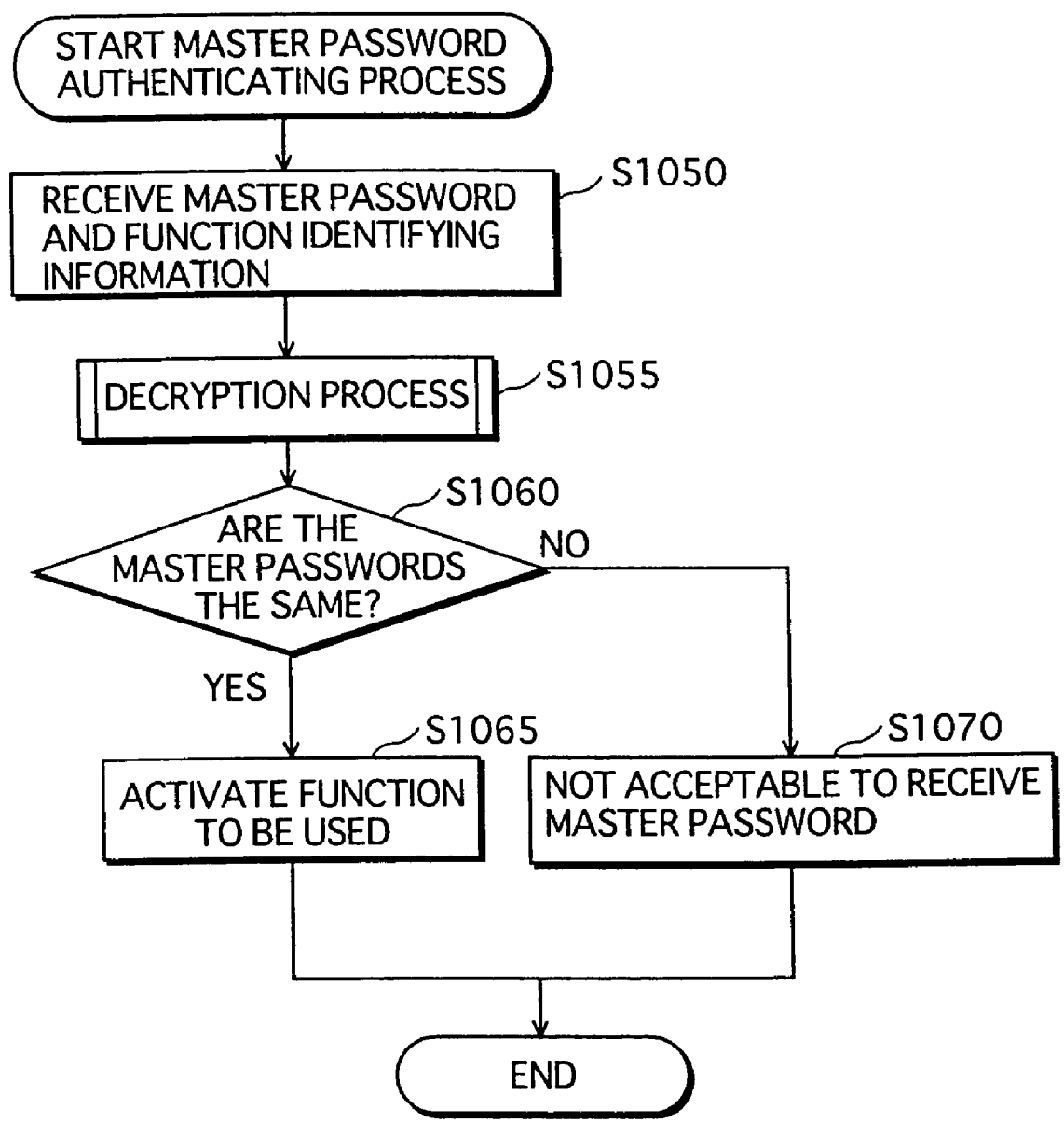
FIG. 32 is a flow chart that shows the operations during the master password authenticating process in the password recovery system 2A.

The following explains the operations during the master password authenticating process, with reference to the flow chart in FIG. 32.

The master password authenticating unit 508A receives the master password and the function identifying information from the password recovery authenticating unit 507A or the mobile phone 60A (Step S1050).

Next, the master password authenticating unit 508A outputs master decryption information to the decrypting unit 510A, so that the decrypting unit 510A performs decryption process (Step S1055).

Then, the master password authenticating unit 508A receives the decrypted master password from the decrypting unit 510A, and judges whether the received master password and the master password that has been received from the password recovery authenticating unit 507A or the mobile phone 60A are the same or not (Step S1060).

When they are the same, the master password authenticating unit 508A causes activation of the function that corresponds to the function identifying information that has been received from the password recovery authenticating unit 507A or the mobile phone 60A (Step S1065). When they are not the same, the master password authenticating unit 508A outputs reception prohibiting information for the master password to the mobile phone 60A (Step S1070)

(8) Operations During the Decryption Process

The following explains particular differences in the operations during the decryption process, with reference to the flow chart in FIG. 29.

In Step S950, the difference is that either recovery permitting information or master decryption information is received.

Steps S970 through S985 should be deleted. In other words, the difference is that Step S990 follows Step S965.

It should be noted that in Step S990 the master password is outputted to either the password recovery authenticating unit 507A or the master password authenticating unit 508A.

Other Modification Examples

The embodiment and the modification so far explained are mere examples of the present invention. The present invention is not limited to the aforementioned embodiment and may be embodied in various modes within the scope of the gist of the invention. The following cases are also included in the present invention:

(1) In the password recovery system 2, it is also acceptable to use a signed document as the master password. In such a case, the master password will be recovered in the following manner:

At first, the memory card with CPU 50 receives a signed document and judges whether the received signed document has actually been generated by a guarantor and also is within the expiration period.

When it is judged that the signed document has been generated by a guarantor and is within the expiration period, the memory card with CPU 50 judges if the master password and the received signed document are the same or not. When they are the same, the mobile phone 60 displays the signed document. When they are not the same, the mobile phone 60 displays recovery prohibiting information.

Also, in the password recovery system 2A, it is acceptable to use a signed document as the master password, as well. In such a case, the master password will be recovered in the following manner:

At first, the memory card with CPU 50A receives the password recovery instruction information and the function identifying information, and calculates an expiration period so as to store therein the expiration period and the function identifying information temporarily. Then, having received a signed document, the memory card with CPU 50A judges if the received signed document has actually been generated by a guarantor and is within the expiration period or not.

When it is judged that the signed document has been generated by a guarantor and is within the expiration period, the memory card with CPU 50A judges if the master password and the received signed document are the same or not. When they are the same, the memory card with CPU 50A causes activation of the function that corresponds to the temporarily stored function identifying information. When they are not the same, the mobile phone 60A displays recovery prohibiting information.

(2) In the password recovery system 2, the master password is displayed after being decrypted; however, the present invention is not limited to this arrangement. It is also acceptable to make the service password storing unit 504 accessible after the master password is recovered, so that the service password becomes usable.

In the password recovery system 2A, the function that corresponds to function identifying information gets activated after the master password is recovered; however the present invention is not limited to this arrangement. It is also acceptable to make the function that corresponds to the function identifying information accessible after the master password is recovered, so that the function becomes usable.

(3) In the password recovery system 2A, it is also acceptable that the memory card with CPU 50A includes, in the use information storing unit 520A, a memory, which is an area for storing data files, and when the master password needs to be recovered, the memory card with CPU 50A receives a master password recovery instruction information, time information, and function identifying information indicating that the memory is to be used, so that the memory unit becomes usable after the master password is recovered.

(4) In the password recovery system 2, the master password is stored after being encrypted; however, the present invention is not limited to this arrangement. It is also acceptable to store the master password without encrypting it. In such a case, the master password storing unit 503 will be arranged to be a tamper-proof area. Also, it is acceptable to store service passwords without encrypting it. In such a case, the service password storing unit 504 will be arranged to be a tamper-proof area.

In the password recovery system 2A, it is acceptable to store the master password without encrypting it, as well. In such a case, the master password storing unit 503A will be arranged to be a tamper-proof area.

(5) In the password recovery system 2, the password recovery specified value information includes (i) the number of signed documents required for the password recovery and (ii) a time limit for the password recovery; however, the present invention is not limited to this arrangement. It is also acceptable that the password recovery specified value information includes one of the number of signed documents required for the password recovery and a time limit for the password recovery.

In the password recovery system 2A, is it also acceptable that the password recovery specified value information includes one of the number of signed documents required for the password recovery and a time limit for the password recovery.

(6) In the password recovery system 2, the memory card with CPU 50 stores therein in advance the password recovery specified value information; however the present invention is not limited to this arrangement. It is also acceptable that the mobile phone 60 receives the password recovery specified value information at the time of the password recovery. In such a case, the memory card with CPU 50 receives the password recovery specified value information and the time information from the mobile phone 60 and calculates an expiration period using the time limit included in the password recovery specified value information and the time information so as to store therein the calculated expiration period and the number of signed documents required for the password recovery, the number being included in the password recovery specified value information.

Alternatively, it is also acceptable that the password recovery specified value information includes an expiration period instead of a time limit, and the mobile phone 60 receives the password recovery specified value information at the time of the password recovery. In such a case, the memory card with CPU 50 receives the password recovery specified value information from the mobile phone 60 so as to store therein the expiration period and the number of signed documents required for the password recovery that are included in the password recovery specified value information.

In the password recovery system 2A, it is also acceptable that the mobile phone 60A receives the password recovery specified value information at the time of the password recovery. In such a case, the memory card with CPU 50A receives the password recovery specified value information and the time information from the mobile phone 60A and calculates an expiration period using the time limit included in the password recovery specified value information and the time information so as to store therein the calculated expiration period and the number of signed documents required for the password recovery, the number being included in the password recovery specified value information.

Alternatively, it is also acceptable that the password recovery specified value information includes an expiration period instead of a time limit, and the mobile phone 60A receives the password recovery specified value information at the time of the password recovery. In such a case, the memory card with CPU 50A receives the password recovery specified value information from the mobile phone 60A so as to store therein the expiration period and the number of signed documents required for the password recovery that are included in the password recovery specified value information.

(7) It is also acceptable that the aforementioned embodiments and modification examples are combined.

2.11 Summary of Second Embodiment

As explained so far, in the password recovery system 2, signed documents from the guarantors who are appointed by the user are arranged to be the information required for the password recovery. The guarantors are able to doubtlessly judge whether the password recovery is requested by the user himself/herself or not, and the signed data included in the signed documents transmitted to the user guarantees that those who have sent the documents are the guarantors themselves. Thus, the level of security when the password is recovered is enhanced. In this arrangement, when a password that has been forgotten needs to be recovered, the password recovery system 2 receives the signed documents generated by the guarantors and performs signature authentication to judge whether each received signed document has been actually generated by a registered guarantor or not, with use of the received signed documents and the public key certificates that have been stored in advance in the memory card with CPU 50. Only when the signed documents are the ones generated by the guarantors, the user is able to recover the password.

In addition, the password recovery system 2 stores therein in advance an expiration period for receiving a signed document at the time of password recovery, and receives a signed document to which a time stamp indicating the date and time when the signed document has been generated is attached. With this arrangement, the password recovery system 2 is capable of judging whether each received signed document is within the expiration period or not, and thus it is possible to enhance the reliability of each received signed document being a signed document in response to the user's most recent request. This way, the security level at times of password recovery is further improved.

In addition, since the master password and the service passwords are encrypted and stored in the memory card with CPU 50 so as to be decrypted when necessary, the security level of the memory card with CPU 50 itself is improved.

Additionally, service passwords for using different network services are managed altogether with use of a master password, and when the master password is inputted, a corresponding service password will be automatically transmitted to the particular network service the user wishes to use in order for the user to log in the service; therefore, this system will save the user the troubles of remembering all the service passwords.

Further, the password recovery system 2A receives function identifying information when the master password needs to be recovered. With this arrangement, the function that corresponds to the function identifying information is activated with use of the master password that has been recovered. This arrangement will save the user the troubles of inputting the master password, and make the operations simpler.

SUMMARY

The second embodiment of the present invention provides a password recovery system that re-supplies a password to a user who has forgotten the password and includes a communication terminal device and a portable password recording medium having the password recorded thereon and being mounted on the communication terminal device, wherein (i) the communication terminal device comprises: a receiving unit operable to receive, from an external communication terminal device, a signed document that includes (a) signed data generated by digitally signing information for identifying a sender with use of a secret key and (b) a password recovery document indicating that password recovery is requested by the user; and an outputting unit operable to output the received signed document to the password recording medium, and (ii) the password recording medium comprises: a public key storing unit that stores therein a public key generated with use of the secret key; a password storing unit that stores the password therein; a reception unit operable to receive the outputted signed document; and a reading unit operable to read the public key from the public key storing unit, perform signature authentication using the read public key and the signed data in the signed document so as to judge if the received signed document has been generated by the sender, and when it is judged that the signed document has been generated by the sender, read the password from the password storing unit.

With this arrangement, since the password recovery system receives a signed document, performs signature authentication with use of the signed document and the public key stored in the public key storing unit, and reads the password when the signed document has been generated by the sender, it is possible to have the password recovered only for the legitimate user of the password. The reason for this is that normally only the sender of the signed document is able to use the secret key, and it is difficult for a third party to use the secret key at the time of password recovery. Further, there is no possibility that the person who is able to use the secret key would send a signed document to a third party other than the legitimate user of the password.

Here, it is also acceptable to have an arrangement wherein, the password recording medium further comprises an expiration period storing unit that stores therein an expiration period for receiving the signed document, the signed document received by the receiving unit has date/time information attached thereto, the date/time information indicating a date and time at which the signed document has been generated, and the reading unit (i) performs the signature authentication so as to judge if the received signed document has been generated by the sender, (ii) judges if the date/time information attached to the signed document is within the expiration period stored in the expiration period storing unit, and (iii) when it is judged that the received signed document has been generated by the sender and also that the date/time information is within the expiration period, reads the password from the password storing unit.

With this arrangement, the password recovery system is able to read the password when the signed document has been generated by the sender and is also within the expiration period.

Here, it is also acceptable to have an arrangement wherein, the password recording medium further comprises a signed document number storing unit that stores therein the number of signed documents required for the password recovery, and the reading unit (i) performs the signature authentication so as to judge if the received signed document has been generated by the sender, (ii) when it is judged that the signed document has been generated by the sender, counts the received signed document as a valid signed document for the password recovery, and (iii) when the number of valid signed documents has reached the number stored in the signed document number storing unit, reads the password from the password storing unit.

With this arrangement, the password recovery system is able to read the password when the number of signed documents valid for the password recovery has reached the number of signed documents required for the password recovery.

The present invention further provides a communication terminal device that re-supplies a password to a user who has forgotten the password, the communication terminal device comprising: a public key storing unit that stores there in a public key generated with use of a secret key; a password storing unit that stores the password therein; a receiving unit operable to receive, from an external communication device, a signed document that includes (a) signed data generated by digitally signing information for identifying a sender with use of a secret key and (b) a password recovery document indicating that password recovery is requested by the user; and a reading unit operable to (i) read the public key stored in the public key storing unit, (ii) perform signature authentication so as to judge if the received signed document has been generated by the sender, with use of the read public key and the signed data in the received signed document, and (iii) when it is judged that the signed document has been generated by the sender, read the password from the password storing unit.

With this arrangement, since the communication terminal device receives a signed document, performs signature authentication with use of the signed document and a public key stored in the public key storing unit, and reads the password when the signed document has been generated by the sender, it is possible to have the password recovered only for the legitimate user of the password. The reason for this is that normally only the sender of the signed document is able to use the secret key, and it is difficult for a third party to use the secret key at the time of password recovery. Further, there is no possibility that the person who is able to use the secret key would send a signed document to a third party other than the legitimate user of the password.

Here, it is also acceptable to have an arrangement wherein the communication terminal device further comprises an expiration period storing unit that stores therein an expiration period for receiving the signed document, the signed document received by the receiving unit has date/time information attached thereto, the date/time information indicating a date and time at which the signed document has been generated, and the reading unit (i) reads the public key stored in the public key storing unit, (ii) performs the signature authentication so as to judge if the received signed document has been generated by the sender, with use of the read public key and the signed data in the received signed document, (iii) judges if the date/time information attached to the signed document is within the expiration period stored in the expiration period storing unit, and (iv) when it is judged that the received signed document has been generated by the sender and also that the date/time information is within the expiration period, reads the password from the password storing unit.

With this arrangement, the communication terminal device is able to read the password when the signed document has been generated by the sender and is also within the expiration period.

Here, it is also acceptable to have an arrangement, wherein the communication terminal device further comprises a signed document number storing unit that stores therein the number of signed documents required for the password recovery, and the reading unit (i) performs the signature authentication so as to judge if the received signed document has been generated by the sender, (ii) when it is judged that the signed document has been generated by the sender, counts the received signed document as a valid signed document for the password recovery, and (iii) when the number of valid signed documents has reached the number stored in the signed document number storing unit, reads the password from the password storing unit.

With this arrangement, the communication terminal device is able to read the password when the number of signed documents valid for the password recovery has reached the number of signed documents required for the password recovery.

Here, it is also acceptable to have an arrangement wherein the communication terminal device further comprises a displaying unit operable to display the password read by the reading unit.

With this arrangement, the communication terminal device is able to display the read password.

Here, it is also acceptable to have an arrangement wherein the communication terminal device further comprises an application storing unit that stores therein a piece of application software that corresponds to the password; and an application executing unit operable to execute the piece of application software, using the password read by the reading unit.

With this arrangement, the communication terminal device is able to execute the piece of application software that corresponds to the read password.

Further, the present invention provides a password recording medium that is portable and operable to re-supply a password to a user who has forgotten the password, comprising: a public key storing unit that stores therein a public key generated with use of a secret key; a password storing unit that stores the password therein; a receiving unit operable to receive, from a communication terminal device on which the password recording medium is mounted, a signed document that includes (i) signed data generated by digitally signing information for identifying a sender with use of a secret key and (ii) a password recovery document indicating that password recovery is requested by the user; and a reading unit operable to read the public key from the public key storing unit, perform signature authentication using the read public key and the received signed data so as to judge if the received signed document has been generated by the sender, and when it is judged that the signed document has been generated by the sender, read the password from the password storing unit.

With this arrangement, since the password recording medium receives a signed document from the communication terminal device, performs signature authentication with use of the received signed document and the public key stored in the public key storing unit, and reads the password when the signed document has been generated by the sender, it is possible to have the password recovered only for the legitimate user of the password. The reason for this is that normally only the sender of the signed document is able to use the secret key, and it is difficult for a third party to use the secret key at the time of password recovery. Further, there is no possibility that the person who is able to use the secret key would send a signed document to a third party other than the legitimate user of the password.

Here, it is also acceptable to have an arrangement wherein the password recording medium further comprises an expiration period storing unit that stores therein an expiration period for receiving the signed document, the password recording medium receives, from the communication terminal device, a signed document which has date/time information attached thereto, the date/time information indicating a date and time at which the signed document has been generated, the reading unit (i) performs signature authentication so as to judge if the received signed document has been generated by the sender, (ii) judges if the time/date information attached to the signed document is within the expiration period stored in the expiration period storing unit, and (iii) when it is judged that the received signed document has been generated by the sender and also that the date/time information is within the expiration period, reads the password from the password storing unit.

With this arrangement, the password recording medium is able to read the password when the signed document has been generated by the sender and is also within the expiration period.

Here, it is also acceptable to have an arrangement, wherein the password recording medium further comprises a signed document number storing unit that stores therein the number of signed documents required for the password recovery, and the reading unit (i) performs the signature authentication so as to judge if the received signed document has been generated by the sender, (ii) when it is judged that the signed document has been generated by the sender, counts the received signed document as a valid signed document for the password recovery, and (iii) when the number of valid signed documents has reached the number stored in the signed document number storing unit, reads the password from the password storing unit.

With this arrangement, the password recording medium is able to read the password when the number of signed documents valid for the password recovery has reached the number of signed documents required for the password recovery.

Here, it is also acceptable to have an arrangement wherein the password recording medium further comprises an outputting unit operable to output the password read by the reading unit to the communication terminal device.

With this arrangement, the password recording medium is able to output the read password to the communication terminal device.

Here, it is also acceptable to have an arrangement wherein the password recording medium further comprises an application storing unit that stores therein a piece of application software that corresponds to the password; and an application executing unit operable to execute the piece of application software, using the password read by the reading unit.

With this arrangement, the password recording medium is able execute the piece of application software that corresponds to the read password.

The present invention further provides a password recovery method to be used by a password recording medium that is portable and operable to re-supply a password to a user who has forgotten the password, wherein the password recording medium comprises: a public key storing unit that stores therein a public key generated with use of a secret key; and a password storing unit that stores the password therein, and the password recovery method comprises: a receiving step of receiving a signed document that includes (a) signed data generated by digitally signing information for identifying a sender with use of a secret key and (b) a password recovery document indicating that password recovery is requested by the user; and a reading step of (i) reading the public key stored in the public key storing unit, (ii) performing signature authentication so as to judge if the received signed document has been generated by the sender, with use of the read public key and the received signed data, and (iii) when it is judged that the signed document has been generated by the sender, reading the password from the password storing unit.

The present invention further provides a password recovery program to be used for a password recording medium that is portable and operable to re-supply a password to a user who has forgotten the password, wherein the password recording medium comprises: a public key storing unit that stores therein a public key generated with use of a secret key; and a password storing unit that stores the password therein, and the password recovery program comprises: a receiving step of receiving a signed document that includes (a) signed data generated by digitally signing information for identifying a sender with use of a secret key and (b) a password recovery document indicating that password recovery is requested by the user; and a reading step of (i) reading the public key stored in the public key storing unit, (ii) performing signature authentication so as to judge if the received signed document has been generated by the sender, with use of the read public key and the received signed data, and (iii) when it is judged that the signed document has been generated by the sender, reading the password from the password storing unit.

The present invention also provides a computer-readable program-recording medium on which a password recovery program is recorded, the password recovery program being used for a password recording medium that is portable and operable to re-supply a password to a user who has forgotten the password, wherein the password recording medium comprises: a public key storing unit that stores therein a public key generated with use of a secret key; and a password storing unit that stores the password therein, and the password recovery program comprises: a receiving step of receiving a signed document that includes (a) signed data generated by digitally signing information for identifying a sender with use of a secret key and (b) a password recovery document indicating that password recovery is requested by the user; and a reading step of (i) reading the public key stored in the public key storing unit, (ii) performing signature authentication so as to judge if the received signed document has been generated by the sender, with use of the read public key and the received signed data, and (iii) when it is judged that the signed document has been generated by the sender, reading the password from the password storing unit.

3. Overall Summary

As explained so far, according to the present invention, since either utilization of the caller's telephone number notifying service or the guarantor system is applied to judgment of whether it is acceptable to have the password recovered, the password is recovered in recognition that the password recovery is undoubtedly requested by the user himself/herself; therefore, the security level at times of password recovery is enhanced. The possibilities that a third party acquires the password and "spoofs" as the user or obtains/tampers the data owned by the user become lower. Thus, the user will be able to use the network services, feeling safer than before.

Also, the master password and the service passwords are encrypted and stored in a memory card with CPU so as to be decrypted when necessary; therefore, the security level of the memory card with CPU it self is improved.

Additionally, service passwords for using different network services are managed altogether with use of a master password, and when the master password is inputted, a corresponding service password will be automatically transmitted to the particular network service the user wishes to use in order for the user to log in the service; therefore, this system will save the user the troubles of remembering all the service passwords.

Other Modification Examples

The present invention has been explained so far based on the embodiments as above; however, needless to say, the present invention is not limited to those embodiments. The following cases are also included in the present invention:

(1) In the first embodiment mentioned above, the registration number is the telephone number of the phone line for which the user is contracted; however it is also acceptable to arrange it so that the registration number is the telephone number of the mobile phone.

(2) In the first embodiment mentioned above, the telephone number is inputted through the key inputting unit when a registration number needs to be newly registered; however, it is also acceptable to arrange it so that a phone call is made from a telephone connected to the phone line to which the new telephone number to be registered is assigned, and the telephone number is obtained and registered into the password recovery management storing unit.

In such a case, after the telephone number is obtained, the obtained telephone number will be displayed on the displaying unit. When the user confirms the displayed telephone number, the user instructs a registration through the key inputting unit so that a new registration is performed.

(3) In the first embodiment mentioned above, the telephone number is inputted through the key inputting unit when the registration number needs to be changed; however, it is also acceptable to arrange it so that a phone call is made from a telephone connected to the phone line to which the post-change telephone number is assigned, and the telephone number is obtained. Then, in order to identify that it is the user himself/herself, only when the inputted master password is the same as the master password that is stored in the master password storing unit, a change will be made to the password recovery management storing unit.

When the master password needs to be re-encrypted after a change is made to the password recovery management storing unit, the master password and the registration number will be inputted through the key inputting unit.

(4) In the first embodiment mentioned above, the service passwords are managed with use of the master password; however when each service password is individually managed without using the master password, it is also acceptable to set the registration number as the information required for recovering each service password and to have a service password recovered.

In such a case, it is acceptable that each service password gets encrypted with a corresponding registration number being an encryption key, and gets decrypted with the registration number being a decryption key. Alternatively, it is also acceptable that the service passwords are stored, without being encrypted, in a tamper-proof area.

(5) In the first embodiment mentioned above, a mobile phone is used as a communication terminal device that obtains the received number to have the password recovered; however, it is not limited to the mobile phone, and it is also acceptable to use other communication terminal devices that are capable of receiving the received number.

(6) In the first embodiment mentioned above, a mobile phone is used as a communication terminal device that has inputs to and outputs from the memory card with CPU; however, it is not limited to the mobile phone, and it is also acceptable to use other communication terminal devices that are capable of having inputs to and outputs from the memory card with CPU, to have the password recovered. In such cases, it needs to be arranged so that the received number is already stored temporarily in the password recovery authenticating unit in the memory card with CPU.

(7) In the first embodiment mentioned above, the registration number is used as the information required for having the master password recovered; however it is also acceptable to use the registration number as key information for a digital safe so that when the registration number and the received number are the same, the contents of the digital safe can be obtained.

(8) In the first embodiment mentioned above, the common key encryption method is used to encrypt the master password with the registration number being a common key; however, it is also acceptable to use the public key encryption method instead.

It should be noted that the memory card with CPU needs to store therein a decryption key for decrypting the encrypted master password.

(9) In the second embodiment mentioned above, the service passwords are managed with use of the master password; however when each service password is managed individually without using the master password, it is acceptable to use a signed document as the information required for having each service password recovered, so that each service password can be recovered. In such a case, each service password is encrypted with an encryption key that corresponds to a decryption key stored in the memory card with CPU, and when decryption is necessary each encrypted service password gets decrypted with the decryption key. Alternatively, it is also acceptable that the service passwords are stored, without being encrypted, in a tamper-proof area.

(10) In the second embodiment mentioned above, the signed documents are received by e-mail; however, it is also acceptable to have a recording medium store signed documents and to receive the signed documents using a device that is capable of having inputs to and outputs from the recording medium and the memory card with CPU.

(11) In the second embodiment mentioned above, a mobile phone is used as a communication terminal device that receives e-mail messages when the master password needs to be recovered; however, it is not limited to the mobile phone, and it is acceptable to use other communication terminal devices that are capable of receiving e-mail messages.

(12) In the second embodiment mentioned above, a mobile phone is used as a communication terminal device that has inputs to and outputs from the memory card with CPU when the master password needs to be recovered; however, it is not limited to a mobile phone and it is also acceptable to use other communication terminal devices that are capable of having inputs to and outputs from a memory card with CPU to have the password recovered. In such cases, it needs to be arranged so that the signed documents are already stored temporarily in the password recovery authenticating unit in the memory card with CPU.

(13) In the second embodiment mentioned above, signed documents are used as the information required for having the master password recovered; however it is also acceptable to use signed document as key information for a digital safe so that when signed documents are received, the contents of the digital safe can be obtained.

(14) In the second embodiment mentioned above, the public key encryption method is used for encrypting the master password; however, it is also acceptable to use the common key encryption method instead.

It should be noted that the decryption key storing unit needs to store therein the encryption key used for encrypting the master password.

(15) In the embodiments mentioned above, the password recovery systems each comprise a mobile phone and a memory card with CPU; however, it is also acceptable that they comprise only communication terminal devices such as mobile phones.

(16) In the embodiments mentioned above, the process of having the password recovered is performed inside the memory card with CPU; however, it is not limited to the memory card with CPU and it is also acceptable to use other memory cards that are capable of performing the process of having passwords recovered. Further, it is also acceptable to provide a center that performs the process of having passwords recovered and have the center perform the process.

(17) In the embodiments mentioned above, the password is recovered when it has been forgotten; however, it is also acceptable to have the password recovered in order to confirm the password that has been registered.

(18) In the embodiments mentioned above, the common key encryption method is used to encrypt a service password with the master password being a common key; however, it is also acceptable to use the public key encryption method instead. It should be noted that the memory card with CPU needs to store therein a decryption key for decrypting the encrypted service password.

(19) The present invention is applied to recovery of a master password that manages certain information (for example, service passwords); however, the present invention is not limited to this. It is also acceptable if the present invention is applied to such information itself.

For example, it is acceptable to apply the present invention to a management system that manages information that needs to be kept secret from a third party (hereafter, such information will be referred to as "secret information"). When the first embodiment of the present invention is applied, the management system has an arrangement wherein only when the received number and the registration number are the same, the secret information will be displayed and become usable.

When the second embodiment of the present invention is applied, the management system has an arrangement wherein only when the number of legitimate signed documents received has reached a predetermined number within an expiration period, the secret information will be displayed and become usable.

As a specific example of a management system to which the first embodiment of the present invention is applied, explanation is provided using the password recovery system 1A and focusing on the differences. The management system comprises a memory card with CPU 10B and a mobile phone 20B. The master password storing unit 102A, the password registering unit 105A, the master password authenticating unit 107A, and the decrypting unit 109A, which are included in the memory card with CPU 10A, are not included in the memory card with CPU 10B. The encrypting unit 206A, which is included in the mobile phone 20A, is not included in the mobile phone 20B. The use information storing unit included in the memory card with CPU 10B is an area that is normally not accessible.

The memory card with CPU 10B receives function identifying information and a received number from the mobile phone 20B, and judges whether the stored registration number and the received number are the same or not. When it is judged that they are the same, a function that corresponds to the function identifying information will be activated. For example, when the function identifying information indicates a scheduling function, schedule data (e.g. items in a monthly schedule) will be displayed on the mobile phone 20B, and the user will become able to see or update the schedule data. When the memory card with CPU 10B judges that they are not the same, the function corresponding to the function identifying information will not be activated.

In other words, the user is able to use the functions stored in the use information storing unit only when the received number and the registration number are the same.

As a specific example of a management system to which the second embodiment of the present invention is applied, explanation is provided using the password recovery system 2A and focusing on the differences. The management system comprises a memory card with CPU 50B and a mobile phone 60B. The decryption key storing unit 502A, the master password storing unit 503A, the password registering unit 506A, the master password authenticating unit 508A, and the decrypting unit 510A, which are included in the memory card with CPU 50A, are not included in the memory card with CPU 50B. The encrypting unit 606A, which is included in the mobile phone 60A, is not included in the mobile phone 60B. The use information storing unit included in the memory card with CPU 50B is an area that is normally not accessible.

The memory card with CPU 50B receives, from the mobile phone 60B, function identifying information and time information, and calculates an expiration period. The memory card with CPU 50B then receives a signed document from the mobile phone 60B, and counts it as a received signed document. The memory card with CPU 50B further obtains, from among one or more public key certificates that are stored, a public key certificate that corresponds to a guarantor who has sent the signed document. The memory card with CPU 50B performs signature authentication and judges if the received signed document has been actually generated by the guarantor with use of the obtained public key certificate and the signed document, and judges if the signed document is within the expiration period with use of a time stamp attached to the signed document. When it is judged that the signed document has been generated by the guarantor and is within the expiration period, the signed document will be counted as a valid one. When the number of valid signed documents has reached a predetermined number, a function that corresponds to the function identifying information will be activated. For example, when the function identifying information indicates a scheduling function, schedule data (e.g. items in a monthly schedule) will be displayed on the mobile phone 60B, and the user will become able to see or update the schedule data. When the memory card with CPU has received a signed document from each of all the guarantors and the number of valid signed documents has not reached the predetermined number, the function corresponding to the function identifying information will not be activated.

In other words, the user is able to use the functions stored in the use information storing unit only when the number of received legitimate signed documents has reached the predetermined number within the expiration period.

Consequently, it is possible to manage such information that needs to be kept secret from a third party with use of something besides a password.

(20) It is also acceptable to construe the present invention as methods mentioned above. Further, it is also acceptable to construe the present invention as computer programs that realize these methods with use of computers or as digital signals for these computer programs.

In addition, it is also acceptable to construe the present invention as a computer-readable recording medium, e.g. a flexible disk, a hard disk, a CD-ROM, an MO, a DVD, a DVD-ROM, a DVD-RAM, and a BD (Blu-ray Disc), and a semiconductor memory onto which such computer programs or such digital signals are recorded. Alternatively, the present invention may be construed as such computer programs or such digital signals that are recorded onto these recording media.

Further, the present invention may be construed as such computer programs or such digital signals that are transferred via a telecommunication line, a wireless or wired communication line, a network represented by the Internet, or the like.

Furthermore, the present invention may be construed as a computer system comprising a microprocessor and a memory wherein the memory stores therein the computer programs mentioned above, and the microprocessor operates according to the computer programs.

It is also acceptable that such programs or such digital programs are executed on another independent computer system after being transferred by being recorded on the recording media mentioned above or being transferred via the network mentioned above.

(21) Additionally, it is also acceptable to combine the embodiments and the modification examples that are mentioned above.

4. Advantageous Effects of the Invention

As explained so far, the present invention provides a password recovery system a password recovery system that re-supplies a password to a user who has forgotten the password and includes a communication terminal device and a portable password recording medium having the password recorded thereon and being mounted on the communication terminal device, wherein (i) the communication terminal device comprises: a receiving unit operable to receive a first telephone number of a caller via a caller's telephone number notifying service; and an outputting unit operable to output the received first telephone number to the password recording medium, and (ii) the password recording medium comprises: a telephone number storing unit that stores therein a second telephone number to be used as a criterion in judgment of whether it is acceptable to re-supply the password; a password storing unit that stores the password therein; a reception unit operable to receive the outputted first telephone number; and a reading unit operable to judge whether the received first telephone number is the same as the second telephone number, and read the password from the password storing unit when the judgment is in the affirmative.

With this arrangement, since the password recovery system receives the first telephone number via a caller's telephone number notifying system and reads the password when the first telephone number is the same as the second telephone number, it is possible to have the password recovered only for the legitimate user of the password. The reason for this is that normally only limited members are able to use the first telephone number, and it is difficult for a third party to use the first telephone number for recovering the password. Further, there is no possibility that someone who is able to use the first telephone number would notify the first telephone number to a third party other than the user via a caller's telephone number notifying service.

Here, it is also acceptable to have an arrangement wherein the communication terminal device further comprises: a number receiving unit operable to receive the second telephone number; and a number outputting unit operable to output the received second telephone number to the password recording medium, and the password recording medium further comprises: a writing unit operable to receive the second telephone number from the communication terminal device and write the second telephone number to the telephone number storing unit.

With this arrangement, the password recovery system is able to write the second telephone number to the telephone number storing unit.

Further, it is also acceptable to have an arrangement wherein the number receiving unit further receives a third telephone number that is different from the second telephone number, the number outputting unit further outputs the third telephone number received by the number receiving unit to the password recording medium, the communication terminal device further comprises a password receiving unit operable to receive a password from the user and output the password to the password recording medium, the password recording medium further comprises a password authenticating unit operable to authenticate passwords by judging if the password received by the password receiving unit is the same as the password stored in the password storing unit, and the writing unit further rewrites the second telephone number stored in the telephone number storing unit with the third telephone number when the password received by the password receiving unit is judged to be the same as the password stored in the password storing unit.

With this arrangement, the password recovery system is able to rewrite the second phone number with the third phone number.

The present invention also provides a communication terminal device that re-supplies a password to a user who has forgotten the password, comprising: a receiving unit operable to receive a first telephone number of a caller via a caller's telephone number notifying service; a telephone number storing unit that stores therein a second telephone number to be used as a criterion in judgment of whether it is acceptable to re-supply the password; a password storing unit that stores the password therein; and a reading unit operable to judge whether the received first telephone number is the same as the second telephone number, and read the password from the password storing unit when the judgment is in the affirmative.

With this arrangement, since the communication terminal device receives the first telephone number via a caller's telephone number notifying service, and reads the password when the received first telephone number is the same as the second telephone number, it is possible to have the password recovered only for the legitimate user of the password. The reason for this is that normally only limited members are able to use the first telephone number, and it is difficult for a third party to use the first telephone number for having the password recovered. Further, there is no possibility that someone who is able to use the first telephone number would notify the first telephone number to a third party other than the user via a caller's telephone number notifying service.

Here, it is also acceptable to have an arrangement wherein the communication terminal device further comprises a number receiving unit operable to receive the second telephone number; and a writing unit operable to write the received second telephone number to the telephone number storing unit.

With this arrangement, the communication terminal device is able to write the second telephone number to the telephone number storing unit.

It is also acceptable to have an arrangement, wherein the number receiving unit further receives a third telephone number that is different from the second telephone number, the communication terminal device further comprises (i) a password receiving unit operable to receive a password from the user and (ii) a password authenticating unit operable to authenticate passwords by judging if the password received by the password receiving unit is the same as the password stored in the password storing unit, and the writing unit further rewrites the second telephone number stored in the telephone number storing unit with the third telephone number when the password received by the password receiving unit is judged to be the same as the password stored in the password storing unit.

With this arrangement, the communication terminal device is able to rewrite the second telephone number with the third telephone number.

Further, it is acceptable to have an arrangement wherein the communication terminal device further comprises a displaying unit operable to display the password read by the reading unit.

With this arrangement, the communication terminal device is able to display the read password.

Here, it is also acceptable to have an arrangement wherein the communication terminal device further comprises: an application storing unit that stores therein a piece of application software that corresponds to the password; and an application executing unit operable to execute the piece of application software, using the password read by the reading unit.

With this arrangement, the communication terminal device is able to execute the piece of application software that corresponds to the read password.

It is further acceptable to have an arrangement wherein the password is the second telephone number, the reading unit judges whether the received first telephone number is the same as the second telephone number, and reads the second telephone number from the password storing unit when the judgment is in the affirmative, and the piece of application software executed by the application executing unit corresponds to the read second telephone number.

With this arrangement, the communication terminal device is able to take the second telephone number as the password and execute the piece of application software that corresponds to the second telephone number.

The present invention further provides a password recording medium that is portable and operable to re-supply a password to a user who has forgotten the password, comprising: a receiving unit operable to receive, from a communication terminal device on which the password recording medium is mounted, a first telephone number that is of a caller and has been obtained via a caller's telephone number notifying service; a telephone number storing unit that stores therein a second telephone number to be used as a criterion in judgment of whether it is acceptable to re-supply the password; a password storing unit that stores the password therein; and a reading unit operable to judge whether the received first telephone number is the same as the second telephone number, and read the password from the password storing unit when the judgment is in the affirmative.

With this arrangement, since the recording medium receives the first telephone number from the communication terminal device, and reads the password when the received first telephone number is the same as the second telephone number, it is possible to have the password recovered only for the legitimate user of the password. The reason for this is that normally only limited members are able to use the first telephone number, and it is difficult for a third party to use the first telephone number for recovering the password. Further, there is no possibility that someone who is able to use the first telephone number would notify the first telephone number to a third party other than the user via a caller's telephone number notifying service.

It is also acceptable to have an arrangement wherein the password recording medium further comprises: a number receiving unit operable to receive the second telephone number from the communication terminal device; and a writing unit operable to write the received second telephone number to the telephone number storing unit.

With this arrangement, the password recording medium is able to write the second telephone number to the telephone number storing unit.

Further, it is acceptable to have an arrangement wherein the number receiving unit further receives a third telephone number that is different from the second telephone number, the password recording medium further comprises (i) a password receiving unit operable to receive a password from the communication terminal device and (ii) a password authenticating unit operable to authenticate passwords by judging if the password received by the password receiving unit is the same as the password stored in the password storing unit, and the writing unit further rewrites the second telephone number stored in the telephone number storing unit with the third telephone number when the password received by the password receiving unit is judged to be the same as the password stored in the password storing unit.

With this arrangement, the password recording medium is able to rewrite the second telephone number with the third telephone number.

It is also acceptable to have an arrangement, wherein the password recording medium further comprises a password outputting unit operable to output the password read by the reading unit to the communication terminal device.

With this arrangement, the password recording medium is able to output the read password to the communication terminal device.

Here, it is acceptable to have an arrangement, wherein the communication terminal device further comprises: an application storing unit that stores therein a piece of application software that corresponds to the password; and an application executing unit operable to execute the piece of application software, using the password read by the reading unit.

With this arrangement, the password recording medium is able to execute the piece of application software that corresponds to the read password.

Further, it is acceptable to have an arrangement wherein the password is the second telephone number, the reading unit judges whether the received first telephone number is the same as the second telephone number, and reads the second telephone number from the password storing unit when the judgment is in the affirmative, and the piece of application software executed by the application executing unit corresponds to the read second telephone number.

With this arrangement, the password recording medium is able to take the second telephone number as the password, and execute the piece of application software that corresponds to the second telephone number.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A password recovery system for re-supplying a password, said password recovery system comprising:
   a communication terminal device for receiving a predetermined service via a network using the password; and
   a portable recording medium for storing the password, the portable recording medium being coupled to said communication terminal device,
   wherein said communication terminal device comprises:
      a controller for receiving from an external communication terminal device a signed data set, based on an indication for recovering the password from a user of said communication terminal device when the user forgets the password, the external communication terminal device guaranteeing legitimacy of the user of said communication terminal device and generating the signed data set with a secret key, and for outputting to said portable recording medium the received signed data set when said portable recording medium is coupled to said communication terminal device, and
   wherein said portable recording medium comprises:
      a memory for storing a public key corresponding to the secret key; and
      a controller for inputting from said communication terminal device the signed data set, and for judging, using the public key and the signed data set, whether the signed data set is signed by the external communication terminal device, said judging being performed solely by said controller of said portable recording medium,
      wherein said controller of said portable recording medium recovers the same password as the password stored in said memory of said portable recording medium when it is judged that the signed data set is signed by the external communication terminal device, and outputs the recovered password to said communication terminal device, and
      wherein said controller of said portable recording medium does not recover the same password as the password stored in said memory of said portable recording medium when it is judged that the signed data set is not signed by the external communication terminal device.

2. The password recovery system according to claim 1,
   wherein said memory of said portable recording medium stores an expiration period for receiving the signed data set,
   wherein the signed data set includes date/time information, the date/time information indicating a date and time at which the signed data set is generated at the external communication terminal device, and
   wherein said controller of the portable recording medium judges using the public key and the signed data set whether the signed data set is signed by the external communication terminal device and whether the date/time information is within the expiration period stored in said memory, recovers the same password as the password stored in said memory of said portable recording medium when it is judged that the signed data set is signed by the external communication terminal device and that the date/time information is within the expiration period stored in said memory, and outputs the recovered password to said communication terminal device.

3. The password recovery system according to claim 1,
   wherein said memory of said portable recording medium stores a predetermined number indicating a number of the signed data set that is required to recover the password, and
   wherein said controller of said portable recording medium counts a number of the signed data set when it is judged that the signed data set is signed by the external communication terminal device, recovers the same password as the password stored in said memory of said portable recording medium when the counted number of the signed data set reaches the predetermined number stored in said memory of said portable recording medium, and outputs the recovered password to said communication terminal device.

4. A communication terminal device for re-supplying a password to a user of the communication terminal device and for receiving a predetermined service via a network using the password, wherein a portable recording medium is coupled to said communication terminal device, the portable recording medium storing the password, and said communication terminal device comprising:
   a controller for receiving from an external communication terminal device a signed data set, based on an indication for recovering the password from the user of said communication terminal device when the user forgets the password, the external communication terminal device guaranteeing legitimacy of the user of said communication terminal device and generating the signed data set with a secret key, and for outputting to the portable recording medium the received signed data set when the portable recording medium is coupled to said communication terminal device,
   wherein the portable recording medium comprises:
      a memory for storing the password and a public key corresponding to the secret key; and
      a controller for inputting from said communication terminal device the signed data set, and for judging, using the public key and the signed data set, whether the signed data set is signed by the external communication terminal device, said judging being performed solely by said controller of said portable recording medium,
      wherein the controller of the portable recording medium recovers the same password as the password stored in the memory of the portable recording medium when it is judged that the signed data set is signed by the external communication terminal device, and outputs the recovered password to said communication terminal device, and wherein the controller of the portable recording medium does not recover the same password as the password stored in the memory of the portable recording medium when it is judged that the signed data set is not signed by the external communication terminal device.

5. The communication terminal device according to claim 4, wherein the memory of the portable recording medium stores an expiration period for receiving the signed data set, wherein the signed data set includes date/time information, the date/time information indicating a date and time at which the signed data set is generated at the external communication terminal device, and wherein the controller of the portable recording medium judges using the public key and the signed data set whether the signed data set is signed by the external communication terminal device and whether the date/time information is within the expiration period stored in the memory, recovers the same password as the password stored in the memory of the portable recording medium when it is judged that the signed data set is signed by the external communication terminal device and that the date/time information is within the expiration period stored in the memory, and outputs the recovered password to said communication terminal device.

6. The communication terminal device according to claim 4, wherein the memory of the portable recording medium stores a predetermined number indicating a number of the signed data set that is required to recover the password, and wherein the controller of the portable recording medium counts a number of the signed data set when it is judged that the signed data set is signed by the external communication terminal device, recovers the same password as the password stored in the memory of the portable recording medium when the counted number of the signed data set reaches the predetermined number stored in the memory of the portable recording medium, and outputs the recovered password to said communication terminal device.

7. The communication terminal device according to claim 4, further comprising a display for displaying the recovered password output from the portable recording medium.

8. The communication terminal device according to claim 4, further comprising a memory for storing a piece of application software corresponding to the recovered password output from the portable recording medium, wherein said controller of said communication terminal device performs the piece of the application software using the recovered password.

9. A portable recording medium for being coupled to a communication terminal device for receiving a predetermined service via a network using a password and for re-supplying the password to a user of the communication terminal device, the communication terminal device receiving from an external communication terminal device a signed data set, based on an indication for recovering the password from the user of the communication terminal device when the user forgets the password, the external communication terminal device guaranteeing legitimacy of the user of the communication terminal device and generating the signed data set with a secret key, and for outputting to said portable recording medium the received signed data set when said portable recording medium is coupled to the communication terminal device, said portable recording medium comprising:

a memory for storing the password and a public key corresponding to the secret key; and a controller for inputting from the communication terminal device the signed data set, and for judging, using the public key and the signed data set, whether the signed data set is signed by the external communication terminal device, said judging being performed solely by said controller of said portable recording medium, wherein said controller recovers the same password as the password stored in said memory of said portable recording medium when it is judged that the signed data set is signed by the external communication terminal device, and outputs the recovered password to the communication terminal device, and wherein said controller does not recover the same password as the password stored in said memory of said portable recording medium when it is judged that the signed data set is not signed by the external communication terminal device.

10. The portable recording medium according to claim 9, wherein said memory stores an expiration period for receiving the signed data set, wherein the signed data set includes date/time information, the date/time information indicating a date and time at which the signed data set is generated at the external communication terminal device, and wherein said controller judges using the public key and the signed data set whether the signed data set is signed by the external communication terminal device and whether the date/time information is within the expiration period stored in said memory, recovers the same password as the password stored in said memory of said portable recording medium when it is judged that the signed data set is signed by the external communication terminal device and that the date/time information is within the expiration period stored in said memory, and outputs the recovered password to the communication terminal device.

11. The portable recording medium according to claim 9, wherein said memory stores a predetermined number indicating a number of the signed data set that is required to recover the password, and wherein said controller counts a number of the signed data set when it is judged that the signed data set is signed by the external communication terminal device, recovers the same password as the password stored in said memory of said portable recording medium when the counted number of the signed data set reaches the predetermined number stored in said memory of said portable recording medium, and outputs the recovered password to the communication terminal device.

12. A password recovery method for re-supplying a password using a communication terminal device and a portable recording medium coupled to the communication terminal device, the communication terminal device receiving a predetermined service via a network using the password, and the portable recording medium storing the password, the method comprising:

receiving, at the communication terminal device, from an external communication terminal device a signed data set, based on an indication for recovering the password from a user of the communication terminal device when the user forgets the password, the external communication terminal device guaranteeing legitimacy of the user of the communication terminal device and generating the signed data set with a secret key;

outputting, at the communication terminal device, to the portable recording medium the received signed data set when the portable recording medium is coupled to the communication terminal device;

storing, at the portable recording medium, the password and a public key corresponding to the secret key;

inputting, at the portable recording medium, from the communication terminal device the signed data set; and judging, at the portable recording medium, using the public key and the signed data set, whether the signed data set is signed by the external communication terminal device, said judging being performed solely by a controller the portable recording medium, wherein, when it is judged by said judging that the signed data set is signed by the external communication terminal device, the portable recording medium recovers the same password as the password stored in the memory of the portable recording medium, and outputs the recovered password to the communication terminal device, and wherein, when it is judged by said judging that the signed data set is not signed by the external communication terminal device, the portable recording medium does not recover the same password as the password stored in the memory of the portable recording medium.

* * * * *